US012552815B2

(12) United States Patent
Hecker et al.

(10) Patent No.: US 12,552,815 B2
(45) Date of Patent: Feb. 17, 2026

(54) BORONIC ACID DERIVATIVES AND SYNTHESIS, POLYMORPHIC FORMS, AND THERAPEUTIC USES THEREOF

(71) Applicant: QPEX BIOPHARMA, INC.

(72) Inventors: Scott J. Hecker, Del Mar, CA (US); Serge Henri Boyer, San Diego, CA (US); Matthew M. Bio, Belmont, MA (US); Yuanqing Fang, Belmont, MA (US); Angela Gonzales de Castro, Maastricht (NL); Laurent Lefort, Maastricht (NL); Zuolin Zhu, Sacramento, CA (US); Thomas Linder, Linz (AT)

(73) Assignee: QPEX BIOPHARMA, INC., San Diego, CA (US)

(*) Notice: Subject to any disclaimer, the term of this patent is extended or adjusted under 35 U.S.C. 154(b) by 493 days.

(21) Appl. No.: 17/923,544

(22) PCT Filed: May 4, 2021

(86) PCT No.: PCT/US2021/030690
§ 371 (c)(1),
(2) Date: Nov. 4, 2022

(87) PCT Pub. No.: WO2021/226114
PCT Pub. Date: Nov. 11, 2021

(65) Prior Publication Data
US 2025/0002508 A1    Jan. 2, 2025

Related U.S. Application Data

(60) Provisional application No. 63/020,494, filed on May 5, 2020.

(51) Int. Cl.
  *C07F 5/02* (2006.01)
  *B01J 23/44* (2006.01)
  *B01J 23/755* (2006.01)

(52) U.S. Cl.
  CPC .............. *C07F 5/025* (2013.01); *B01J 23/44* (2013.01); *B01J 23/755* (2013.01); *C07B 2200/13* (2013.01)

(58) Field of Classification Search
  CPC ...................................... C07F 5/025
  See application file for complete search history.

(56) References Cited

U.S. PATENT DOCUMENTS

| | | |
|---|---|---|
| 3,686,398 A | 8/1972 | Kohn et al. |
| 4,194,047 A | 3/1980 | Christensen et al. |
| 4,260,543 A | 4/1981 | Miller |
| 4,353,807 A | 10/1982 | Braid |
| 4,409,214 A | 10/1983 | Takaya et al. |
| 4,812,561 A | 3/1989 | Hamashima et al. |
| 4,822,786 A | 4/1989 | Zama et al. |
| 4,933,443 A | 6/1990 | Hamashima et al. |
| 5,442,100 A | 8/1995 | Bjorkquiest et al. |
| 5,888,998 A | 3/1999 | Maiti et al. |
| 6,184,363 B1 | 2/2001 | Shoichet et al. |
| 6,586,615 B1 | 7/2003 | Kettner et al. |
| 7,271,186 B1 | 9/2007 | Shoichet et al. |
| 7,439,253 B2 | 10/2008 | Lampilas et al. |
| 7,582,621 B2 | 9/2009 | Baker et al. |
| 7,612,087 B2 | 11/2009 | Aszodi et al. |
| 7,674,913 B2 | 3/2010 | Campbell et al. |
| 7,825,139 B2 | 11/2010 | Campbell et al. |
| 8,680,136 B2 | 3/2014 | Hirst et al. |
| 9,012,491 B2 | 4/2015 | Reddy et al. |
| 9,101,638 B2 | 8/2015 | Reddy et al. |
| 9,132,140 B2 | 9/2015 | Reddy et al. |
| 9,156,858 B2 | 10/2015 | Reddy et al. |
| 9,241,947 B2 | 1/2016 | Reddy et al. |
| 9,296,763 B2 | 3/2016 | Hirst et al. |
| 9,511,142 B2 | 12/2016 | Burns et al. |
| 9,642,869 B2 | 5/2017 | Reddy et al. |
| 9,687,497 B1 | 6/2017 | Bis et al. |
| 9,694,025 B2 | 7/2017 | Hirst et al. |
| 10,004,758 B2 | 6/2018 | Hirst et al. |
| 10,085,999 B1 | 10/2018 | Gordon et al. |
| 10,206,937 B2 | 2/2019 | Reddy et al. |
| 10,294,249 B2 | 5/2019 | Hecker et al. |
| 10,570,159 B2 | 2/2020 | Hecker et al. |
| 10,618,918 B2 | 4/2020 | Hecker et al. |
| 10,662,205 B2 | 5/2020 | Hecker et al. |
| 11,180,512 B2 | 11/2021 | Hecker et al. |
| 11,286,270 B2 | 3/2022 | Hecker et al. |
| 11,999,759 B2 | 6/2024 | Hecker et al. |

(Continued)

FOREIGN PATENT DOCUMENTS

| | | |
|---|---|---|
| CN | 102320960 A | 1/2012 |
| CN | 106397454 A | 2/2017 |

(Continued)

OTHER PUBLICATIONS

Byrn et al., "Pharmaceutical Solids: A Strategic Approach to Regulatory Considerations". Pharma Res. Jul. 1995;12(7):945-954.
Cahill et al., Cyclic Boronates Inhibit All Classes of β-Lactamases. Antimicro Age Chemother. Apr. 2017;61(4): e02260-16.
CAS Registry No. 1964:447952 CAPLUS; "Arylboronic acids. VII. Some reactions of o-formylbenzenebornic acid", Tschampel et al. J Org Chem. Aug. 1964;29(8): 2168-2172; Abstract.
CAS Registry No. 2006320-60-9; "3,4-dihydro-2-hydroxy-2H-1,2-Oxaborino[6,5-c]pyridine-8-carboxylic acid", CAS, Oct. 5, 2016; 1 page.

(Continued)

*Primary Examiner* — Golam M Shameem
(74) *Attorney, Agent, or Firm* — Knobbe, Martens, Olson & Bear, LLP

(57) ABSTRACT

Disclosed herein are antimicrobial compounds, polymorphic forms, compositions, pharmaceutical compositions, the method of use and preparation thereof. Some embodiments relate to boronic acid derivatives and their use as therapeutic agents, for example, β-lactamase inhibitors (BLIs).

6 Claims, 29 Drawing Sheets

(56) References Cited

U.S. PATENT DOCUMENTS

| | | | |
|---|---|---|---|
| 12,016,868 | B2 | 6/2024 | Reddy et al. |
| 2004/0019203 | A1 | 1/2004 | Micetich et al. |
| 2004/0157826 | A1 | 8/2004 | Lampilas et al. |
| 2005/0020572 | A1 | 1/2005 | Aszodi et al. |
| 2005/0070719 | A1 | 3/2005 | Belyakov et al. |
| 2006/0019116 | A1 | 1/2006 | Conley et al. |
| 2006/0178357 | A1 | 8/2006 | Buynak et al. |
| 2006/0210883 | A1 | 9/2006 | Chen et al. |
| 2010/0056478 | A1 | 3/2010 | Desarbre et al. |
| 2010/0120715 | A1 | 5/2010 | Burns et al. |
| 2010/0256092 | A1 | 10/2010 | Xia et al. |
| 2010/0292185 | A1 | 11/2010 | Burns et al. |
| 2011/0288063 | A1 | 11/2011 | Maiti et al. |
| 2012/0040932 | A1 | 2/2012 | Hirst et al. |
| 2013/0316978 | A1 | 11/2013 | Reddy et al. |
| 2013/0331355 | A1 | 12/2013 | Griffith et al. |
| 2013/0345172 | A1 | 12/2013 | Hirst et al. |
| 2014/0194381 | A1 | 7/2014 | Reddy et al. |
| 2014/0194382 | A1 | 7/2014 | Reddy et al. |
| 2014/0194384 | A1 | 7/2014 | Reddy et al. |
| 2014/0194385 | A1 | 7/2014 | Reddy et al. |
| 2014/0194386 | A1 | 7/2014 | Burns et al. |
| 2014/0206648 | A1 | 7/2014 | Reddy et al. |
| 2014/0274954 | A1 | 9/2014 | Chellappan et al. |
| 2015/0119363 | A1 | 4/2015 | Dudley et al. |
| 2016/0220591 | A1 | 8/2016 | Hirst et al. |
| 2016/0339045 | A1 | 11/2016 | Griffith et al. |
| 2017/0057979 | A1 | 3/2017 | Hecker et al. |
| 2017/0088561 | A1 | 3/2017 | Reddy et al. |
| 2017/0136047 | A1 | 5/2017 | Reddy et al. |
| 2017/0173055 | A1 | 6/2017 | Bis et al. |
| 2018/0002351 | A1 | 1/2018 | Hecker et al. |
| 2018/0051041 | A1 | 2/2018 | Hecker et al. |
| 2018/0071325 | A1 | 3/2018 | Hirst et al. |
| 2018/0207183 | A1 | 7/2018 | Hirst et al. |
| 2018/0214465 | A1 | 8/2018 | Hirst et al. |
| 2019/0202832 | A1 | 7/2019 | Basarab et al. |
| 2021/0361682 | A1 | 11/2021 | Reddy et al. |
| 2022/0056055 | A1 | 2/2022 | Hecker et al. |
| 2023/0144152 | A1 | 5/2023 | Lamovskaya et al. |
| 2023/0151029 | A1 | 5/2023 | Reddy et al. |
| 2024/0197750 | A1 | 6/2024 | Griffith et al. |
| 2024/0307422 | A1 | 9/2024 | Reddy et al. |
| 2024/0327426 | A1 | 10/2024 | Hecker et al. |
| 2025/0034175 | A1 | 1/2025 | Hecker et al. |

FOREIGN PATENT DOCUMENTS

| | | |
|---|---|---|
| CN | 106397455 A | 2/2017 |
| CN | 106397457 A | 2/2017 |
| CN | 106420617 A | 2/2017 |
| CN | 106420760 A | 2/2017 |
| CN | 106432270 A | 2/2017 |
| CN | 106432271 A | 2/2017 |
| CN | 106432272 A | 2/2017 |
| CN | 109293678 A | 2/2019 |
| EP | 1550657 A1 | 7/2005 |
| EP | 2508506 A1 | 10/2012 |
| EP | 2406233 B1 | 11/2013 |
| FR | 2573070 A1 | 5/1986 |
| JP | 2003-229277 | 8/2003 |
| JP | 2004-291253 | 10/2004 |
| WO | WO 1987/05297 | 9/1987 |
| WO | WO 1989/10961 | 11/1989 |
| WO | WO 1998/56392 A1 | 12/1998 |
| WO | WO 2000/035904 A1 | 6/2000 |
| WO | WO 2000/035905 A1 | 6/2000 |
| WO | WO 2001/023374 A1 | 4/2001 |
| WO | WO 2001/030149 | 5/2001 |
| WO | WO 2002/022137 A1 | 3/2002 |
| WO | WO 2002/083884 | 10/2002 |
| WO | WO 2003/070714 | 8/2003 |
| WO | WO 2004/039859 | 5/2004 |
| WO | WO 2004/058679 A2 | 7/2004 |
| WO | WO 2004/064755 A2 | 8/2004 |
| WO | WO 2005/033090 | 4/2005 |
| WO | WO 2005/035532 A1 | 4/2005 |
| WO | WO 2005/087700 | 9/2005 |
| WO | WO 2006/052733 A1 | 5/2006 |
| WO | WO 2006/091771 | 8/2006 |
| WO | WO 2007/058602 A2 | 5/2007 |
| WO | WO 2007/065288 A2 | 6/2007 |
| WO | WO 2007/095638 | 8/2007 |
| WO | WO 2008/039420 A2 | 4/2008 |
| WO | WO 2008/116813 A1 | 10/2008 |
| WO | WO 2009/046098 A1 | 4/2009 |
| WO | WO 2009/064413 A1 | 5/2009 |
| WO | WO 2009/064414 A1 | 5/2009 |
| WO | WO 2009/091856 A1 | 7/2009 |
| WO | WO 2009/117540 A1 | 9/2009 |
| WO | WO 2009/139834 A1 | 11/2009 |
| WO | WO 2009/140309 A2 | 11/2009 |
| WO | WO 2010/056827 A1 | 5/2010 |
| WO | WO 2010/075286 A1 | 7/2010 |
| WO | WO 2010/097675 A1 | 9/2010 |
| WO | WO 2010/130708 A1 | 11/2010 |
| WO | WO 2010/144338 A1 | 12/2010 |
| WO | WO 2011/017125 A1 | 2/2011 |
| WO | WO 2011/103686 A1 | 9/2011 |
| WO | WO 2011/123502 A1 | 10/2011 |
| WO | WO 2011/154953 | 12/2011 |
| WO | WO 2012/021455 A1 | 2/2012 |
| WO | WO 2012/058065 A1 | 5/2012 |
| WO | WO 2012/067664 A1 | 5/2012 |
| WO | WO 2012/106995 A1 | 8/2012 |
| WO | WO 2012/136383 A1 | 10/2012 |
| WO | WO 2013/033461 A1 | 3/2013 |
| WO | WO 2013/053372 A1 | 4/2013 |
| WO | WO 2013/056163 A1 | 4/2013 |
| WO | WO 2013/092979 A1 | 6/2013 |
| WO | WO 2013/104774 A1 | 7/2013 |
| WO | WO 2013/104897 A1 | 7/2013 |
| WO | WO 2013/122888 A2 | 8/2013 |
| WO | WO 2013/184845 A1 | 12/2013 |
| WO | WO 2014/089365 A1 | 6/2014 |
| WO | WO 2014/107535 A1 | 7/2014 |
| WO | WO 2014/107536 A1 | 7/2014 |
| WO | WO 2014/110442 A1 | 7/2014 |
| WO | WO 2014/144380 A1 | 9/2014 |
| WO | WO 2014/151958 A1 | 9/2014 |
| WO | WO 2015/171398 A1 | 11/2015 |
| WO | WO 2015/171430 A1 | 11/2015 |
| WO | WO 2015/179308 A1 | 11/2015 |
| WO | WO 2015/191907 A1 | 12/2015 |
| WO | WO 2016/003929 A1 | 1/2016 |
| WO | WO 2016/065282 A1 | 4/2016 |
| WO | WO 2016/116892 A1 | 7/2016 |
| WO | WO 2016/149393 A1 | 9/2016 |
| WO | WO 2017/100537 A1 | 6/2017 |
| WO | WO 2018/013870 A1 | 1/2018 |
| WO | WO 2018/005662 A1 | 4/2018 |
| WO | WO 2019/075084 A1 | 4/2019 |
| WO | WO 2019/093450 A1 | 5/2019 |
| WO | WO 2020/112542 A1 | 6/2020 |
| WO | WO 2021/041616 A1 | 3/2021 |
| WO | WO 2021/188700 A1 | 9/2021 |

OTHER PUBLICATIONS

Grant, D.J.W., "Theory and Origin of Polymorphism". in Polymorphism in Pharmaceutical Solids, Harry G. Brittain [Ed], Drugs Pharma Sciences 2nd Ed., (Dec. 31, 1999), Chapter 1; pp. 1-10.

Guillory J.K., "Generation of Polymorphs, Hydrates, Solvates, and Amorphous Solids" inPolymorphism in Pharmaceutical Solids, Harry G. Brittain [Ed], Drugs Pharma Sciences 2nd Ed., (Dec. 31, 1999), Chapter 5; pp. 183-226. (3-part doc).

Gupta et al., "Salts of Therapeutic Agents: Chemical, Physiocochemical, and Biological Considerations". Molecules. Jul. 14, 2018;23(7):1719 in 15 pages.

Hosokawa, R., "Conductivity Measurement / General Tests", The Japanese Pharmacopoeia, Sixteenth Edition, Mar. 2011, pp. 64-68, 2070.

(56) References Cited

OTHER PUBLICATIONS

Ito et al., In vitro antimicrobial activity of S-649266, a catechol-substituted siderophore cephalosporin, when tested against non-fermenting Gram-negative bacteria. J Antimic Chemother. Mar. 1, 2016;71(3):670-677.
Lomovskaya et al., Impact of intrinsic resistance mechanisms on potency of QPX7728, a new ultrabroad-spectrum beta-lactamase inhibitor of serine and metallo-beta-lactamases in Enterobacteriaceae, Pseudomonas aeruginosa, and Acinetobacter baumannii. Antimicrobial agents and chemotherapy. May 21, 2020;64(6):e00552-20 in 11 pages.
Lomovskaya et al., Spectrum of Beta-lactamase inhibition by the cyclic boronate QPX7728, an ultrabroad-spectrum beta-lactamase inhibitor of serine and metallo-beta-lactamases: enhancement of activity of multiple antibiotics against isogenic strains expressing single beta-lactamases. Antimicrobial Agents and Chemotherapy. May 21, 2020;64(6):e00212-20 in 9 pages.
Pettersson et al., Discovery of cyclopropyl chromane-derived pyridopyrazine-1, 6-dione γ-secretase modulators with robust central efficacy. MedChemComm. 2017;8(4): 730-743.
Roy et al., "Polymorph discrimination using low wavenumber Raman spectroscopy". Org Process Res Dev. Jul. 19, 2013;17(7):976-980.
Serajuddin A.T.M., "Salt formation to improve drug solubility". Adv Drug Deliv Rev. Jul. 30, 2007;59(7):603-616.
Shah et al., "Salt Formation" in Pharmaceutical Dosage Forms: Tablets; Larry L. Augsburger et al. [Eds.]; 3rd edition, vol. 2, chapter 2, p. 62-66, Dec. 31, 2008.
Stewart et al., "Oral cephalosporin and [beta]-lactamase inhibitor combinations for ESBL-producing Enterobacteriaceae urinary tract infections". J Antimicro Chemother. Sep. 1, 2020;75(9):2384-2393.
Zhanel et al., "Cefiderocol: A siderophore cephalosporin with activity against carbapenem-resistant and multidrug-resistant gram-negative bacilli", Drugs. Feb. 28, 2019;79: 271-289.
European Extended Search Report dated Apr. 15, 2024 for Application No. 21800914.0, filed Dec. 1, 2022.
European Extended Search Report dated May 23, 2024 for Application No. 21772502.7, filed Oct. 17, 2022.
Abdel-Magid et al., "Reductive Amination of Aldehydes and Ketones with SodiumTriacetoxyborohydride: Studies on Direct and Indirect Reductive Amination Procedures", J Org Chem. (1996) 61(11):3849-3862.
Adediran et al., "A 'cephalosporin-like' cyclic depsipeptide: Synthesis and reaction with beta-lactam-recognizing enzymes", Bioorg Med Chem Lett. (1999) 9(3):341-346.
Aizpurua et al., "Synthesis of benzyl halides from aldehydes promoted by halosilanes and 1,1,3,3-tetramethyldisiloxane (TMDS)", Tetrahedron Lett. (1984) 25(10):1103-1104.
Akiyama et al., "N-Hydroxy Amides. Part 6. Synthesis and Spectroscopic Properties of 1-Hydroxypiperazine-2,5-diones", J Chem Soc., Perkin Trans I, (1989) 2:235-239.
Allen et al., "Ansel's Pharmaceutical Dosage Forms and Drug Delivery Systems", 8th Edition (2004) TOC only.
Ambrose et al., Pharmacokinetics-pharmacodynamics of antimicrobial therapy: it's not just for mice anymore. Clin Infect Dis. (2007) 44: 79-86.
Ambrose et al., "Pharmacokinetics-pharmacodynamics of CB-618 in combination with cefepime, ceftazidime, ceftolozane and meropenem: the pharmacological basis for a stand-alone beta-lactamase inhibitor", Antimicrob Agents Chemother. (Nov. 2017) 61(12): e00630-17; 7 pages.
American Chemical Society. STN Chemical Database Registry RN: 1226917; Jun. 2010; 2 pages.
Arya et al., "Advances in asymmetric enolate methodology", Tetrahedron (2000) 56:917-947.
Austad et al. "Development of a multi kilogram-scale, tandem cyclopropanation ring-expansion reaction en route to hedgehog antagonist IPI-926", Org Process Res Dev., (2016) 20(4):786-798; Supporting Information, 70 pages.

Babic et al., "What's new in antibiotic resistance? Focus on beta-lactamases", Drug Res Updates (2006) 9:142-156.
Balbach et al., "Pharmaceutical evaluation of early development candidates 'the 100 mg-approach'", Int'l J Pharma. May 4, 2004;275: 1-12.
Banker G.S. et al. [Eds.], Modern Pharmaceutics, 4th Edition; Marcel Dekker, Inc. (2002); Chapters 9 and 10, 98 pages.
Bassetti et al., "New antibiotics for bad bugs: where are we?", Ann Clin Microbiol Antimicrob. (2013) 12:22-36.
Becker, Daniel E., "Antimicrobial Drugs", Anesth Prog (2013) 60:111-123.
Beenen et al., "Asymmetric copper-catalyzed synthesis of alpha-amino boronate esters from N-tert-butanesulfinyl aldimines", J Am Chem Soc. (2008) 130(22):6910-6911.
Berkhout et al., "Pharmacodynamics of Ceftazidime and Avibactam in Neutropenic Mice with Thigh or Lung Infection", Antimicrob Agents Chemother. (2015) 60 (1): 368-375.
Bhavani et al., Pharmacokinetic-Pharmacodynamic (PK_PD) basis for CLSI carbapenem (CARB) susceptibility breakpoint changes. abstr Abstracts of Papers, 50th Interscience Conference on Antimicrobial Agents and Chemotherapy, Sep. 12-15, 2010; #A1-1382, Boston, MA; 3 pages.
Biedrzycki et al., "Derivatives of tetrahedral boronic acids", J. Organomet. Chem. (1992) 431:255-270.
Bilello et al., "Effect of 2',3'-8 didehydro-3'-deoxythymidine in an in vitro hollow-fiber pharmacodynamic model system correlates with results of dose-ranging clinical studies", Antimicrob Agents Chemother. (1994) 38(6): 1386-1391.
Bou et al., "Cloning, nucleotide sequencing, and analysis of the gene encoding an AmpC beta-lactamase in Acinetobacter baumannii", Antimicrob Agents Chemother (2000) 44(2):428-432.
Bou et al., "OXA-24, a novel class D beta-lactamase with carbapenemase activity in an Acinetobacter baumannii clinical strain", Antimicrob Agents Chemother (2000) 44(6):1556-1561 and Erratum: Antimicrob Agents Chemother. (2006) 50(6) 2280.
Bowker et al., Comparative pharmacodynamics of meropenem using an in-vitro model to simulate once, twice and three times daily dosing in humans. J Antimicrob Chemother (1998) 42: 461-467.
Brabez et al., "Design,synthesis, and biological studies of efficient multivalent melanotropin ligands: tools toward melanoma diagnosis and treatment", J Med Chem. (2011) 54(20):7375-7384.
Braisted et al., "Discovery of a potent small molecule IL-2 inhibitor through fragment assembly", J Am Chem Soc., (2003) 125(13): 3714-3715; Supporting Information, 42 pages.
Brosz et al., "Resolution of alpha-aminoboronic esters by diastereoselective crystallization with pinanediols. Confirmation by x-ray analysis", Tetrahedron: Asymmetry (1997) 8(9):1435-1440.
Buesking et al., "Asymmetric Synthesis of Protected alpha-Amino Boronic Acid Derivatives with an Air- and Moisture-stable Cu(II) Catalyst", J Org Chem. (Mar. 2014) 79(8): 3671-3677.
Bulik et al., "Comparison of the activity of a human simulated, high-dose, prolonged infusion of meropenem against Klebsiella pneumoniae producing the KPC carbapenemase versus that against Pseudomonas aeruginosa in an in vitro pharmacodynamic model", Antimicrob Agents Chemother (2010) 54(2): 804-810.
Bundgaard H. [Ed.], "Design of Prodrugs", Elsevier (1985); TOC, 2 pages.
Bush et al., "Minireview: Updated Functional Classification of beta-Lactamases," Antimicrob Agents Chemo. (2010) 54(3):969-976.
CAS Registry No. 2005:329437 CAPLUS; "Product subclass 28: Vinylboranes", Vaultier et al., (2004); XP-002764965; 1 page.
CAS Registry Nos. 69190-59/60 (2-(bis(phenylthio)methyl)-4,4,5,5-tetramethyl-1,3,2-dioxaborolane) and 69190-60-9 (2-(bis(phenylthio)methyl)-1,3,2-dioxaborinane) Scheme 18 (2015); 2 pages.
CAS Registry No. 105892-95-3 Boronic acid [1-(phenylsulfonyl)heptyl]-, dimethyl ester (2015); 2 pages.
CAS Registry No. 831209-98-4 6H-Dibenz[c,e][1,2]oxaborin, 6a, 10a-dihydro-6-hydroxy; Entered STN: Feb. 15, 2005; 1 page.
CAS Registry No. 831210-03-8 6H-Dibenz[c,e][1,2]oxaborin, 2,4-dibromo-6a, 10a-dihydro-6-hydroxy; Feb. 15, 2005; 1 page.

(56) References Cited

OTHER PUBLICATIONS

CAS Registry No. 2114651-20-4; "7-Benzofurancarboxylic acid", Aurora Fine Chemicals; Aug. 16, 2017; 1 page.
CAS Registry No. 1780853-40-8; "7-Benzofurancarboxylic acid", Aurora Fine Chemicals; Jun. 15, 2015; 1 page.
CAS Registry No. 1427326-65-5; "7-Benzofurancarboxylic acid", Ellanova Laboratories; Apr. 5, 2013; 1 page.
CAS Registry No. 1344904-36-4; "7-Benzofurancarboxylic acid", Asiba Pharmatech, Inc.; Nov. 13, 2011; 1 page.
CAS Registry No. 1890373-92-8; "Benzoic acid", Aurora Fine Chemicals; Apr. 15, 2016; 1 page.
CAS Registry No. 2170834-63-4; 'Benzo[e]cycloprop[c][1,2]oxaborin-4-carboxylic acid, 5-fluoro-1,1a,2,7b-tetrahydro-2-hydroxy-, (1aR,7bS); Jan. 23, 2018; 1 Page.
CAS Registry No. 2170848-99-2; 'Borate(2), [3-[(1S2R)-cyclopropyl-Kc2]-6-fluoro-2-(hydroxy-κO)benzoato(3-)]dihydroxy-, sodium (1:2), (t-4)'; Jan. 24, 2018; ? Page.-carboxylic acid, 5-fluoro-1,1a,2,7b-tetrahydro-2-hydroxy-,(1aR,7bS)'; Jan. 23, 2018; 1 Page.
Chandrasekhar et al., "The first Corey-Chaykovsky epoxidation and cyclopropanation in ionic liquids", Tetrahedron Letts. (2003) 44:3629-3630.
Charette et al., "Palladium-catalyzed Suzuki-type cross-couplings of iodocyclopropanes with boronic acids: Synthesis of trans-1,2-dicyclopropyl alkenes", J Org Chem. (1996) 61(25): 8718-8719; Supporting Information, 52 pages.
Cheng et al., "Inhibitors of hepatitis C virus polymerase: Synthesis and characterization of novel 2-oxy-6-fluoro-N-((S)-1-hydroxy-3-phenylpropan-2-yl)-benzamides", Bioorg Med Chem Ltts. (2010) 20:2119-2124.
Cheng et al., "Synthesis of Aryl Thioethers through the N-Chlorosuccinimide-Promoted Cross-Coupling Reaction of Thiols with Grignard Reagents", J Org Chem. (2012) 77(22):10369-10374.
Chemicalland21.com. "Meglumine", Jun. 7, 2011. Downloaded from </www.chemicalland21.com/lifescience/phar/N-METHYL-D-GLUCAMINE.htm>; 2 pages.
Chinchilla et al., "Recent advances in Sonogashira reactions", Chem Soc Rev., (2011) 40: 5084-5121.
Clark et al., "Concise synthesis of the C-1-C-12 fragment of amphidinolides T1-T5", Org Biomol Chem. (2011) 9(13): 4823-4830.
Clinical and Laboratory Standards Institute (formerly NCCLS, National Committee for Clinical Laboratory Standards). "Methods for Dilution of Antimicrobial Susceptibility Tests for Bacteria That Grow Aerobically", CLSI (Jan. 2006) M7-A7 26(2), 64 pages.
Clinical and Laboratory Standards Institute (formerly NCCLS, National Committee for Clinical Laboratory Standards). "Methods for Dilution of Antimicrobial Susceptibility Tests for Bacteria That Grow Aerobically", CLSI (Jan. 2009) M07-A8 29(2), 88 pages.
Clinical and Laboratory Standards Institute (formerly NCCLS, National Committee for Clinical Laboratory Standards). "Methods for Dilution of Antimicrobial Susceptibility Tests for Bacteria That Grow Aerobically; Approved Standard—9th Edition", CLSI (Jan. 2012) M07-A9 32(2): 88 pages.
Clinical Trial NCT02168946, "A Phase 3, Multi-Center, Randomized, Open-Label Study of Carbavance (Meropenem/RPX7009) Versus Best Available Therapy in Subjects with Selected Serious Infecations Due to Carbapenem-Resistant Enterobacteriaceae", Oct. 6, 2014; retrieved online from URL:https://clinicaltrials.gov/archive/NCT02168946/20140_10_06.
Conte et al., "Intrapulmonary pharmacokinetics and pharmacodynamics of meropenem", Int J Antimicrob Agents (Dec. 2005) 26(6):449-456.
Coppa et al., "A Facile, Convenient and Selective Homolytic Carbamolylation of Heteroaromatic Bases", Heterocycles (1993) 36(12):2687-2696.
Cornella et al., "Ni-catalyzed stereoselective arylation of inert C—O bonds at low temperatures". Org Lett. (2013) 15(24):6298-6301 with Supporting Information in 50 pages.
Coutts et al., "Two Efficient Methods For The Cleavage of Pinanediol Boronate Esters Yielding The Free Boronic Acids", Tetrahedron Lett. (1994) 35(29):5109-5112.
Craig WA., "Pharmacokinetic/pharmacodynamic parameters: rationale for antibacterial dosing of mice and men", Clin Infect Dis. (1998) 26(1): 1-10.
Cunha, "Meropenem in elderly and renally impaired patients", Int'l J Antimicro Agents (1998) 10: 107-117.
Danziger et al., "Automated Site-directed Drug Design: A General Algorithm for Knowledge Acquisition about Hydrogen-bonding Regions at Protein Surfaces", Proc. Royal Soc London, Series B, Biol. Sciences (1989) 236(1283):101-113.
Darses et al., "Potassium Organotrifluoroborates: New Perspectives in organic Synthesis", Chem Rev. (2008) 108:288-325.
Davoli et al., "Enantioselective total synthesis of (-)-microcarpalide", Tetrahedron (2005) 61:4427-4436.
De Meijere A. [Ed], Science of Synthesis—vol. 24; "Three Carbon-Heteroatom Bonds: Ketene Acetals and Yne-X Compounds", TOC 46 pages.
Di Gioia et al., "Optically Pure N-Hydroxy-O-triisopropylsilyl-alpha-L-amino Acid Methyl Esters fromAICI3-Assisted Ring Opening of Chiral Oxaziridines by Nitrogen Containing Nucleophiles", J Org Chem. (2005) 70(25):10494-10501.
Dörwald F.Z., Side Reactions in Organic Synthesis—A guide to Successful Synthesis Design, Wiley-VCH Verlag Gmbh & Co. KGaA, Weinheim, Germany (2005); Preface in 4 pages.
Drawz et al., "Three Decades of beta-Lactamase Inhibitors", Clin Microbiol Reviews (Jan. 2010) 23(1):160-201.
Drusano et al., Meropenem: clinical response in relation to in vitro susceptibility. Clin Microbiol Infect. (2000) 6: 185-194.
Dunetz et al., "Large-scale applications of amide coupling reagents for the synthesis of pharmaceuticals", Org Process Res Develop. (2016) 20(2): 140-177.
Eggen et al., "Total synthesis of cryptophycin-24 (Arenastatin A) amenable to structural modifications in the C16 side chain", J Org Chem. (2000) 65(23): 7792-7799; and Supporting documents, 22 pages.
Eidam et al., "Design, synthesis, crystal structures and antimicrobial activity of sulfonamide boronic acids as beta-lactamase inhibitors", J Med Chem. (2010) 53(21):7852-7863.
Eissenstat et al., "Aminoalkylindoles: Structure-Activity Relationships of Novel Cannabinoid Mimetics", J Med Chem. (1995) 38(16):3094-3105.
El Nezhawy et al., "Synthesis and antioxidant activity of some thiazolidin-4-one derivatives", Springer; Chemical Monthly/Monatshefte für Chemie (2009) 140(5):531-539.
Endo et al., "Chemoselective Suzuki coupling of diborylmethane for facile synthesis of benzylboronates", Org Lett. (2011) 13(13):3368-3371.
Fan, et al. (2009): STN International HCAPLUS database, Columbus (OH), accession No. 2009: 425839; 6 pages.
Farquhar et al., "Intensely potent doxorubicin analogues: structure-activity relationship", J. Med. Chem. (1998) 41(6):965-972.
Ghosh et al., "Enantioselective total synthesis of (+)-largazole, a potent inhibitor of histone deacetylase", Org Lett. (2008) 10(17):3907-3909.
Giroux, A., "Synthesis of benzylic boronates via palladium-catalyzed cross-coupling reaction of bis(pinacolato)diboron with benzylic halides", Tetrahedron Lett. (2003) 44:233-235.
Goodman et al., [Eds.], "The Pharmacological Basis of Therapeutics", 8th. Edition, Pergamon Press (1990); TOC, 8 pages.
Gorovoy et al., "Boron-Containing Peptidomimetics—A Novel Class of Selective Anti-tubercular Drugs", Chem Biol Drug Des. (Jan. 2013) 81(3):408-413.
Gossinger et al., "Towards EPC-syntheses of the structural class of cochleamycins and macquarimicins. Part 3: EPC-syntheses of the beta-keto lactone subunits and first attempts towards the syntheses of the pentacyclic antibiotics of this group", Tetrahedron (2007) 63:8336-8350.
Graham et al., "D is for Drugs", Chemistry & Industry, Mar. 19, 2013, pp. 28-30, Downloaded from http://www.concertpharma.com/wp-content/uploads/2014/12/ChemistryIndustry-0313.pdf; 3 pages.

(56) References Cited

OTHER PUBLICATIONS

Greene, et al., "Greene's Protective Groups in Organic Synthesis", 4th Edition, (2007); pp. 774, 785 & 787.
Gunanathan et al., "Ruthenium catalyzed hydroboration of terminal alkynes to Z vinylboronates", J Am Chem Soc. (2012) 134(35): 14349-14352; Supporting Information, 32 pages.
Hall D.G., [Ed], Boronic Acids [vol. 2]: Preparations and applications in Organic Synthesis, Medicine and Materials, Wiley-VCH, Weinheim, 2nd Edition (2011); TOC.
Hama et al., "Palladium-Catalyzed alpha-Arylation of Zinc Enolates of Esters: Reaction Conditions and Substrate Scope", J Org Chem. (2013) 78(17): 8250-8266.
Hartung et al., "Highly Z-selective and Enantioselective Ring Opening/Cross Metathesis Catalyzed by Resolved Stereogenic-At—Ru Complex", J Am Chem Soc. (Jul. 2013) 135(28): 10183-10185.
He et al., "Ligand-promoted borylation of C(sp3)—H bonds with palladium(II) catalysts", Angew Chem Int Ed., (2016) 55(2): 785-789.
Hecker et al., "Discovery of a Cyclic Boronic Acid beta-Lactamase Inhibitor (RPX7009) with Utility vs Class A Serine Carbapenemases", J Med Chem. (Mar. 2015) 58:3682-3692.
Higuchi et al., [Eds.] "Pro-drugs as Novel Drug Delivery Systems", ACS Sumposium Series 14 (1975); TOC, 3 pages.
Hong et al., "Ceftolozane/tazobactam: A Novel Antipseudomonal Cephalosporin and β-lactamase-inhibitor Combination", Infect Drug Resist. (2013) 6: 215-223.
Höpfl et al., "Dynamic NMR and X-ray diffraction study of (N-B)-diphenyl(2-aminoethoxy) borane derivatives of ephedrines and pseudoephedrines". J Organomet Chem. (1997) 544(2):175-188.
Hoveyda A., "Evolution of catalytic stereoselective olefin metathesis: From ancillary transformation to purveyor of stereochemical identity", J Org Chem. (Jun. 2014) 79(11): 4763-4792.
Hu et al., "Ag(I)-catalyzed C—H borylation of terminal alkynes", Tetrahedron (2014) 70: 5815-5819.
Imanishi et al., "Discovery of a Novel Series of Biphenyl Benzoic Acid Derivatives as Potent and Selective Human beta3-Adrenergic Receptor Agonists with Good Oral Bioavailability. Part I", J Med Chem. (2008) 51(6):1925-1944.
Inglis et al., "Observations on the Deprotection of Pinanediol and Pinacol Boronate Esters via Fluorinated Intermediates", J Org Chem. (2010) 75(2):468-471; Supporting Information, S 1-S-76.
Ishii et al., "In vitro potentiation of carbapenems with ME1071, a Novel metallo-β-lactamase inhibitor, against metallo-β-lactamase producing pseudomonas aeruginosa clinical isolates." Antimicrob. Agents Chemother. doi:10.1128/AAC.01397-09 (2010) 54(9):3625-3629.
Ishiyama et al., "Palladium(0)-catalyzed cross-coupling reaction of alkoxydiboron with haloarenes: A direct procedure for arylboronic esters", J Org Chem. (1995) 60(23): 7508-7510; Supporting Information, 35 pages.
Ito et al., "An efficient constructive method for a tricyclic system: an important intermediate for the synthesis of tricycloclavulone", Tetrahedron Lett. (2003) 44:1259-1261.
Jadhav et al., "Direct synthesis of [alpha-[(tert-Butoxycarbonyl)amino]alkyl]-boronates from (alpha-Haloalkyl)boronates", Org Chem. (1996) 61(22):7951-7954.
Jagannathan et al., "Synthesis of Boronic Acid Analogues of alpha-Amino Acids by Introducing Side Chains as Electrophiles", J Org Chem. (2001) 66(19):6375-6380.
Jang et al., Copper-catalyzed trans-hydroboration of terminal aryl alkynes: Stereodivergent synthesis of alkenylboron compounds. Org Letts. (2016) 18(6): 1390-1393; Supporting Information in 37 pages.
Jarrett et al., "Nickel(II) bis(phosphine) complexes". Inorg Chem. (1991) 30(9):2098-2104 with Supporting Information in 7 pages.
Jiang et al., "A Practical Synthesis of Cefcapene Pivoxil", Synthesis (2012) 44:207-214.
Johnson et al., "A drug targeting motif for glycosidase inhibitors: An iminosugar-boronate shows unexpectedly selective beta-galactosidase inhibition", Tetrahed Lttrs. (2002) 43(49):8905-8908.
Jordan V.C., "Tamoxifen: A most unlikely pioneering medicine", Drug Discovery (2003) 2:205-213.
Kabalka et al., "Synthesis of a series of bornonated unnatural cyclic amino acids as potential boron neutron capture therapy agents", Appl Organomet Chem. (2008) 22(9):516-522.
Kanai et al., "Synthesis of ortho-Acylbenzylboronates via Cross-Coupling Reaction of (Dialkoxyboryl)methylzinc Reagents with Haloarenes. A Stable ortho-Quinodimethane Precursor", Chem Letts. (1993) 22(5):845-848.
Kawamorita et al., "Synthesis of Primary and Secondary Alkylboronates through Site-Selective C(sp3)-H Activation with Silica-supported Monophosphine-Ir Catalysts", J Am Chem Soc. (2013) 135(8):2947-2950.
Kikuchi et al., "Comparison of the Pharmacodynamics of Biapenem in Bronchial Epithelial Lining Fluidin Healthy Volunteers Given Half-Hour and Three-Hour Intravenous Infusions", Antimicrob Agents Chemother. (Jul. 2009) 53(7):2799-2803.
Kint et al., "New-found fundamentals of bacterial persistence", Trends Microbiol. (2012) 20(12):577-585.
Kinuta et al., "Rhodium-catalyzed borylation of aryl 2-pyridyl ethers through cleavage of the carbon-oxygen bond: borylative removal of the directing group". J Am Chem Soc. (2015) 137(4):1593-1600 with Supporting Information in 198 pages.
Kondo et al., Ruthenium-Catalyzed Monoalkenylation of Aromatic Ketones by Cleavage of Carbon-Heteroatom Bonds with Unconventional Chemoselectivity. Angew Chem Int Ed Engl. (2015) 54(32):9293-9297 with Supporting Information in 95 pages.
Kose et al., "Synthesis of photochromic 2,3-bis(5-methyl-2-phenyl-4-thiazolyl)-1,4-naphthoquinone derivatives", J Photochem Photobiol. A: Chemistry. (2011) 219(1):58-61.
Kotha et al., "Recent applications of the suzuki-miyaura cross-coupling reaction in organic synthesis", Tetrahedron (2002) 58:9633-9695.
Kuang et al., "Convenient and stereoselctive synthesis of (Z)-1-bromo-1-alkenes by microwave-induced reaction", Tetrahedron Letts. (2001) 42(23): 3893-3896.
Kumar et al., "Synthesis of intermediates for the lactone moiety of mevinic acids via tellurium chemistry", J. Org. Chem., (1994) 59(17):4760-4764.
Kumar et al., "Development of Practical Methodologies for the Synthesis of Functionalized Benzoboroxoles", Tetrahedron Lett. (Aug. 25, 2010) 51(34):4482-4485.
Kusakabe et al., "Preparation of Optically Acitve 2-Furylcarbinols by Kinetic Resolution Using the Sharpless Reagent and Their Application in Organic Synthesis", J org Chem (1989) 54(9):2085-2091.
Kuti et al., "Use of Monte Carlo simulation to design an optimized pharmacodynamic dosing strategy for meropenem", J Clin Pharmacol. (Oct. 2003) 43(10): 1116-1123 with Erratum (2005); 1 page.
Laitar et al., "Catalytic diboration of aldehydes via insertion into the copper-boron bond", J Am Chem Soc. (2006) 128(34):11036-11037.
Lapuebla et al., "Activity of Meropenem Combined with RPX7009, a Novel beta-Lactamase Inhibitor, against Gram-Negative Clinical Isolates in New York City", Antimicrob Agents Chemother. (Aug. 2015) 59(8):4856-4860.
Larock R. [Ed.] Comprehensive Organic Transformations, VCH Publishers 1989; TOC, 11 pages.
Lebel et al., "Boc-protected amines via a mild and efficient one-pot Curtius rearrangement", Org Letts. (2005) 7(19): 4107-4110.
Lee et al., "Vicinal Diboronates in High Enantiomeric Purity through Tandem Site-Selective NHC-Cu-Catalyzed Boron-Copper Additions to Terminal Alkynes", J Am Chem Soc. (Dec. 2009) 131(51):18234-18235.
Lee et al., "Comparison of 30-min and 3-h infusion regimens for imipenem/cilastatin and for meropenem evaluated by Monte Carlo simulation", Diagn Microbiol Infect Dis. (2010) 68: 251-258.
Li et al., "Population Pharmacokinetic Analysis and Dosing Regimen Optimization of Meropenem in Adult Patients", J Clin Pharmacol. (2006) 46(10): 1171-1178.
Li et al, "Novel macrocyclic Hcv NS3 protease inhibitors derived from α-amino cyclic boronates", Bioorganic Med Chem Lett. (2010) 20:5695-5700.

(56) References Cited

OTHER PUBLICATIONS

Li et al., "Synthesis and evaluation of novel alpha-amino cyclic boronates as inhibitors of HCV NS3 protease", Bioorg Med Chem Lett. (2010) 20:3550-3556.
Li et al., "Stereoselective total synthesis of etnangien and etnangien methyl ester", J Org Chem. (2010) 75(8):2429-2444.
Liang et al., "The Efficient Copper(I) (Hexabenzyl)tren Catalyst and Dendritic Analogues for Green "Click" Reactions between Azides and Alkynes in Organic Solvent and in Water: Positive Dendritic Effects and Monometallic Mechanism", Advance Syn Catal. (2011) 353(18): 3434-3450.
Lieberman H.A. [Ed] Pharmaceutical Dosage Forms—Tablets; Marcel Dekker, Inc. (1989) 2nd Ed; TOC; 7 pages.
Lima et al., "Bioisosterism: A Useful Strategy for Molecular Modification and Drug Design", Curr Med Chem. (2005) 12:23-49.
Lin et al., "Pharmacokinetics and dose proportionality of ceftibuten in men", Antimicro Agents Chemother. (1995) 39(2): 359-361.
Lin et al., "Enantioselective syn and anti homocrotylation of aldehydes: Application to the formal synthesis of spongidepsin", J Am Chem Soc. (2015) 137(40): 13176-13182; Supporting Information, 177 pages.
Liu et al., "Selective Protein tyrosine phosphatase 1B inhibitors: Targeting the second phosphotyrosine binding site with non-carboxylic acid-containing ligands", J Med Chem. (2003) 46(16):3437-3440; Supporting Information, 38 pages.
Liu et al., "Application of Stereoselective Ether Transfer to the Synthesis of Isotactic Polyethers", J Org Chem. (2010) 75(12):3953-3957.
Livermore et al., "Activities of NXL104 combinations with Ceftazidime and Aztreonam against Carbapenemase-producing Enterobacteriaceae", Antimicr Agents Chemother. (2011) 55(1):390-394.
Livermore et al., "Activity of biapenem (RPX2003) combined with the boronate beta-lactamase inhibitor RPX7009 against carbapenem-resistant Enterobacteriaceae", J Antimicrob Chemother. (Aug. 2013) 68(8):1825-1831.
Lodise et al., "Penetration of meropenem into epithelial lining fluid of patients with ventilator-associated pneumonia", Antimicrob Agents Chemother. (Apr. 2011) 55(4):1606-1610.
Louie et al., Impact of meropenem in combination with tobramycin in a murine model of Pseudomonas aeruginosa pneumonia. Antimicrob Agents Chemother (2013) 57: 2788-2792.
Luithle et al., "Synthesis of enantiomerically pure cis-cyclopropylboronic esters", Eur J Org Chem. (2000) 14: 2557-2562.
MacVane et al., Characterizing in vivo pharmacodynamics of carbapenems against Acinetobacter baumannii in a Murine thigh infection model to support breakpoint determinations. Antimicrob Agents Chemother (2014) 58: 599-601.
Maguire B. A., Inhibition of Bacterial Ribosome Assembly: a Suitable Drug Target? Microbiol Mol Biol Rev. (2009) 73(1):22-35.
Malfertheiner et al., "Current concepts in the management of Helicobacter pylori infection: the Maastricht III Consensus Report", Gut (2007) 56(6):772-781.
Matteson et al., "Iodomethaneboronic Esters and Aminomethaneboronic Esters", J Organomet. Chem. (1979) 170:259-264.
Matteson et al., "A Directed Chiral Synthesis of Amino Acids from Boronic Esters", Tetrahedron Lett. (1987) 28(39):4499-4502.
Matteson, D.S., "Asymmetric Synthesis with Boronic Esters", Acc Chem Res. (1988) 21(8):294-300.
Matteson, "Boronic esters in stereodirected synthesis", Tetrahedron (1989) 45(7):1859-1885.
Matteson et al., "A stereospecific convergent coupling of nucleophilic and electrophilic chiral carbons", J. Am. Chem. Soc. (1989) 111:4399-4402.
Matteson et al., "Synthesis of asymmetrically deuterated glycerol and dibenzylglyceraldehyde via boronic esters", J. Am. Chem. Soc. (1990) 112:3964-3969.
Matteson et al., "(Alkoxyalkyl)boronic Ester Intermediates for Asymmetric Synthesis", Organometallics (1996) 15:152-163.
Matteson, "Alpha-Halo Baronic Esters in Asymmetric Synthesis", Tetrahedron (1998) 54(36):10555-10607.

Matteson et al., "Glass-Catalyzed Conversion of Boronic Esters of Asymmetric Diols to Diol Sulfites and Amine Complexes of Boron Halides", Oranometallics (2001) 20(13):2920-2923 & supporting Information (9 pages).
Matteson et al., "Cesium Alkyltrifluoroborates from Asymmetric Boronic Esters", Synlett (Jul. 2006) 20:3501-3503.
Matteson et al., "Synthesis of a (Beta-acetamido-alpha-acetoxyethyl) boronic ester via azido boronic esters", J Organomet Chem. (2008) 693:2258-2262.
Matteson, "Boronic Esters in Asymmetric Synthesis", J Org Chem. (Oct. 2013) 78(20): 10009-10023.
McOmie J.R.W. [Ed], Protective Groups in Organic Chemistry, Plenum Press, London & New York (1973); TOC, 3 pages.
Meanwell, "Synopsis of some recent tactical application of bioisosteres in drug design", J. Med. Chem. (2011) 54:2529-2591.
McSharry et al., "Prediction of the pharmacodynamically linked variable of oseltamivir carboxylate for influenza A virus using an in vitro hollow-fiber infection model system", Antimicrob Agents Chemother (2009) 53(6): 2375-2381.
Mendoza et al., "Bis(phenylthio) methaneboronic Esters as Sources of Carbanions and Ketene Thioacetals", J Org Chem. (1979) 44(8):1352-1354.
Micalizio et al., "A Boronic Ester Annulation Strategy for Diversity-Oriented Organic Synthesis", Angew Chem Int Ed Engl. (2002) 41(1): 152-154.
Miriagou et al., "Acquired carbapenemases in Gram-negative bacterial pathogens: detection and surveillance issues", Clin Microbiol Infect. (Feb. 2010) 16(2):112-122.
Mkhalid et al., "C—H activation for the construction of C—B bonds", Chem Rev. (2010) 110(2): 890-931.
Molander et al., "Highly stereoselective synthesis of cis-alkenyl pinacolboronates and potassium cis-alkenyltrifluoroborates via a hydroboration/protodeboronation approach", J Org Chem. (2008) 73(17): 6841-6844.
Montalbetti et al., "Amide bond formation and peptide coupling", Tetrahedron (2005) 61:10827-10852.
Monogue et al., "Efficacy of Humanized Exposures of Cefiderocol (S-649266) against a Diverse Population of Gram-negative Bacteria in a Murine Thigh Infection Model", Antimicrob Agents Chemother. (2017) 61(11): e01022-17 in 10 pages.
Montefour et al., "Acinetobacter baumannii: an emerging multidrug-resistant pathogen in critical care", Crit Care Nurse (2008) 28(1):15-25.
Morandi et al., "Structure-based optimization of cephalothin-analogue boronic acids as beta- lactamase inhibitors", Bioorg Med Chem. (2008) 16(3):1195-205. Epub Nov. 7, 2007.
Mori et al., "Synthesis of 1,3-dienes from alkynes and ethylene: Acetic acid 2-methylene-3-phenethylbut-3-enyl ester", Org Synth. (2005) 81: 1-13.
Morrill et al., "Treatment Options for Carbapenem-Resistant Enterobacteriaceae Infections", Open Forum Infectious Diseases [OFID] Apr. 2015; 15 pages.
Munar et al., "Drug Dosing Adjustments in Patients with Chronic Kidney Disease", Am Fam Physician (May 2007) 75(1): 1487-1496.
Ness et al., "Structure-based design guides the improved efficacy of deacylation transition state analogue inhibitors of TEM-1 beta-Lactamase", Biochemistry (2000) 39(18):5312-5321.
Nicasio et al., "Pharmacokinetics-Pharmacodynamics of Tazobactam in Combination with Piperacillinin an In Vitro Infection Model", Antimicrob Agents Chemother. (2016) 60: 2075-2080. doi: 10.1128/AAC.02747-15.
Nicolau DP., "Pharmacokinetic and pharmacodynamic properties of meropenem", Clin Infect Dis. (2008) 47 Suppl 1: S32-S40.
Noguchi et al., "Boron-masking strategy for the selective synthesis of oligoarenes via iterative Suzuki-Miyaura coupling", J Am Chem Soc. (2007) 129(4): 758-759; Supporting Information, 46 pages.
Nordmann et al., How To Detect NDM-1 Producers, J. Clin. Micro. (2011) 49:718-721.
O'Brien et al., "Enantioselective Synthesis of Boron-Substituted Quaternary Carbons by NHC-Cu-Catalyzed Boronate Conjugate Additions to Unsaturated Carboxylic Esters, Ketones or Thioesters." J Am Chem Soc. (2010) 132(31): 10630-10633.

(56) References Cited

OTHER PUBLICATIONS

Overman et al., "Organic Synthesis—Working with Hazardous Chemicals", Org Synth. (1990) 68: 182; 5 pages.

Panek et al., "Diastereoselectivity in the borane methyl sulfide promoted hydroboration of .alpha.-alkoxy-.beta, gamma.-unsaturated esters. Documentation of an alkoxy-directed hydroboration reaction", J. Org. Chem. (1992) 57(20):5288-5290.

Paquette L.A. [Ed.] Encyclopedia of Reagents for Organic Synthesis, vol. 1; J. Wiley & Sons (1995); Cover Only.

Patani et al., "Bioisosterism: A Rational Approach in Drug Design", Chem Rev. (1996) 96:3147-3176.

Paterson et al., "Extended-Spectrum beta-Lactamases: a Clinical Update", Clin Microbiol Rev. (2005) 18(4):657-686.

Pellissier, H., "Recent developments in asymmetric cyclopropanation", Tetrahedron (2008) 64(30-31): 7041-7095.

Perez et al., "Why are we afraid of Acinetobacter baumannii?", Expert Rev Anti Infect Ther. (2008) 6(3): 269-71.

Pietruszka et al., "Enantiomerically pure cyclopropylamines from cyclopropylboronic esters", Eur J Org Chem. (2009) 34: 5998-6008.

Pine et al., "Resonance vs. Tautomerism" in Organic Chemistry; McGraw-Hill, New York 4th Ed. (1980), pp. 218-219.

Pintaric et al., "An Opportunity for Mg-Catalyzed Grignard-Type Reactions: Direct Coupling of Benzylic Halides with Pinacolborane with 10 mol % of Magnesium", J Am Chem Soc. (2010) 132(34): 11825-11827.

Queenan et al., "Carbapenemases: the Versatile B-Lactamases", Clin Microbiol Rev. (Jun. 2007) 20(3): 440-458.

Rehm et al., "Staphylococcus aureus: Methicillin-susceptible S. aureus to Methicillin-resistant S. aureus and Vancomycin-resistant S. aureus", Clin Inf Diseases. (2010) 51(S2):S176-S182.

Reich et al., "Organoselenium chemistry. Alkylation of acid, ester, amide, and ketone enolates with bromomethyl benzyl selenide and sulfide. Preparation of selenocysteine derivatives", J Organ Chem. (1986) 51(15): 2981-2988.

Reissig et al., "High diastereoselection in the alkylation of siloxy-substituted methyl cyclopropanecarboxylates: consequence of a pyramidal ester enolate anion?", J. Am. Chem. Soc. (1982) 104:1735-1737.

Rhoads et al., "The Claisen and Cope Rearrangements", Organic Reactions Chapter 1 (1975) 22: 1-166.

Robak et al., "Synthesis and applications of tert-butanesulfinamide", Chem Rev. (2010) 110(6):3600-3740.

Roche, E.B. (Ed.)., Bioreversible Carriers in Drug Design: Theory and Application. New York: Pergamon Press (1987); pp. 14-21.

Rodriguez-Martinez et al., "VIM-19, a Metallo-beta-lactamase with increased Carbapenemase Activity from Escherichia coli and Klebsiella pneumoniae", Antimicro Agents Chemother. (2010) 54(1):471-476.

Rosen et al., "Nickel-catalyzed cross-couplings involving carbon-oxygen bonds". Chem Rev. (2011) 111(3):1346-1416.

Rubino et al., "Phase 1 Study of the Safety, Tolerability, and Pharmacokinetics of Vaborbactam and Meropenem Alone and in Combination following Single and Multiple Doses in Healthy Adult Subjects", Antimicrob Agents Chemother. (Apr. 2018) 62(4): E02228-17; 12 pages.

Sabet et al., "In Vivo Efficacy of Carbavance (Meropenem/RPX7009) Against KPC-producingEnterobacteriaceae", Abstracts of the 54th Interscience Conference on Antimicrobial Agents and Chemotherapy (Sep. 5-9, 2014) F-958; 3 pages.

Sabet et al., "Activity of Simulated Human Dosage Regimens of Meropenem and Vaborbactam against Carbapenem-Resistant Enterobacteriaceae in an In Vitro Hollow-Fiber Model", Antimicrob Agents Chemother (2017) 62. pii: e01969-17. doi: 10.1128/AAC.01969-17.

Sabet et al., "Activity of Meropenem-Vaborbactam in Mouse Models of Infection Due to KPC-Producing Carbapenem-Resistant Enterobacteriaceae", Antimicrob Agents Chemother. (2017) 62:1 10e01446-379 17.

Saito et al., "Nickel-catalyzed boron insertion into the C2—O bond of benzofurans". J Am Chem Soc. (2016)., 138(47), 15315-15318 with Supporting Information in 103 pages.

Sawant et al., "Synthesis of the C1-C13 Fragment of Biselyngbyaside", Synlett (2011) 20: 3002-3004.

Sawyer et al., "Physical properties and synthetic utility of a-alkoxyorganolithium species as studied through ligand selectivity in tin-lithium exchange", J. Am. Chem. Soc. (1988) 110:842-853.

Schwarzer et al., "Combined theoretical and experimental studies of nickel-catalyzed cross-coupling of methoxyarenes with arylboronic esters via C-O bond cleavage". J Am Chem Soc. (2017) 139(30):10347-10358 with Suppl. Information in 255 pages.

Scriven et al., "Azides: Their preparation and synthetic uses", Chem Rev. (1988) 88(2): 297-368.

Selander et al., "Palladium-catalyzed allylic C—OH functionalization for efficient synthesis of functionalized allylsilanes", J Am Chem Soc. (2011) 133(3):409-411.

Shaffer, Robyn Kroop, "The Challenge of Antibiotic-Resistant *Staphylococcus*: Lessons from Hospital Nurseries in the mid-20th Century", Yale J Biol Med. (2013) 86:261-270.

Shao et al., "Asymmetric hydrogenation of 3,5-Dioxoesters catalyzed by Ru-binap complex: A short step asymmetric synthesis of 6-substituted 5,6-dehydro-2-pyrones", Tetrahedron (1993) 49(10):1997-2010.

Singer et al., "Catalytic, enantioselective acetate aldol additions to alpha-, beta-ynals: Preparation of optically active propargylic alcohols", Tetrahedron (1998) 54(25): 7025-7032.

Singh et al., "Asymmetric Homologation of Boronic Esters Bearing Azido and Silyloxy Substituents", J Org Chem. (2000) 65(20):6650-6653 and Erratum: J Org Chem. (2001) 66(22):7560.

Singh et al., "Confronting the challenges of discovery of novel antibacterial agents", Bioorg Med Chem Lett. (2014) 24(16):3683-3689.

Singhal et al., "Drug polymorphism and dosage form design: A practical perspective", Adv Drug Deliv Rev. Feb. 23, 2004;56(3): 335-347.

Sliwka et al., "Synthetic Sulfur Carotenoids II: Optically Active Carotenoid Thiols", Tetrahedron: Asymmetry (1993) 4(3):361-368.

Solladié et al., "First Stereocontrolled Synthesis of the (3S,5R,7R,10R,11R)-C1-C13 Fragment of Nystatin A(1)", J Org Chem. (1999) 64(15):5447-5452.

Souto et al., "Synthesis and biological characterization of the histone deacetylase inhibitor largazole and c7-modified analogues", J. Med. Chem. (2010) 53(12):4654-4667.

Spiegel et al., "CP-263, 114 synthetic studies. Construction of an isotwistane ring system via rhodium carbenoid C—H insertion", Tetrahedron (2002) 58:6545-6554.

Stivala et al., "Highly enantioselective direct alkylation of arylacetic acids with chiral lithium amides as traceless auxiliaries." J Am Chem Soc., (2011)133(31): 11936-11939.

Sumida et al., "Boron-selective biaryl coupling approach to versatile dibenzoxaborins and application to concise synthesis of defucogilvocarcin M", Org Ltt. (Dec. 2014) 16(23): 6240-6243.

Sun et al., "A method for the deprotection of alkylpinacolyl boronate esters", J Org Chem. (2011) 76(9): 3571-3575; Supporting Information, 8 pages.

Sun et al., "Programmed Synthesis of a Contiguous Stereotriad Motif by Triple Stereospecific Reagent-controlled Homologation", Org Lttr. (Jul. 2013) 15(17):4500-4503.

Tam et al., "Optimization of meropenem minimum concentration/MIC ratio to suppress in vitro resistance of Pseudomonas aeruginosa", Antimicrob Agents Chemother. (2005) 49(12): 4920-4927.

Tang et al., "New Chiral Phosphorus Ligands for Enantioselective Hydrogenation." Chem Rev. (2003) 103: 3029-3070.

Teo et al., "Efficient and highly aldehyde selective Wacker oxidation", Org Lett. (2012) 14(13):3237-3239.

Theuretzbacher et al., "Update on antibacterial and antifungal drugs—can we master the resistance crisis?", Curr Opin Pharmacol. (2011) 11:429-432.

Tobisu et al., "Nickel-catalyzed alkylative cross-coupling of anisoles with Grignard reagents via C—O bond activation". J Am Chem Soc. (2016) 138(47):6711 and Suppl. Information in 105 pages.

Ty et al., "Synthesis and biological evaluation of enantiomerically pure cyclopropyl analogues of combretastatin A4". Bioorg Med Chem (2013) 21:1357-1366.

(56) References Cited

OTHER PUBLICATIONS

U.S. Department of Health and Human Resources, "Antibiotic Resistance Threats in the United States, 2013"; 114 pages.
Valters et al., "Ring-Chain Tautomerism", Plenum Press, New York and London, Softcover reprint of the hardcover 1st Ed. 1985, Chapter 1, 23 pages.
Vanscoy et al., "Pharmacokinetics-pharmacodynamics of tazobactam in 386 combination with ceftolozane in an in vitro infection model", Antimicrob Agents Chemother. (2013) 57: 2809-2814. doi: 10.1128/AAC.02513-12.
Vasil'ev et al., (1977): STN International HCAPLUS database, Columbus (OH), accession No. 1977: 72730; 1 page.
Vitor et al., "Rhenium(I)- and technetium(I) tricarbonyl complexes anchored by bifunctional pyrazole-diamine and pyrazole-dithioether chelators", J Organometal Chem (2004) 689(25):4764-4774.
Voituriez et al., "Preparation of a storable zinc carbenoid species and its application in cyclopropanation, chain extension, and [2,3]-sigmatropic rearrangement reactions", J Org Chem. (2010) 75(4): 1244-1250; Supporting Information, 20 pages.
Waley, Stephen G., "A quick method for the determination of inhibition constants", Biochem J. (1982) 205(3):631-633.
Walker et al., "Pharmacodynamic activities of meropenem in an animal infection model", (1994), Abstracts of Papers #A91, 34th Interscience Conference on Antimicrobial Agents and Chemotherapy, Orlando, FL., 5 pages.
Walsh et al., "Metallo-beta-Lactamases: the Quiet before the Storm?", Clin Microbiol Rev. (2005) 18(2):306-325.
Wang et al., "Recognition and resistance in TEM beta-lactamase", Biochemistry (2003) 42(28):8434-8444.
Webb et al., "Metal catalysed hydroboration of vinyl sulfides, sulfoxides, sulfones, and sulfonates", J Mol Cat A: Chem. (2007) 275:91-100.
Wenkert et al., "Nickel-induced conversion of carbon-oxygen into carbon-carbon bonds. One-step transformations of enol ethers into olefins and aryl ethers into biaryls".(1979) 101(8):2246-2247.
Wilson D.N., "The A-Z of bacterial translation inhibitors", Crit Rev Biochem Mol Biolog. (2009) 44(6):393-433.
Wohlrab et al., "Total synthesis of plusbacin A3: a depsipeptide antibiotic active against vancomycin-resistant bacteria", J. Am. Chem. Soc. (2007) 129:4175-4177.
Wong et al., "A chemoselective Reformatsky-Negishi approach to α-haloaryl esters", Tetrahedron (2014) 70(7): 1508-1515.
Xia et al., "Synthesis and SAR of novel benzoxaboroles as a new class of beta-lactamase inhibitors", Bioorg Med Chem Lett. (2011) 21:2533-2536.
Xie et al., "Group-assisted purification (GAP) chemistry for the synthesis of Velcade via asymmetric borylation of N-phosphinylimines", Beilstein J Org Chem (Mar. 2014) 10:746-751.
Yamamoto et al., "Iridium-catalyzed hydroboration of alkenes with pinacolborane", Tetrahedron (2004) 60:10695-10700.
Yanagisawa et al., "Nonpeptide angiotensin II receptor antagonists: synthesis, biological activities, and structure-activity relationships of imidazole-5-carboxylic acids bearing alkyl, alkenyl, and hydroxyalkyl substituents at the 4-position and their related compounds", J Med Chem. (1996) 39(1):323-338.
Yuen et al., "Deprotection of pinacolyl boronate esters via hydrolysis of intermediate potassium trifluoroborates", Tetrahed Lttr. (2005) 46(46):7899-7903.
Zhang et al., "Catalytic boracarboxylation of alkynes with diborane and carbon dioxide by an N-heterocyclic carbene copper catalyst." J Am Chem Soc. (2012) 134(35): 14314-14317.
Zhu et al., "Design, preparation, x-ray crystal structure, and reactivity of o-alkoxyphenyliodonium bis(methoxycarbonyl)methanide, a highly soluble carbene precursor", Org Lett. (2012) 14(12): 3170-3173; Supporting Information, 76 pages.
Hecker et al., "Discovery of Cyclic Boronic Acid QPX7728, an Ultrabroad-Spectrum Inhibitor of Serine and Metallo-β-lactamases", J Med Chem. (Mar. 2020) 63: 7491-7507.
Nema et al., "Excipients and Their Role in Approved Injectable Products: Current Usage and Future Directions", Pda J Pharm Sci Technol. (2011) 65(3):287-332.
Powell et al., "Compendium of excipients for parenteral formulations", PDA J Pharm Sci Technol. (1998) 52(5):238-311.
International Search Report and Written Opinion dated Jul. 29, 2021 for International Application No. PCT/US2021/030690, filed May 4, 2021.
International 2nd Written Opinion dated Mar. 29, 2022 for International Application No. PCT/US2021/030690, filed May 4, 2021.

BORONIC ACID DERIVATIVES AND SYNTHESIS, POLYMORPHIC FORMS, AND THERAPEUTIC USES THEREOF

STATEMENT REGARDING FEDERALLY SPONSORED R&D

This invention was made with U.S. government support under the Department of Health and Human Services Contract No. HHSO100201600026C. The U.S. government has certain rights in the invention.

BACKGROUND

Field

The present application relates to the fields of chemistry and medicine. More particularly, the present application relates to boronic acid antimicrobial compounds, compositions, their preparation, and their use as therapeutic agents.

Description of the Related Art

Antibiotics have been effective tools in the treatment of infectious diseases during the last half-century. From the development of antibiotic therapy to the late 1980s there was almost complete control over bacterial infections in developed countries. However, in response to the pressure of antibiotic usage, multiple resistance mechanisms have become widespread and are threatening the clinical utility of anti-bacterial therapy. The increase in antibiotic resistant strains has been particularly common in major hospitals and care centers. The consequences of the increase in resistant strains include higher morbidity and mortality, longer patient hospitalization, and an increase in treatment costs.

Various bacteria have evolved β-lactam deactivating enzymes, namely, β-lactamases, that counter the efficacy of the various β-lactam antibiotics. β-lactamases can be grouped into 4 classes based on their amino acid sequences, namely, Ambler classes A, B, C, and D. Enzymes in classes A, C, and D include active-site serine β-lactamases, and class B enzymes, which are encountered less frequently, are Zn-dependent. These enzymes catalyze the chemical degradation of β-lactam antibiotics, rendering them inactive. Some β-lactamases can be transferred within and between various bacterial strains and species. The rapid spread of bacterial resistance and the evolution of multi-resistant strains severely limits β-lactam treatment options available.

The increase of class D β-lactamase-expressing bacterium strains such as *Acinetobacter baumannii* has become an emerging multidrug-resistant threat. *A. baumannii* strains express A, C, and D class β-lactamases. The class D β-lactamases such as the OXA families are particularly effective at destroying carbapenem type β-lactam antibiotics, e.g., imipenem, the active carbapenems component of Merck's Primaxin® (Montefour, K. et al., Crit. Care Nurse 2008, 28, 15; Perez, F. et al., Expert Rev. Anti Infect. Ther. 2008, 6, 269; Bou, G.; Martinez-Beltran, J., Antimicrob. Agents Chemother. 2000, 40, 428. 2006, 50, 2280; Bou, G. et al., J. Antimicrob. Agents Chemother. 2000, 44, 1556). This has imposed a pressing threat to the effective use of drugs in that category to treat and prevent bacterial infections. Indeed the number of catalogued serine-based β-lactamases has exploded from less than ten in the 1970s to over 300 variants. These issues fostered the development of five "generations" of cephalosporins. When initially released into clinical practice, extended-spectrum cephalosporins resisted hydrolysis by the prevalent class A β-lactamases, TEM-1 and SHV-1. However, the development of resistant strains by the evolution of single amino acid substitutions in TEM-1 and SHV-1 resulted in the emergence of the extended-spectrum β-lactamase (ESBL) phenotype.

New β-lactamases have recently evolved that hydrolyze the carbapenem class of antimicrobials, including impipenem, biapenem, doripenem, meropenem, and ertapenem, as well as other β-lactam antibiotics. These carbapenemases belong to molecular classes A, B, and D. Class A carbapenemases of the KPC-type predominantly in *Klebsiella pneumoniae* but now also reported in other Enterobacteriaceae, *Pseudomonas aeruginosa* and *Acinetobacter baumannii*. The KPC carbapenemase was first described in 1996 in North Carolina, but since then has disseminated widely in the US. It has been particularly problematic in the New York City area, where several reports of spread within major hospitals and patient morbidity have been reported. These enzymes have also been recently reported in France, Greece, Sweden, United Kingdom, and an outbreak in Germany has recently been reported. Treatment of resistant strains with carbapenems can be associated with poor outcomes.

The zinc-dependent class B metallo-β-lactamases are represented mainly by the VIM, IMP, and NDM types. IMP and VIM-producing *K. pneumonia* were first observed in 1990s in Japan and 2001 in Southern Europe, respectively. IMP-positive strains remain frequent in Japan and have also caused hospital outbreaks in China and Australia. However, dissemination of IMP-producing Enterobacteriaceae in the rest of the word appears to be somewhat limited. VIM-producing enterobacteria can be frequently isolated in Mediterranean countries, reaching epidemic proportions in Greece. Isolation of VIM-producing strains remains low in Northern Europe and in the United States. In stark contrast, a characteristic of NDM-producing *K. pneumonia* isolates has been their rapid dissemination from their epicenter, the Indian subcontinent, to Western Europe, North America, Australia and Far East. Moreover, NDM genes have spread rapidly to various species other than *K. pneumonia*.

The plasmid-expressed class D carbapenemases belong to OXA-48 type. OXA-48 producing *K. pneumonia* was first detected in Turkey, in 2001. The Middle East and North Africa remain the main centers of infection. However, recent isolation of OXA-48-type producing organisms in India, Senegal and Argentina suggest the possibility of a global expansion. Isolation of OXA-48 in bacteria other than *K. pneumonia* underlines the spreading potential of OXA-48.

Treatment of strains producing any of these carbapenemases with carbapenems can be associated with poor outcomes.

Another mechanism of β-lactamase mediated resistance to carbapenems involves combination of permeability or efflux mechanisms combined with hyper production of beta-lactamases. One example is the loss of a porin combined in hyperproduction of ampC β-lactamase results in resistance to imipenem in *Pseudomonas aeruginosa*. Efflux pump over expression combined with hyperproduction of the ampC β-lactamase can also result in resistance to a carbapenem such as meropenem.

New β-lactamase inhibitors (BLIs) have recently been described. However, there is a need for efficient methods of synthesizing these BLIs.

SUMMARY OF THE INVENTION

In some embodiments, provided herein is a crystalline form of Compound I':

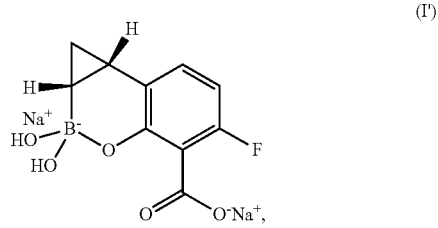

(I')

or a solvate thereof. In some embodiments, the crystalline form of Compound I' may exhibit an X-ray powder diffraction pattern comprising at least one characteristic peak, wherein said characteristic peak is selected from the group consisting of approximately 6.2, 11.7, 12.4, 12.8, 16.7, 17.6, 19.1, 20.2, 20.6, 21.7, 22.0, 22.7, and 24.7 degrees 2θ. In some embodiments, the crystalline form of Compound I' may exhibit an X-ray powder diffraction pattern comprising at least three characteristic peaks, wherein said characteristic peaks are selected from the group consisting of 6.2, 11.7, 12.4, 12.8, 16.7, 17.6, 19.1, 20.2, 20.6, 21.7, 22.0, 22.7, and 24.7 degrees 2θ.

In some embodiments, the crystalline form of Compound I' may have an endotherm at about 142° C. and at about 167° C. In some embodiments, the crystalline form has an endotherm at about 152° C.

In some embodiments, the crystalline form of Compound I' may be a hydrate. In some embodiments, the crystalline form of Compound I' may be a monohydrate.

In other embodiments, provided herein is a method of making a compound of Formula (A-II) or pharmaceutically acceptable salt thereof,
comprising the step of:

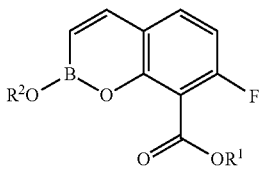

Formula (A-II)

reacting a compound of Formula (A-I)

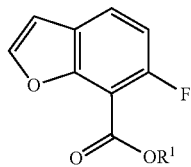

with a borylating agent in a solvent system, in the presence of a nickel catalyst and a base system
wherein
$R^1$ may be a carboxylic acid protecting group;
$R^2$ may be hydrogen or $C_1$-$C_6$ alkyl; and
the solvent system and base system may be selected from the group consisting of: THF and CsOH·H$_2$O, respectively; THF/H$_2$O and Cs$_2$CO$_3$, respectively; ethanol and CsOH·H$_2$O, respectively; THF/ethanol and Cs$_2$CO$_3$, respectively; 2-methyl tetrahydrofuran (MeTHF) and CsOH·H$_2$O, respectively; MeTHF/H$_2$O and Cs$_2$CO$_3$, respectively; MeTHF/ethanol and Cs$_2$CO$_3$, respectively; THF and a mixture of Cs$_2$CO$_3$ and K$_2$CO$_3$, respectively; MeTHF and a mixture of Cs$_2$CO$_3$ and K$_2$CO$_3$, respectively; THF/H$_2$O and a mixture of Cs$_2$CO$_3$ and K$_2$CO$_3$, respectively; MeTHFH$_2$O and a mixture of Cs$_2$CO$_3$ and K$_2$CO$_3$, respectively; and MeTHF/ethanol and a mixture of Cs$_2$CO$_3$ and K$_2$CO$_3$, respectively.

In some embodiments the carbonate base can be a mixture of Cs$_2$CO$_3$ and K$_2$CO$_3$. In some embodiments the cesium to potassium carbonate base molar ratio may be from about 1:2 to 2:1. In some embodiments the cesium to potassium carbonate base molar ratio may be from 1.5:1, 1.6:1, 1.7:1 or 1.8:1, or within a range defined by any of the aforementioned ratios.

In some embodiments, the molar ratio of base system to the compound of formula (A-I) may be from about 1:1 to about 5:1. In some embodiments, the molar ratio of base system to the compound of formula (A-I) may be about 3:1, 2:1, 1.5:1 or 1:1.

In some embodiments, the bases in the base system may be milled. In other embodiments, the bases in the base system may be granular.

In some embodiments, the solvent system may be THF/H$_2$O 5% v/v and the base system may be Cs$_2$CO$_3$. In other embodiments, the solvent system may THF/ethanol 5% v/v and the base system may be Cs$_2$CO$_3$.

In some embodiments, the solvent system may be MeTHF/H$_2$O 5% v/v and the base system may be Cs$_2$CO$_3$. In other embodiments, the solvent system may MeTHF/ethanol 5% v/v and the base system may be Cs$_2$CO$_3$.

In some embodiments, the ratio of borylating agent to the compound of formula (A-I) is from about 1:1 to about 2:1. In some embodiments, the ratio of borylating agent to the compound of formula (A-I) is about 1.5:1. In some embodiments, the ratio of borylating agent to the compound of formula (A-I) is about 1.25:1.

In some embodiments, the borylating agent may be selected from the group consisting of (HO)$_2$B—B(OH)$_2$, B$_2$(Pin)$_2$, B$_2$(Cat)$_2$, and B$_2$neop$_2$. In some embodiments, the borylating agent may be B$_2$(Pin)$_2$.

In some embodiments, the nickel catalyst precursor and ligand are combined to form the nickel catalyst prior to reacting the compound of Formula (A-I) with a borylating agent in a solvent system and a base system. In other embodiments, the nickel catalyst precursor and ligand combine to form the nickel catalyst while in the presence of compound of Formula (A-I) with a borylating agent in a solvent system and a base system.

In some embodiments the Ni catalyst precursor may be selected from the group consisting of NiCl$_2$, Ni(Acac)$_2$, and Ni(COD)$_2$.

In some embodiments, the Ni catalyst precursor may be NiCl$_2$. In some embodiments, the ligand may be selected from the group consisting of NHC ligand, phosphine, phosphite, phosphoramidite, amine, alcohol, aminoalcohol, and a combination thereof. In some embodiments, the ligand may be P(Octyl)$_3$, diPrf, dcype, P(n-propyl)$_3$, or P(n-Bu)$_3$. In some embodiments, the ligand may be P(n-Bu)$_3$.

In some embodiments, the nickel catalyst may be NiCl$_2$(PPh$_3$)$_2$, NiCl$_2$(PCy$_2$Ph)$_2$, NiCl$_2$(PPh$_2$CH$_2$CH$_2$PPh$_2$), NiCl$_2$(1,3-Bis(diphenylphosphino)propane), NiCl$_2$(1,3-Bis(diphenylphosphino)ethane), or $NiCl_2(P(n-Bu)_3)_2$. In some specific embodiments, the nickel catalyst is $NiCl_2(P(n-Bu)_3)_2$.

In some embodiments, the organoboron intermediate of Formula (A-II) may be reacted with (+)-pseudoephedrine as a chiral auxiliary to form an organoboron intermediate of Formula (A-III)

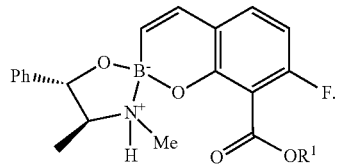

In some embodiments, the organoboron intermediate of Formula (A-III) may be converted to an organoboron intermediate of Formula (A-IV)

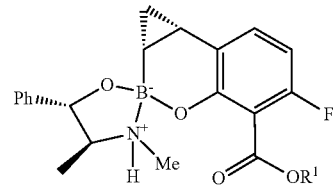

in the presence of a cyclopropanating agent and optional catalyst.

In some embodiments, the cyclopropanating agent comprises $CH_2I_2$ and Zn/Cu couple. In some embodiments, the cyclopropanating agent comprises $CH_2Br_2$, Zn and CuCl. In some embodiments, the cyclopropanating agent comprises $ZnEt_2$ and $CH_2I_2$.

In some embodiments, the cyclopropanating agent is $CH_2N_2$ and the catalyst may be a palladium catalyst. In some embodiments, the palladium catalyst may be $Pd(OAc)_2$. In other embodiments, the palladium catalyst may be $Pd_2(DVTMS)_3$ (DVTMS=1,3-divinyl-1,1,3,3 tetramethyldisiloxane). In some embodiments, the palladium catalyst may be $Pd(acac)_2$. In some embodiments, the palladium catalyst may be $Pd(TFA)_2$. In some embodiments, the palladium catalyst may be $Pd(OPiv)_2$.

In some embodiments, the compound of Formula (A-IV) may be hydrolyzed to form Compound I:

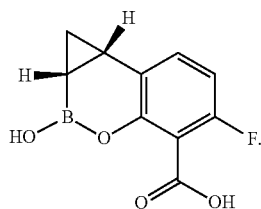

(I)

In some embodiments, the organoboron intermediate of Formula (A-II) may be reacted with a chiral auxiliary of Formula (Aux-I):

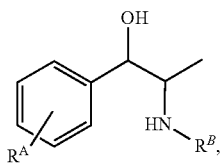

AuX-I or stereoisomers thereof, to form an organoboron intermediate of Formula (B-III)

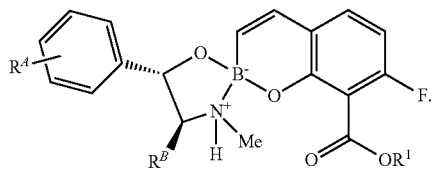

In some embodiments, $R^A$ may be hydrogen. In some embodiments, $R^A$ may be halogen. In other embodiments, $R^A$ may be $C_{1-6}$ alkyl. In some specific embodiments, $R^A$ may be methyl. In some embodiments, $R^B$ may be $C_{1-6}$ alkyl. In some embodiments, $R^B$ may be methyl. In other embodiments, $R^B$ may be ethyl. In yet other embodiments, $R^B$ may be isopropyl. In some embodiments, the organoboron intermediate of Formula (B-III) is

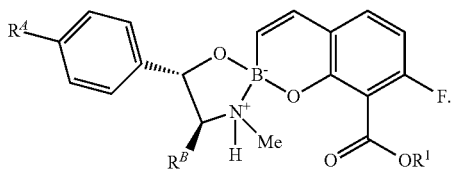

In some embodiments, the compound of Formula (B-III) has the structure of compound A-3:

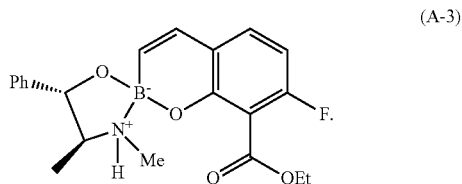 [SMILES: CCOC(=O)c1c(F)ccc2c1O[B-]1(C=C2)O[C@@H](c2ccccc2)[C@H](C)[NH+]1C]

(A-3)

In some embodiments, the chiral auxiliary is not (+)-pseudoephedrine.

In some embodiments, the organoboron intermediate of Formula (B-III) may be converted to an organoboron intermediate of Formula (B-IV)

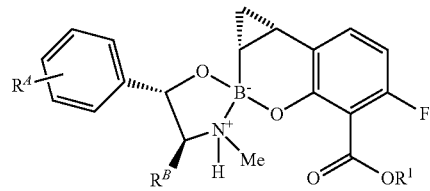

in the presence of a cyclopropanating agent and optional catalyst. In some embodiments, the organoboron intermediate of Formula (B-IV) is

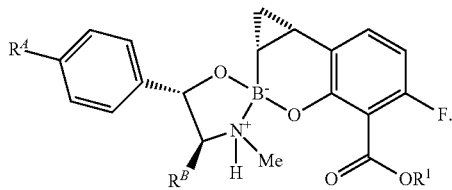

In some specific embodiments, the organoboron intermediate of Formula (B-IV) is

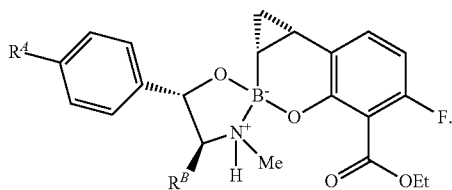

In some embodiments, the cyclopropanating agent comprises $CH_2I_2$ or $CH_2Br_2$; and one or more metal compounds. In some embodiments, the cyclopropanating reagent comprises $CH_2I_2$. In other embodiments, the cyclopropanating reagent comprises $CH_2Br_2$. In some embodiments the metal compound comprises one or more metals selected from the group consisting of zinc, copper, samarium, aluminum, and silver. In some specific embodiments, the metal compound may be Zn/Cu couple, Zn/Ag couple, Sm/Hg couple, $ZnEt_2$, or a mixture of zinc and CuCl.

In some embodiments, the cyclopropanating agent comprises $CH_2I_2$ and Zn/Cu couple. In some embodiments, the cyclopropanating agent comprises $CH_2Br_2$, Zn and CuCl. In some embodiments, the cylopropanating agent comprises $ZnEt_2$ and $CH_2I_2$.

In some embodiments, the cyclopropanating agent is $CH_2N_2$ and the catalyst may be a palladium catalyst. In some embodiments, the palladium catalyst may be $Pd(OAc)_2$. In other embodiments, the palladium catalyst may be $Pd_2(DVTMS)_3$ (DVTMS=1,3-divinyl-1,1,3,3-tetramethyldisiloxane). In sone embodiments, the palladium catalyst may be $Pd(acac)_2$. In some embodiments, the palladium catalyst may be $Pd(TFA)_2$. In some embodiments, the palladium catalyst maya be $Pd(OPiv)_2$.

In some embodiments, the chiral auxiliary may be a compound having the formula

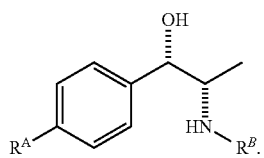

In some embodiments, the compound of Formula (B-IV) may be hydrolyzed to form Compound I.

In some embodiments, the method disclosed herein may comprise converting the organoboron intermediate of Formula (B-IV) to the organoboron intermediate of Formula (B-V)

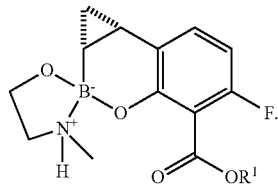

In some embodiments, the method may further comprise the step of hydrolyzing the compound of Formula (B-IV) or Formula (B-V) to form Compound I:

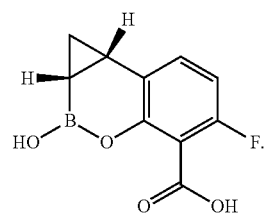

In some embodiments, $R^1$ may be $C_{1-6}$ alkyl. In some embodiments, $R^1$ may be ethyl.

In some embodiments, the method described herein may include the step of washing the compound of Formula (B-IV) or Formula (B-V) with aqueous acid prior to hydrolysis to form Compound I'.

In some embodiments, the method described herein may comprise the step of hydrolyzing the compound of Formula (A-IV), Formula (B-IV), or Formula (B-V) in the presence of a base to form crude Compound I'

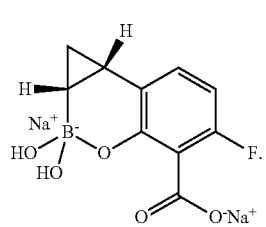

In some embodiments, $R^1$ may be $C_{1-6}$ alkyl. In other embodiments, $R^1$ may be ethyl. In some embodiments, the base may aqueous sodium hydroxide.

In some embodiments, the method disclosed herein the step of hydrolyzing the compound of Formula (A-IV) may performed at a temperature of from about 50° C. to about 70° C. In some embodiments, the step of hydrolyzing the compound of Formula (A-IV) may be performed at a temperature of about 60° C. In some embodiments, the step of hydrolyzing the compound of Formula (A-IV) may performed for from about 30 minutes to about 6 hours.

In some embodiments, the method disclosed herein may further comprise the step of treating crude Compound I' with an ion exchange resin to achieve a pH of from about 9 to about 10.5. In some embodiments, crude Compound I' may be treated with an ion exchange resin to achieve a pH of about 9.8.

In some embodiments, the method may comprise further filtering off the ion exchange resin to form an aqueous filtrate. In some embodiments, the aqueous filtrate may be concentrated in vacuo to form a concentrated aqueous filtrate. In some embodiments, the aqueous filtrate may concentrated in vacuo at a temperature of from about 20° C. to about 60° C.

In some embodiments, the concentrated aqueous filtrate may added to methyl ethyl ketone to form a crystallization solution. In some embodiments, the crystallization solution may comprise from 1.0% to 5.0% water by weight relative to the quantity of methyl ethyl ketone. In some embodiments, the crystallization solution may comprise from 2.5% to 4.5% water by weight relative to the quantity of methyl ethyl ketone.

In some embodiments, the method may comprise crystallizing Compound I' in the crystallization solution to form crystallized Compound I'. In some embodiments, the crystallized Compound I' may be filtered and dried in vacuo. In some embodiments, the crystallized Compound I' may filtered and dried in vacuo at a pressure of from about 100 mbar to about 500 mbar to form Compound I' monohydrate. In some specific embodiments, the crystallized Compound I' may be filtered and dried in vacuo at a pressure of 100 mbar to form Compound I' monohydrate.

In some embodiments, provided herein is a crystalline form of compound A-3:

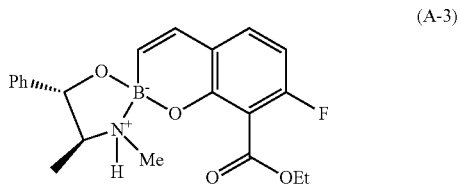 [SMILES: CCOC(=O)c1c(F)ccc2c1O[B-]1(C=C2)O[C@@H](c2ccccc2)[C@H](C)[NH+]1C]

(A-3)

or a solvate thereof.

In some embodiments, the crystalline form of compound A-3 may exhibit an X-ray powder diffraction pattern comprising at least one characteristic peak, wherein said characteristic peak is selected from the group consisting of approximately 7.6. 8.0, 10.4, 13.7, 14.0, 16.0, 16.3, 19.0, 20.9, 23.2, 23.4, and 24.4 degrees 2θ. In some embodiments, the crystalline form of compound A-3 may exhibit an X-ray powder diffraction pattern comprising at least three characteristic peaks, wherein said characteristic peaks are selected from the group consisting of 7.6. 8.0, 10.4, 13.7, 14.0, 16.0, 16.3, 19.0, 20.9, 23.2, 23.4, and 24.4 degrees 2θ.

In some embodiments, the crystalline form of compound A-3 may have a melting point of about 194° C.

In some embodiments, the crystalline form of compound A-3 may be anhydrous.

In some embodiments, provided herein is crystalline form of a compound of Formula (A-4):

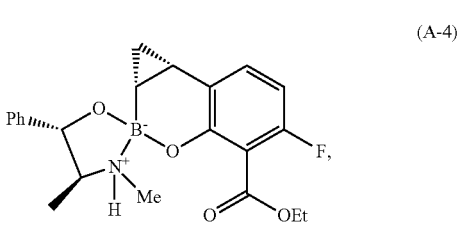 [SMILES: CCOC(=O)c1c(F)ccc2c1O[B-]1(O[C@@H](c3ccccc3)[C@H](C)[NH+]1C)[C@@H]1C[C@H]21]

(A-4)

or a solvate thereof.

In some embodiments, the crystalline form may exhibit an X-ray powder diffraction pattern comprising at least one characteristic peak, wherein said characteristic peak is selected from the group consisting of approximately 7.4, 8.9, 10.7, 11.2, 11.5, 12.8, 13.7, 15.3, 17.0, 17.7, 18.7, 20.1, 21.4, and 22.6 degrees 2θ. In some embodiments, the crystalline form exhibits an X-ray powder diffraction pattern comprising at least three characteristic peaks, wherein said characteristic peaks are selected from the group consisting of 7.4, 8.9, 10.7, 11.2, 11.5, 12.8, 13.7, 15.3, 17.0, 17.7, 18.7, 20.1, 21.4, and 22.6 degrees 2θ.

In some embodiments, the crystalline form of compound (A-3) may have an endotherm at about 176° C.

In some embodiments, the crystalline form compound (A-3) may be unsolvated. In some embodiments the crystalline form of compound (A-3) may exhibit an X-ray powder diffraction pattern comprising at least one characteristic peak, wherein said characteristic peak is selected from the group consisting of approximately 7.4, 7.9, 9.1, 11.1, 12.0, 13.7, 14.4, 15.8, 16.4, 17.6, 19.8, 20.9, and 22.8 degrees 2θ. In some embodiments, the crystalline form of compound (A-3) may exhibit an X-ray powder diffraction pattern comprising at least three characteristic peaks, wherein said characteristic peaks are selected from the group consisting of 7.4, 7.9, 9.1, 11.1, 12.0, 13.7, 14.4, 15.8, 16.4, 17.6, 19.8, 20.9, and 22.8 degrees 2θ.

In some embodiments, provided herein compound I' is

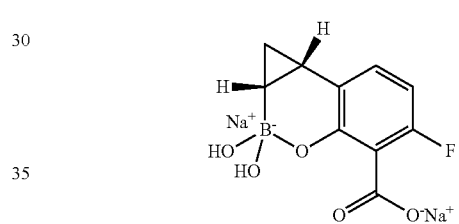

monohydrate.

In some embodiments, provided herein is a compound of Formula (A-IV):

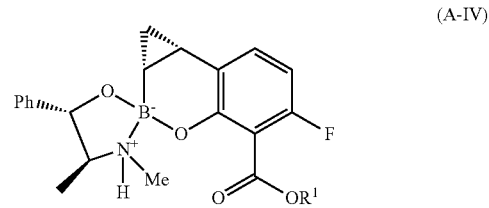

(A-IV)

or a pharmaceutically acceptable salt or solvate thereof. In some embodiments, $R^1$ may be $C_{1-6}$ alkyl.

In some embodiments, the compound may be Compound (A-4)

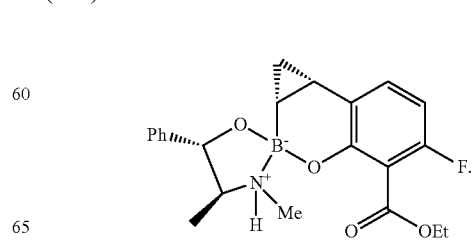

Some embodiments provide a crystalline form of the compound of Compound A-4

In some embodiments, provided herein is a compound of Formula (B-III):

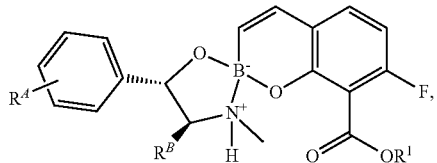

B-III or a pharmaceutically acceptable salt or solvate thereof, wherein $R^A$ is $C_{1-6}$ alkyl or halogen; $R^B$ is hydrogen or $C_{1-6}$ alkyl; and $R^1$ is $C_{1-6}$ alkyl.

In some embodiments, provided herein is a compound of Formula (B-IV):

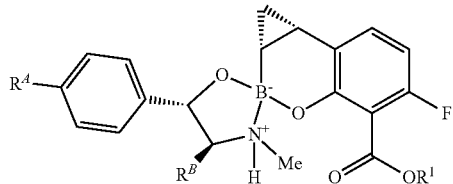

(B-IV)

or a pharmaceutically acceptable salt or solvate thereof, wherein $R^A$ may be $C_{1-6}$ alkyl; $R^B$ may $C_{1-6}$ alkyl; and $R^1$ may $C_{1-6}$ alkyl.

In some embodiments, $R^A$ may be methyl.

In some embodiments, $R^B$ may be methyl. In other embodiments, $R^B$ may be ethyl.

In some embodiments, $R^1$ may be $C_{1-6}$ alkyl. In some embodiments, $R^1$ may be ethyl.

In some embodiments, the compound of Formula (B-IV) may be

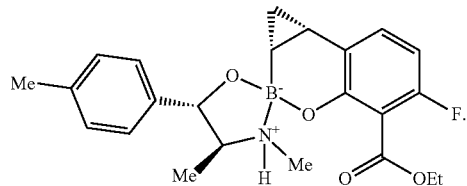 [SMILES: CCOC(=O)c1c(F)ccc2c1O[B-]1(O[C@@H](c3ccc(C)cc3)[C@H](C)[NH+]1C)[C@@H]1C[C@H]21]

In some embodiments, the compound of Formula (B-IV) may be

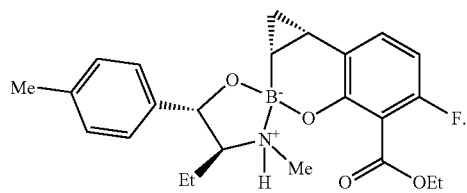 [SMILES: CCOC(=O)c1c(F)ccc2c1O[B-]1(O[C@@H](c3ccc(C)cc3)[C@H](CC)[NH+]1C)[C@@H]1C[C@H]21]

In some embodiments, provided herein is a compound of the Formula (B-V):

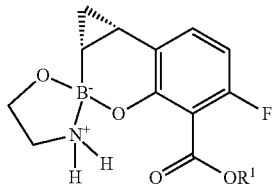

B-V (B-V), or a pharmaceutically acceptable salt or solvate thereof, wherein $R^1$ is $C_{1-6}$ alkyl. In some embodiments, the compound of Formula B-V is

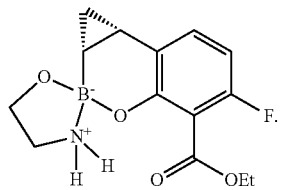 [SMILES: CCOC(=O)c1c(F)ccc2c1O[B-]1([NH2+]CCO1)[C@@H]1C[C@H]21]

DETAILED DESCRIPTION OF EMBODIMENTS

Figure 1:
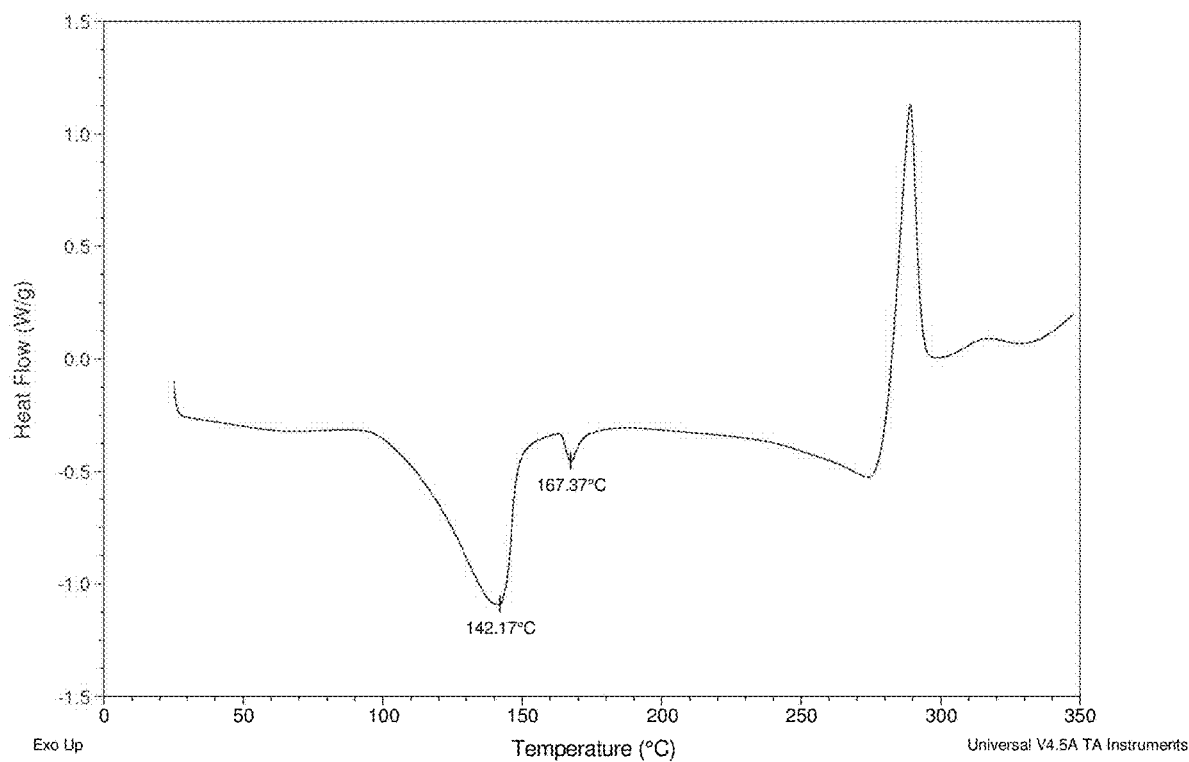
FIG. 1 shows a differential scanning calorimetry (DSC) analysis for crystalline Form A of Compound I'.

Compound I and pharmaceutically acceptable salts thereof are described in International Application PCT/US2017/039787, which is incorporated herein by reference in its entirety. Compound I is a β-lactamase inhibitor effective in treating bacterial infections when used in combination with β-lactam antibiotics.

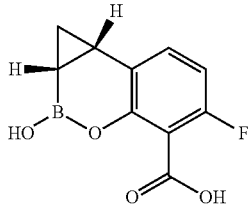

Compound I

Disclosed herein is a crystalline form of the disodium salt of Compound I and methods of crystallizing the disodium salt of Compound I. The disodium salt of Compound I is shown below and will herein be referred to as Compound I':

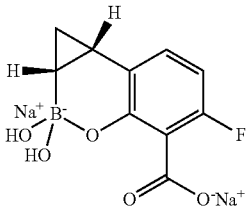

Compound I'

The present application relates to solid forms of Compound I'. In some embodiments, Compound I' may be crystalline. In other embodiments, Compound I' may be amorphous. In some embodiments, the crystalline form of Compound I' may be crystalline Form A. The present application also relates to the method using the various crystalline forms of Compound I', particularly crystalline Form A, for treating diseases and disorders by administering to a patient a therapeutically effective amount of a composition comprising one or more crystalline forms of a compound I', and one or more pharmaceutically acceptable excipients.

Crystalline Forms of Compound I'

Disclosed herein are crystalline forms of Compound I', and in particular crystalline Form A (described below).

Crystalline Form A of Compound I'

Some embodiments include a crystalline form of Compound I', referred to herein as crystalline Form A of Compound I'. The precise conditions for forming crystalline Form A of Compound I' may be empirically determined and it is only possible to give a number of methods which have been found to be suitable in practice.

Crystalline Form A of Compound I' was characterized using various techniques which are described in further detail in the experimental methods section. Crystalline Form A of Compound I', which may be obtained by the methods disclosed herein, exhibits prominent peaks at approximately 6.2, 11.7, 12.4, 12.8, 16.7, 17.6, 19.1, 20.2, 20.6, 21.7, 22.0, 22.7, and 24.7 degrees 2θ. Thus, in some embodiments, a crystalline form of Compound I' has at least one characteristic peak (e.g., one, two, three, four, five, six, seven, eight, nine, ten, eleven, twelve, or thirteen characteristic peaks) selected from approximately 6.2, 11.7, 12.4, 12.8, 16.7, 17.6, 19.1, 20.2, 20.6, 21.7, 22.0, 22.7, and 24.7 degrees 2θ. In some embodiments, a crystalline form of Compound I' has at least three characteristic peaks selected from approximately 6.2, 11.7, 12.4, 12.8, 16.7, 17.6, 19.1, 20.2, 20.6, 21.7, 22.0, 22.7, and 24.7 degrees 2θ.

As is well understood in the art, because of the experimental variability when X-ray diffraction patterns are measured on different instruments, the peak positions are assumed to be equal if the two theta (2θ) values agree to within a certain degree of variability. For example, the United States Pharmacopeia states that if the angular setting of the 10 strongest diffraction peaks agree to within ±0.2 degrees with that of a reference material, and the relative intensities of the peaks do not vary by more than 20%, the identity is confirmed. Accordingly, in some embodiments, peak positions recited herein include variability within ±0.5 degrees 2θ. In other embodiments, peak positions recited herein include variability within ±0.2 degrees 2θ. As disclosed herein, the term "approximately" when referring to values of 2θ is defined as ±0.5 degrees 2θ.

FIG. 1 shows results obtained by differential scanning calorimetry (DSC) for crystalline Form A of Compound I'. The DSC results indicate endotherms of about 142° C. and 167° C. for crystalline Form A of Compound I'. Accordingly, in some embodiments, crystalline Form A of Compound I' exhibits an endotherm from about 139° C. to 145° C., from about 140° C. to about 144° C., or at about 142° C. In some embodiments, crystalline Form A of Compound I' exhibits an endotherm from about 164° C. to 170° C., from about 165° C. to about 169° C., or at about 167° C. Melting point analysis indicates that crystalline Form A of Compound I' decomposes at about 270° C., prior to melting.

Figure 2:
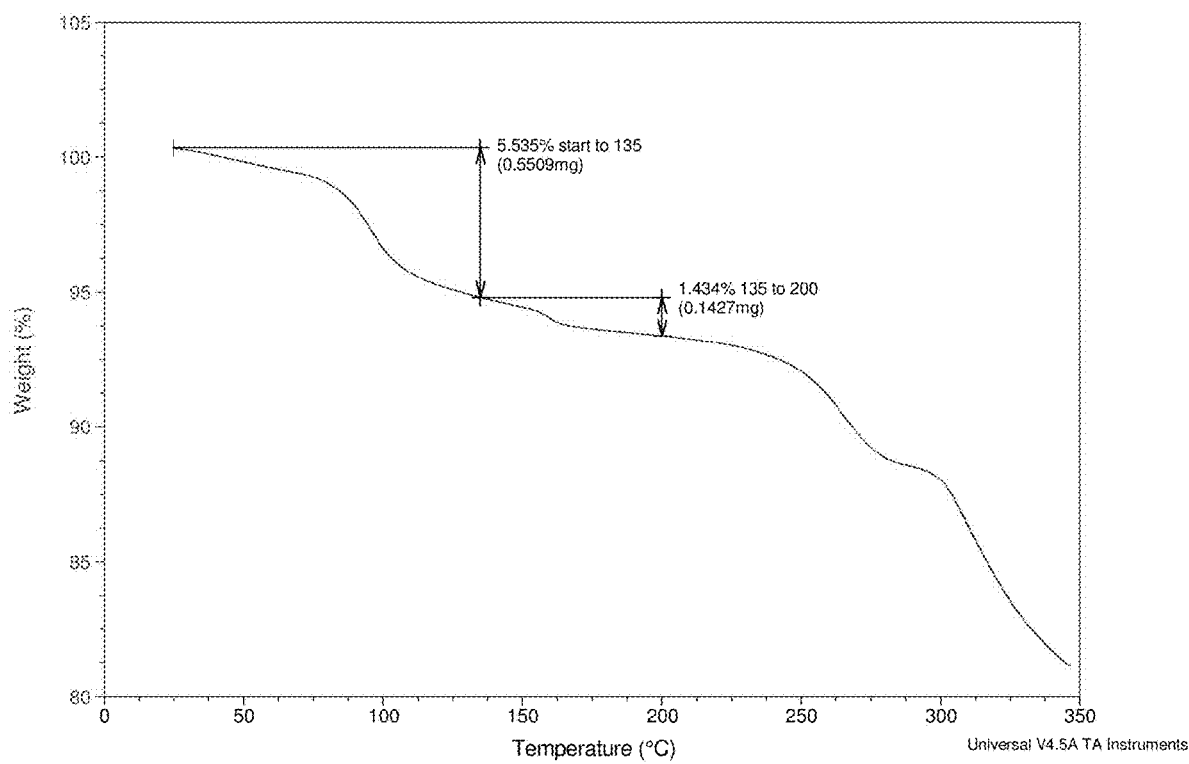
FIG. 2 shows thermogravimetric analysis (TGA) results for crystalline Form A of Compound I'.
Figure 3:
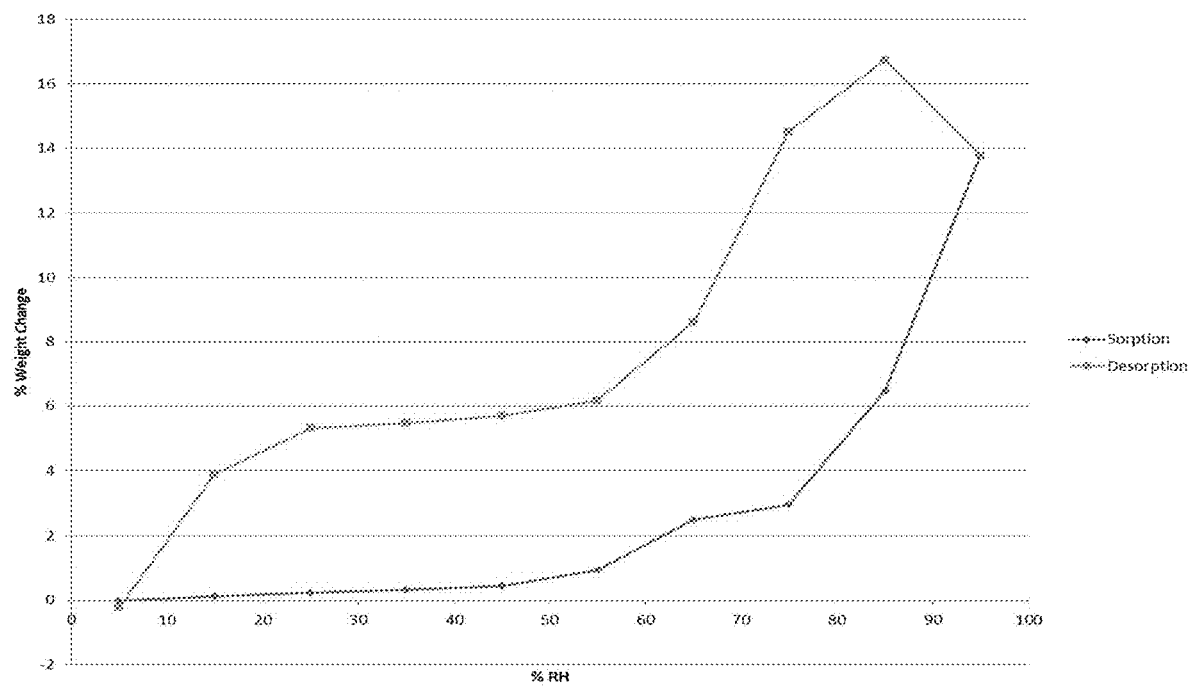
FIG. 3 shows dynamic vapor sorption (DVS) results for crystalline Form A of Compound I'

FIG. 2 shows results obtained by thermogravimetric analysis (TGA) for crystalline Form A of Compound I'. The TGA results show that crystalline Form A of Compound I' exhibited at 5.5% weight loss when carried from 25° C. to 135° C., and a 1.43% weight loss from 135° C. to 200° C. Meanwhile, FIG. 3 shows dynamic vapor sorption (DVS) results for crystalline Form A of Compound I', and shows significant water uptake and indicates that crystalline Form A of Compound I' is hygroscopic. Karl Fisher analysis indicates that crystalline Form A of Compound I' contains, on average, 6.86% water, corresponding to one molecule of water.

Figure 4:
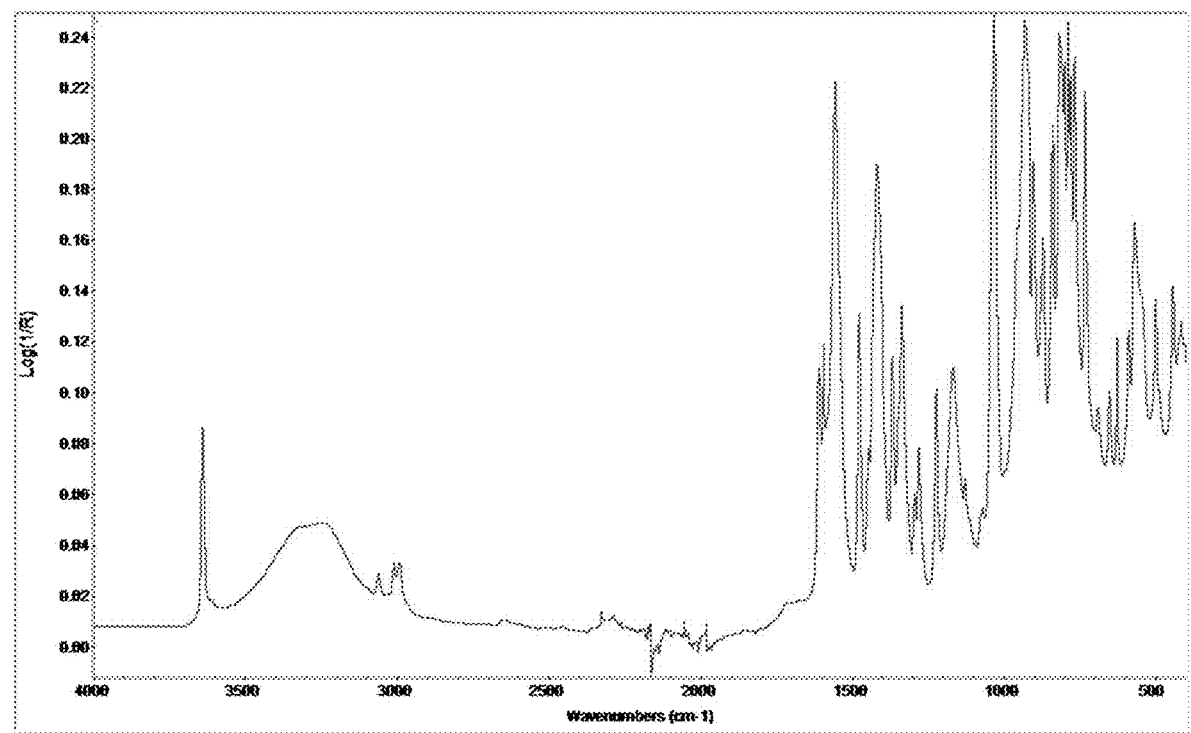
FIG. 4 shows results obtained by Fourier Transform Infrared (FTIR) spectroscopy for crystalline Form A of Compound I'.

FIG. 4 shows results obtained by Fourier Transform Infrared (FTIR) spectroscopy for crystalline Form A of Compound I'. Crystalline Form A of Compound I' exhibits prominent peaks at approximately 1608, 1592, 1553, 1473, 1416, 1364, 1334, and 1277 $cm^{-1}$. Thus, in some embodiments, a crystalline form of Compound I' has at least one characteristic FTIR peak (e.g., one, two, three, four, five, six, seven, or eight characteristic peaks) selected from approximately 1608, 1592, 1553, 1473, 1416, 1364, 1334, and 1277 $cm^{-1}$. In some embodiments, a crystalline form of Compound I' has at least three characteristic peaks selected from 1608, 1592, 1553, 1473, 1416, 1364, 1334, and 1277 $cm^{-1}$. In some embodiments, peak positions recited herein include variability within ±1 $cm^{-1}$.

Figure 5:
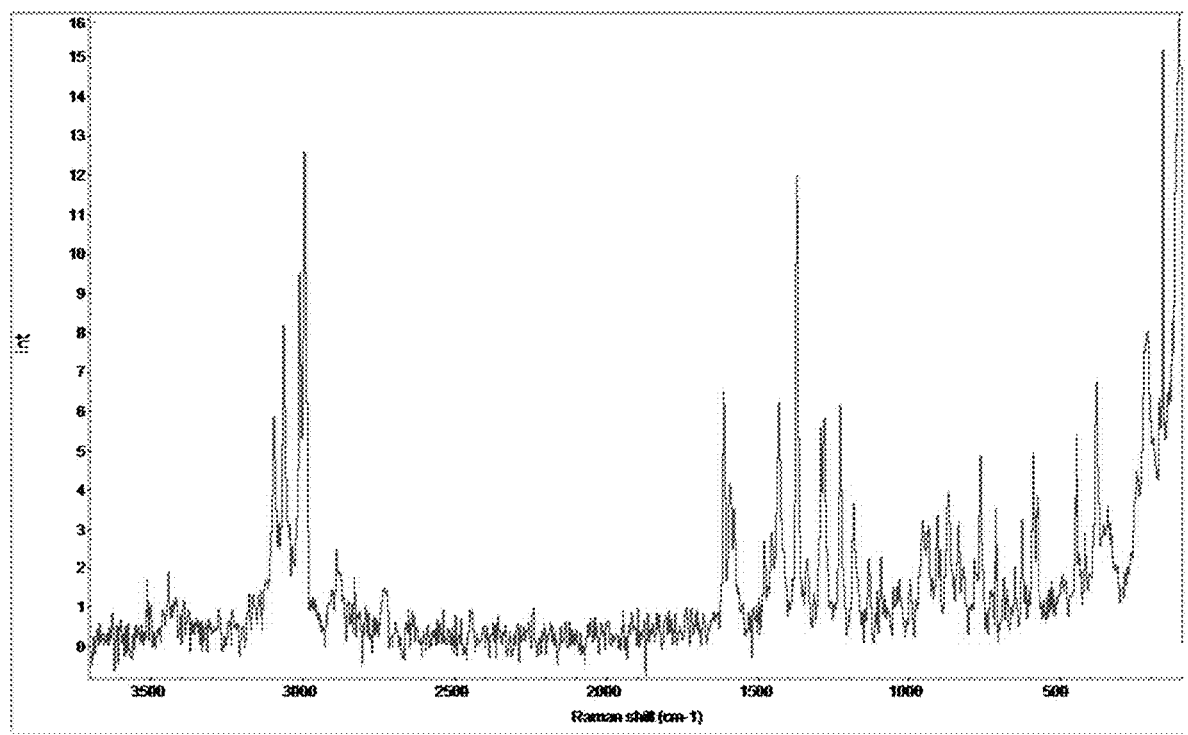
FIG. 5 shows results obtained by Fourier Transform Raman (FT Raman) spectroscopy for crystalline Form A of Compound I'.

FIG. 5 shows results obtained by Fourier Transform Raman spectroscopy for crystalline Form A of Compound I'. Crystalline Form A of Compound I' exhibits prominent peaks at approximately 1611, 1591, 1574, 1472, 1426, and 1366 $cm^{-1}$. Thus, in some embodiments, a crystalline form of Compound I' has at least one characteristic FT Raman peak (e.g., one, two, three, four, five, or six characteristic peaks) selected from approximately 1611, 1591, 1574, 1472, 1426, and 1366 $cm^{-1}$. In some embodiments, a crystalline form of Compound I' has at least three characteristic peaks selected from 1611, 1591, 1574, 1472, 1426, and 1366 $cm^{-1}$. In some embodiments, peak positions recited herein include variability within ±2 $cm^{-1}$.

Figure 6:
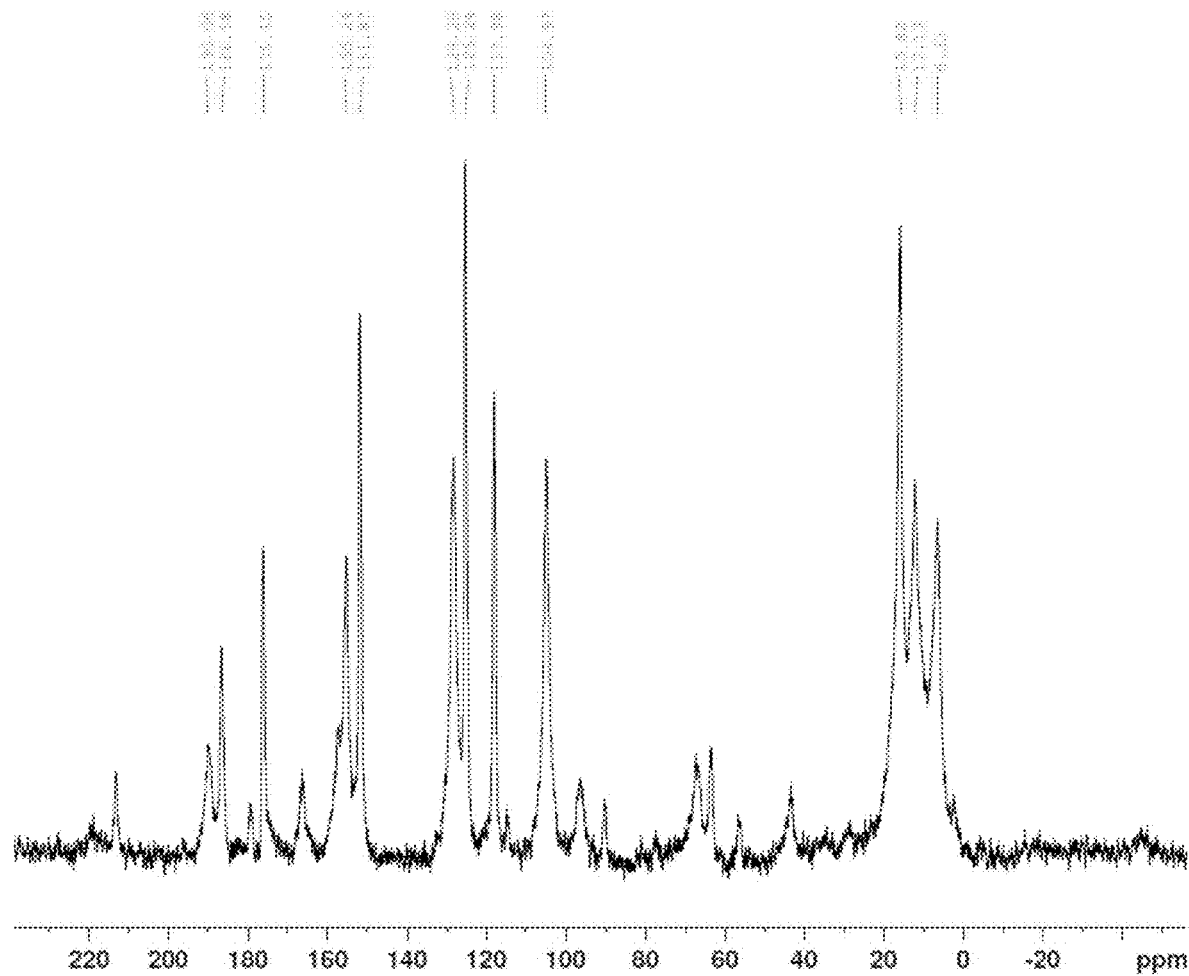
FIG. 6 shows results obtained by solid state carbon-13 nuclear magnetic resonance ($^{13}$C-NMR) spectroscopy for crystalline Form A of Compound I'.

FIG. 6 shows results obtained by solid state carbon-13 nuclear magnetic resonance ($^{13}$C-NMR) NMR spectroscopy for crystalline Form A of Compound I'. Crystalline Form A of Compound I' exhibits prominent peaks at approximately 104.97, 117.98, 125.24, 128.28, 151.87, 155.24, 176.15, 186.58, and 190.06 ppm. Thus, in some embodiments, a crystalline form of Compound I' has at least one characteristic $^{13}$C-NMR peak (e.g., one, two, three, four, five, or six characteristic peaks) selected from approximately 104.97, 117.98, 125.24, 128.28, 151.87, 155.24, 176.15, 186.58, and 190.06 ppm. In some embodiments, a crystalline form of Compound I' has at least three characteristic $^{13}$C-NMR peaks selected from 104.97, 117.98, 125.24, 128.28, 151.87, 155.24, 176.15, 186.58, and 190.06 ppm.

Figure 7:
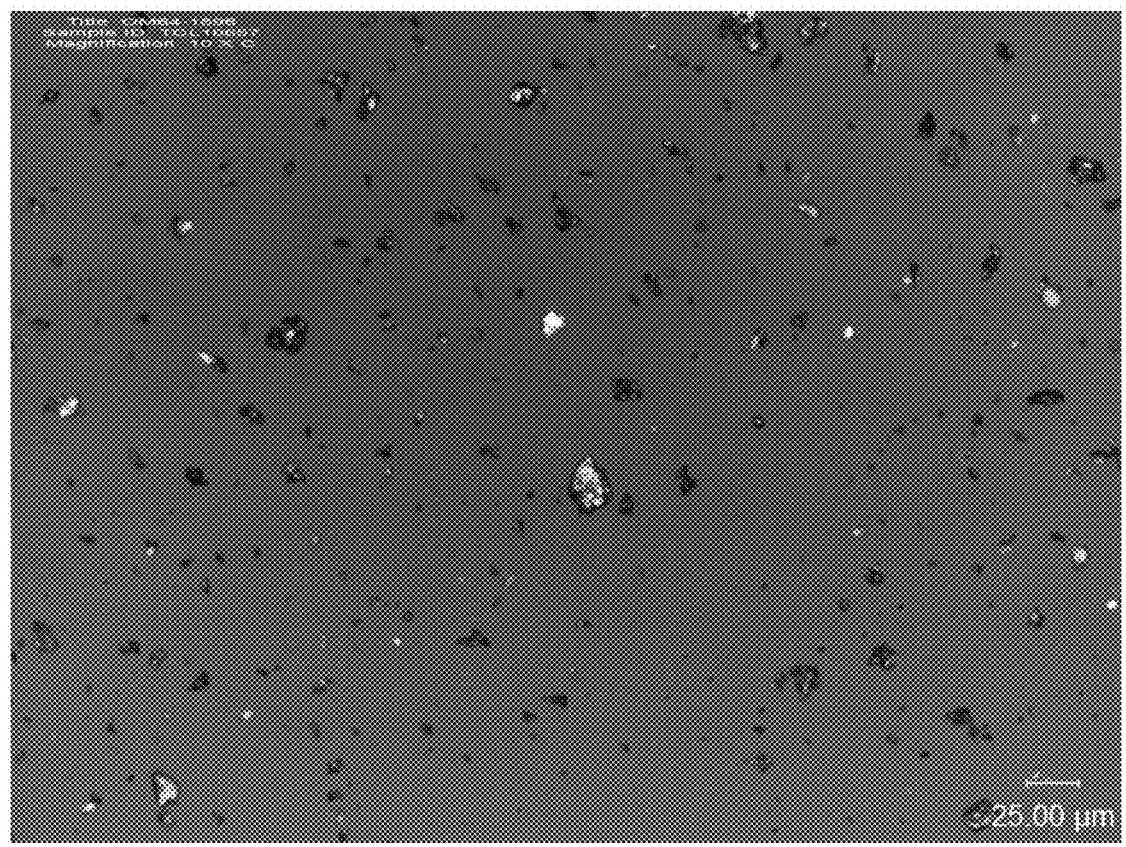
FIG. 7 shows an optical microscopy image of crystals of crystalline Form A of Compound I'.

Crystalline Form A of Compound I' can therefore be characterized as a hygroscopic solid. Crystalline Form A of Compound I' also shows good crystallinity, with irregularly shaped crystals of varying sizes (FIG. 7). Crystalline Form A of Compound I' shows evidence of hydrate formation, wherein the molar ratio of Compound I' to water is about 1:1 (i.e., a monohydrate).

Figure 27:
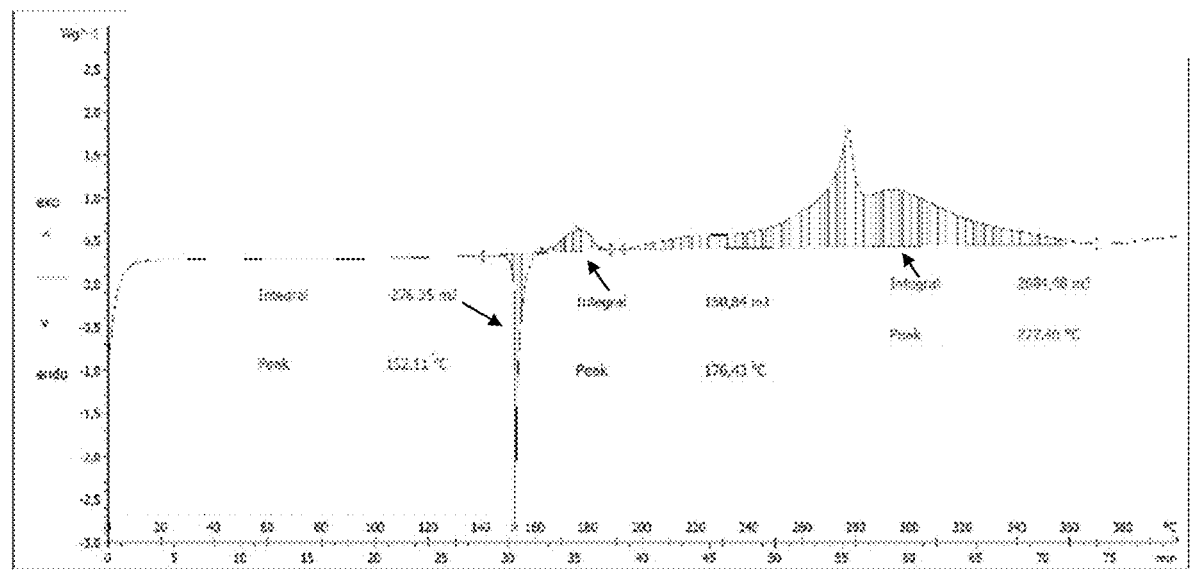
FIG. 27 shows a differential scanning calorimetry (DSC) analysis for a highly crystalline sample of Form A of Compound I'.

FIG. 27 shows results obtained by differential scanning calorimetry (DSC) for a highly crystalline sample of Form A of Compound I'. The DSC results indicates an endotherm of about 152° C. for crystalline Form A of Compound I' exhibits an endotherm from about 151° C. to 153° C., from about 150° C. to about 154° C., or at about 152° C.

Figure 28:
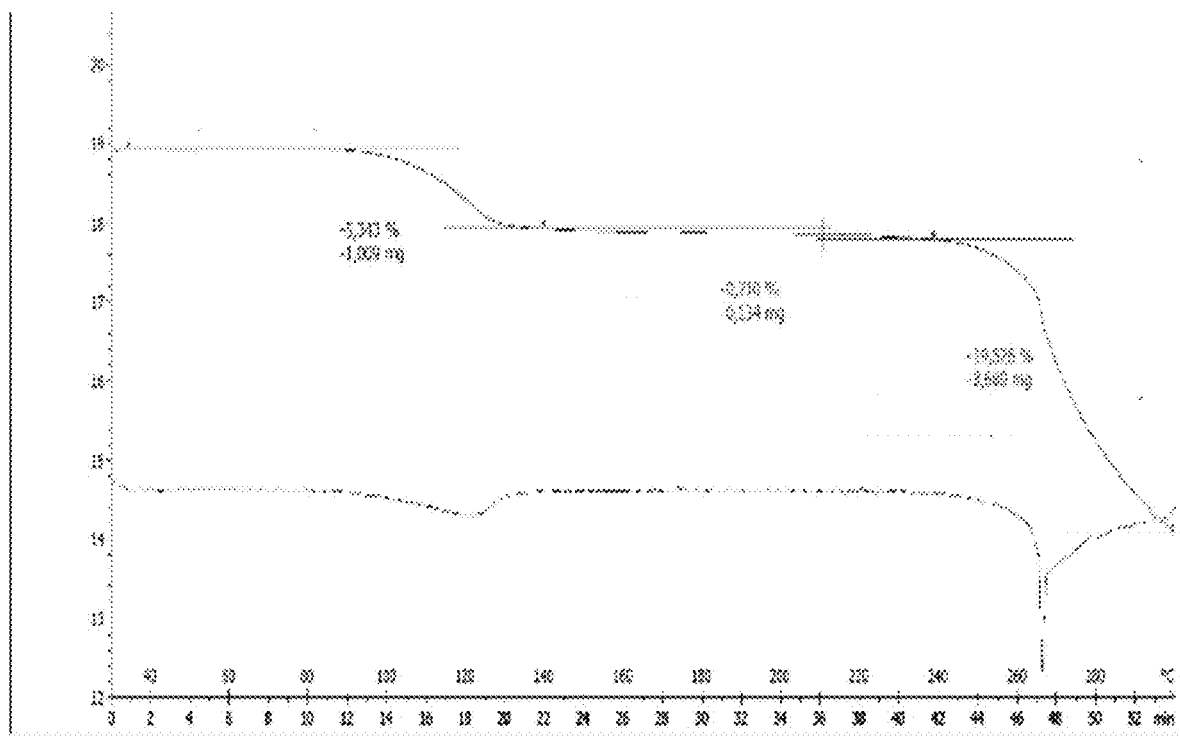
FIG. 28 shows thermogravimetric analysis (TGA) results for a highly crystalline sample of Form A of Compound I'.
Figure 29:
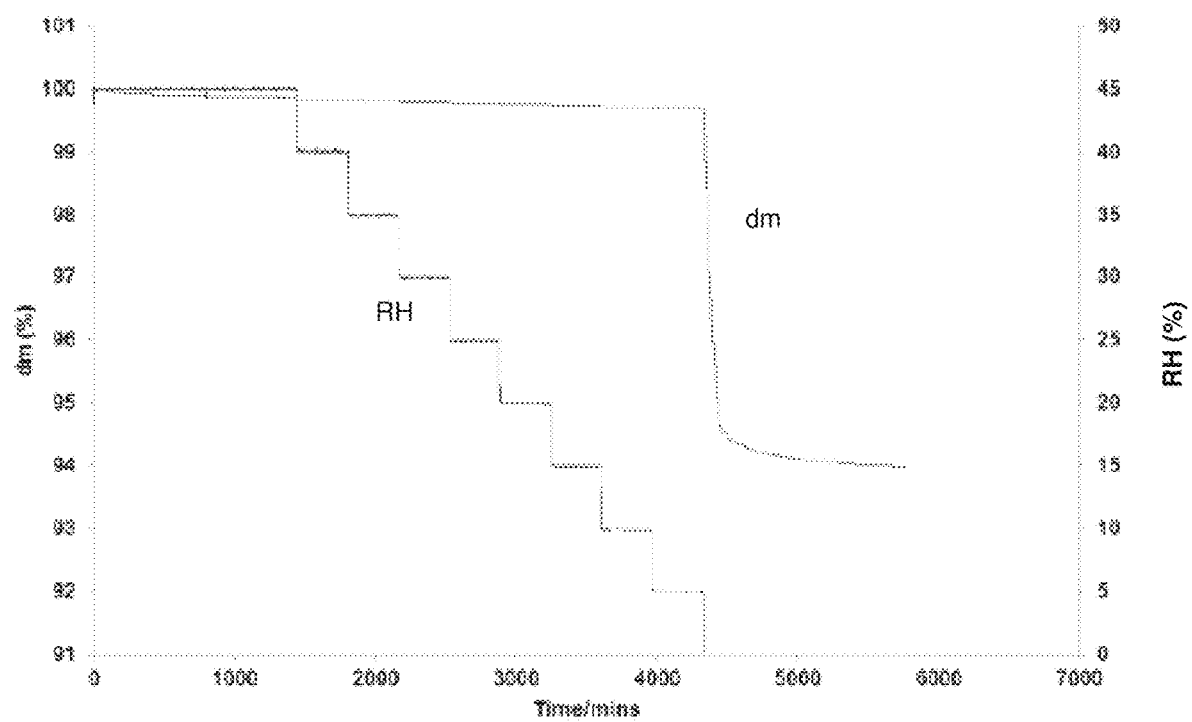
FIG. 29 shows dynamic vapor sorption (DVS) results for a highly crystalline sample of Form A of Compound I'

FIG. 28 shows results obtained by thermogravimetric analysis (TGA) for a highly crystalline sample of Form A of Compound I'. The TGA results show that the highly crystalline sample of Form A of Compound I' exhibited a 5.3% weight loss when carried from 34° C. to 140° C., and a 0.71% weight loss from 140° C. to 238° C. The highly crystalline sample does not begin to show appreciable water loss until heated above 100° C. Meanwhile, FIG. 29 shows dynamic vapor sorption (DVS) results for a highly crystalline sample Form A of Compound I', and shows that the sample resists gain/loss of water over a relative humidity range of 5% to 75%.

Methods of Crystallizing Compound I'

Disclosed are methods of crystallizing Compound I'. Crystalline forms of Compound I' may generally be obtained or produced by crystallizing Compound I' under controlled conditions. In some embodiments, the method may produce a solvated crystalline form. In some embodiments, the method may produce the crystalline Form A of Compound I'.

Controlling the presence of oxygen may be important in the formation of the desired crystalline form. In some embodiments, crystallization may be performed in a reactor blanketed with nitrogen. In some embodiments, the crystallization solvents used may be degassed by bubbling nitrogen through the solvents for a suitable period of time.

In some embodiments, crystallization of Compound I' may be performed by adding an aqueous solution of Compound I' to an antisolvent to form a crystallization solution. In some embodiments, the aqueous solution of Compound I' may be added to the antisolvent over a period of 30 minutes, 40 minutes, 50 minutes, 60 minutes, 70 minutes, 80 minutes, 90 minutes, 100 minutes, 110 minutes or 120 minutes or a range between any two of these values. In certain embodiments, the aqueous solution of Compound I' may be added to the antisolvent while stirring.

In some embodiments, the antisolvent may be selected from acetone, acetonitrile, benzene, 1-butanol, 2-butanol, methyl ethyl ketone (MEK), t-butyl alcohol, chloroform, cyclohexane, 1,2-dichloroethane, diethylene glycol, diethyl ether, diglyme (diethylene glycol dimethyl ether), 1,2-dimethoxyethane (glyme, DME), dimethylformamide (DMF), dimethyl sulfoxide (DMSO), 1,4-dioxane, ethanol, ethyl acetate, ethylene glycol, heptane, hexamethylphosphoramide (HMPA), hexamethylphosphorous triamide (HMPT), hexanes, methanol, methyl t-butyl ether (MTBE), methylene chloride, N-methyl-2-pyrrolidinone (NMP), pentane, 1-propanol, 2-propanol, pyridine, tetrahydrofuran (THF), toluene, triethyl amine, o-xylene, m-xylene, p-xylene, or a combination thereof. In some embodiments, the antisolvent may be methyl ethyl ketone.

Temperature control may also be advantageous for crystallization. For example, in some embodiments, upon addition of the aqueous solution of Compound I' to the antisolvent, it is desirable to maintain the crystallization solution at a maximum temperature of about 50° C. In some embodiments, the temperature of the crystallization solution is from about 5° C. to about 50° C., from about 10° C. to about 50° C., from about 15° C. to about 50° C., from about 20° C. to about 50° C., from about 25° C. to about 50° C., from about 30° C. to about 50° C., from about 35° C. to about 50° C., from about 40° C. to about 50° C., or from about 45° C. to about 50° C. For instance, in some embodiments, the crystallization at 25° C., 30° C., 35° C., 40° C., 45° C., or 50° C., or a range between any two of these values. In some embodiments, the crystallization solution may be maintained at the desired temperature for 0.5 hour, 1 hour, 2 hours, 3 hours, 4 hours, 5 hours, 6 hours, 7 hours, 8 hours, 9 hours, 10 hours, or more, or a range between any two of these values.

Controlling the amount of water present in the crystallization solution may be advantageous for preparing the monohydrate of Compound I'. In some embodiments, the aqueous solution of Compound I' is added to the antisolvent to form a crystallization solution such that the water content of the crystallization solution is up to 5% by weight of the antisolvent. In some embodiments, the water content may be 0.5%, 1.0%, 1.5%, 2.0%, 2.5%, 3.0%, 3.5%, 4.0%, 4.5%, 5.0% by weight relative to the quantity antisolvent or within a range defined by any of the aforementioned values. For example, the crystallization solution may comprise from 0.5% to 5.0%, from 1.0% to 5.0%, from 1.5% to 5.0%, from 2.0% to 5.0%, from 2.5% to 5.0%, from 2.5% to 4.5%, from 3.0% to 4.5%, or from 2.0% to 4.0% water by weight relative to the quantity of antisolvent.

Solid crystalline Compound I' may be recovered from the crystallization solution by filtration followed by washing with a solution of methyl ethyl ketone containing 3% (w/w) water and then subsequently drying at reduced pressure. In some embodiments, the drying is performed at a temperature no greater than 50° C. For example, the drying may be performed at 25° C., 30° C., 35° C., 40° C., 45° C., or 50° C. In some embodiments, the drying is performed at a pressure no lower than 100 mbar. For example, the drying may be performed at 100 mbar, 150 mbar, 200 mbar, 250 mbar, 300 mbar, 350 mbar, 400 mbar, 450 mbar, or 500 mbar, or at a pressure within a range between any of the aforementioned values.

Methods of Preparing Compound I

Also provided herein is an enantioselective method of making Compound I, or pharmaceutically acceptable salt thereof,

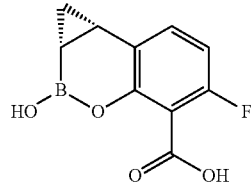

Compound I comprising the steps of:

borylating a compound of Formula (A-I)

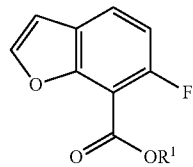

with a borylating agent in the presence of a nickel catalyst and a base system to form an organoboron intermediate of Formula (A-II)

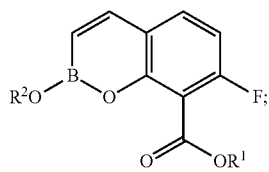

reacting organoboron intermediate of Formula (A-II) with a chiral auxiliary having the formula

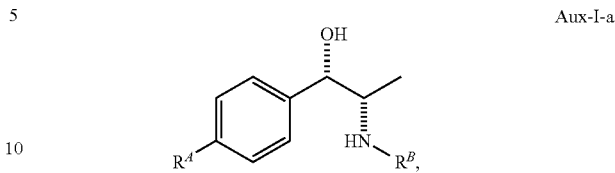

Aux-I-a wherein $R^A$ is hydrogen or $C_1$-$C_6$ alkyl; and $R^B$ is $C_1$-$C_6$ alkyl; to form organoboron intermediate of Formula (B-III)

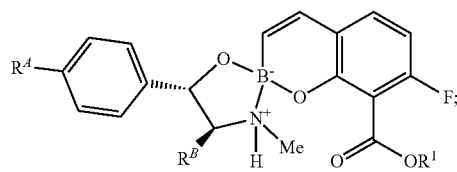

converting organoboron intermediate of Formula (B-III) to organoboron intermediate of Formula (B-IV)

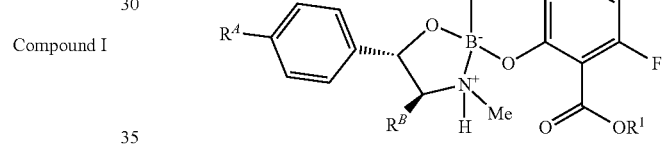

in the presence of a cyclopropanating agent and optional catalyst; and hydrolyzing the compound of Formula (B-IV) to form the disodium salt of compound I (i.e., compound I'). In some embodiments, the compound of Formula (B-IV) may be isolated prior to hydrolysis to form compound I'. The preparation of the compounds of Formula (A-I) are described in International Patent Publication No. WO 2019/075084, which is incorporated herein by reference in its entirety.

In some embodiments, the chiral auxiliary is (1S,2S)-(+)-pseudoephedrine. In some embodiments, the chiral auxiliary is not (1S,2S)-(+)-pseudoephedrine.

In some embodiments, $R^1$ is a carboxylic acid protecting group. In some embodiments, $R^1$ is $C_{1-6}$alkyl. For example, in some specific embodiments, $R^1$ can be, without limitation, methyl, ethyl, n-propyl, isopropyl, n-butyl, sec-butyl, or t-butyl. In some specific embodiments, $R^1$ is ethyl.

In some embodiments, $R^2$ is hydrogen. In some embodiments, $R^2$ is $C_{1-6}$alkyl. In some embodiments, $R^2$ is substituted $C_{1-6}$alkyl. For example, in some specific embodiments, $R^2$ can be, without limitation, methyl, ethyl, n-propyl, isopropyl, n-butyl, sec-butyl, t-butyl, or pinacol. In some embodiments, $R^2$ is hydrogen. In some embodiments, $R^2$ is pinacol The borylating agent can be any borylating agent suitable for introducing the boron atom into a furan ring. In some embodiments, the borylating agent is $(R^2O)_2B—B(OR^2)_2$, wherein each $R^2$ is independently H, optionally substituted $C_{1-6}$alkyl, or two $R^2$ together are an optionally substituted $C_{2-4}$ alkylene chain and form an optionally substituted 5-7 membered heterocyclyl ring with the intervening atoms. In some embodiments, the borylating agent is $(HO)_2B—B(OH)_2$. In some embodiments, the borylating agent is selected from the group consisting of $B_2(Pin)_2$ (Bis(pinacolato)diboron), $B_2(Cat)_2$ (Bis(catecholato)diboron), and $B_2neop_2$ (Bis(neopentyl glycolato)diboron). In some embodiments, the borylating agent is $B_2(Pin)_2$.

The molar ratio of the borylating agent to the compound of Formula (A-I) can depend on the reaction conditions used. In some embodiments, the molar ratio of the borylating agent to the compound of Formula (A-I) can be in the range of about 1.0:1 to about 3:1. In some embodiments, the molar ratio of the borylating agent to the compound of Formula (A-I) can be about 1.0:1, 1.05:1, 1.10:1, 1.15:1, 1.20:1, 1.25:1, 1.3:1, 1.35:1, 1.4:1, 1.45:1, 1.5:1, 1.6:1, 1.7:1, 1.8:1, 1.9:1, 2.0:1, 2.1:1, 2.2:1, 2.3:1, 2.4:1, 2.5:1, 2.6:1, 2.7:1, 2.8:1, 2.9:1 or 3:1. In some embodiments, the molar ratio of the borylating agent to the compound of Formula (A-I) can be less than 1.1:1, 1.2:1, 1.3:1, 1.4:1, or 1.5:1.

In some embodiments, the nickel catalyst precursor and ligand are combined to form the nickel catalyst prior to reacting the compound of Formula (A-I) with a borylating agent in a solvent system and a base system. In other embodiments, the nickel catalyst precursor and ligand combine to form the nickel catalyst while in the presence of compound of Formula (A-I) with a borylating agent in a solvent system and a base system.

In some embodiments, Ni catalyst precursor is selected from the group consisting of $NiCl_2$, $Ni(acac)_2$, and $Ni(COD)_2$. In some embodiments, the Ni catalyst precursor is $NiCl_2$ or $Ni(Acac)_2$. In some embodiments, the Ni catalyst precursor is $NiCl_2$.

In some embodiments, the amount of Ni catalyst precursor is in the range of about 5 mol % to about 25 mol % of the compound of formula (A-I). In some embodiments, the amount of Ni catalyst precursor is about 2.5 mol %, 5 mol %, 10 mol %, 15 mol %, 20 mol %, 25 mol %, 30 mol %, 40 mol %, 50 mol % of the compound of formula (A-I). In some embodiments, the amount of Ni catalyst precursor is greater than about 1 mol %, 5 mol %, 10 mol %, 15 mol %, 20 mol %, 25 mol %, 30 mol %, 40 mol %, 50 mol % of the compound of formula (A-I). In some embodiments, the amount of Ni catalyst precursor is less than about 5 mol %, 10 mol %, 15 mol %, 20 mol %, 25 mol %, 30 mol %, 40 mol %, 50 mol % of the compound of formula (A-I). In some embodiments, the amount of Ni catalyst precursor is in the range of about 1 mol % to about 20 mol %, about 1 mol % to about 30 mol %, about 5 mol % to about 20 mol %, about 5 mol % to about 30 mol %, about 5 mol % to about 40 mol %, about 5 mol % to about 50 mol % of the compound of formula (A-I).

In some embodiments, the ligand is monodentate or bidentate. In some embodiments, the ligand is selected from the group consisting of aliphatic, aromatic, NHC ligands, phosphites, phosphoramidites, and amines. In some embodiments, the ligand is selected from the group consisting of NHC ligands, phosphines, phosphites, phosphoramidites, amines, alcohol, aminoalcohol, and a combination thereof. In some embodiments, the ligand is an amine optionally substituted with aryl, alkyl, and/or heteroaryl groups. In some embodiments, the ligand is NHC ligand. In some embodiments, the ligand is phosphines. In some embodiments, the ligand is phosphites. In some embodiments, the ligand is phosphoramidites. In some embodiments, the ligand is amine. In some embodiments, the ligand is alcohol. In some embodiments, the ligand is aminoalcohol. In some embodiments, the ligand or catalyst is selected from the group consisting of Bis(di-cyclopentylphosphnium)ethyl tetrafluoroborate, 4,5-Bis(di-tert-butylphosphino)-9,9-dimethylxanthene, 2,2'-bis(dicyclohexylphosphaneyl)-1,1'-biphenyl, 1,2-bis((di-tert-butylphosphaneyl)methyl)benzene, 1,3-Bis(1-adamantyl)imidazolium, 1,3-Di-tert-butylimidazolium, 1,3-Bis(2,6-diisopropyl-phenyl)-4,5-dihydroimidazol-2-ylidene, 1,3-bis(2,6-diisopropylphenyl)-1H-imidazol-3-ium-2-ide, $P(Octyl)_3$, Dppf, DiPrf, dcype, JosiPhos 9-1, (S,S,R,R)-TangPhos, (S,S,R,R)-DuanPhos, DavePhos, $P(tBu)_3$, $P(n-Bu)_3$, $P(n-Pr)_3$, XantPhos, (tBu)XantPhos, (R)-SegPhos, (R)-DM-SegPhos, (R)-MeOBIPHEP, (R,S)-BinaPhos, Binaphane, Phosphoramidite, (S)-SegphosRu(Oac)$_2$, trans-PdCl$_2$(Pcy$_3$)$_2$, [Rh(S,S)EtDuPhos(COD)]Otf, (S)-XylylPhanePhos, (R)-C3-TunePhos, (R)-DTBM-Garphos, (R)-DMM-Garphos, (R,R,R)-Xyl-SKP, Thio-XantPhos, TaniaPhos, SPANPhos, tris(4-methoxyphenyl)phosphine, Tris(2,6-dimethoxyphenyl) phosphine, Bis(dicyclohexylphosphino) methane), DCYPE, 1,3-Bis(dicyclohexyl phosphino)propane, 1,2-Bis(diphenylphosphino)ethane, (R,R)-Dipamp, Bis(dicyclohexyl phosphinophenyl) ether, DPEPhos, Bis(2-diphenylphosphinoethyl) phenylphosphine, 1,1,1-Tris(diphenyl phosphinomethyl)ethane, DPPF, 1,1'-Ferrocenediyl-bis(dicyclohexylphosphine), DTBPF, DiPrF, 1-Diphenylphosphino-1'-(di-butylphosphino)ferrocene, HiersoPhos, iPr(NHC), SIMes, IMes, (1,3-bis[bis(o-methoxyphenyl)phosphino]propane and $P(n-Bu)_3)_2$. In some embodiments, the ligand is $P(Octyl)_3$, $P(n-Pr)_3$, $P(n-Bu)_3$, diPrf, or dcype. In some embodiments, the ligand is $P(n-Bu)_3$. In some embodiments, the ligand is $P(n-Pr)_3$.

The molar ratio of the ligand to the Ni catalyst precursor can depend on the types of precursor and ligand used. In some embodiments, the molar ratio of the ligand to the Ni catalyst precursor can be in the range of about 0.5:1 to about 5:1. In some embodiments, the molar ratio of the ligand to the Ni catalyst precursor can be about 0.5:1, 1:1, 1.5:1, 2:1, 2.5:1, or 5:1. In some embodiments, the molar ratio of the ligand to the Ni catalyst precursor can be in the range of about 0.1:1-10:1, 0.5:1-5:1, 0.5:1-3:1, 0.5:1-2.5:1, 1:1-2:1, 1:1-3:1, 1:1-4:1, 1:1-5:1, or 1:1-2.5:1. In some embodiments, the molar ratio of the ligand to the Ni catalyst precursor can be greater than about 0.1:1, 0.5:1, 1:1, 1.25:1, 1.5:1, 1.75:1, 2:1, 3:1, 4:1, 5:1, 6:1, or 10:1. In some embodiments, the molar ratio of the ligand to the Ni catalyst precursor can be less than 0.5:1, 1:1, 1.25:1, 1.5:1, 1.75:1, 2:1, 3:1, 4:1, 5:1, 6:1, 10:1, or 20:1.

In some embodiments, the nickel catalyst can be selected from the group consisting of: $NiCl_2(PPh_3)_2$, $NiCl_2(PCy_2Ph)_2$, $NiCl_2(PPh_2CH_2CH_2PPh_2)$, $NiCl_2(1,3-Bis(diphenylphosphino)propane)$, $NiCl_2(1,3-Bis(diphenylphosphino)ethane)$ and $NiCl_2(P(n-Bu)_3)_2$. In some embodiments, the nickel catalyst may be pre-formed prior to reaction with the compound of formula (A-I)

In some embodiments, the reaction of the compound of formula (A-I) and the borylating agent is performed in the presence of a base system. In some embodiments, the base system comprises one or more inorganic bases. In some embodiments, the base system comprises $K_2CO_3$, $Cs_2CO_3$, $Li_2CO_3$, or any combination thereof. In some embodiments, the base system comprises $Cs_2CO_3$. In some embodiments, the base system comprises $CsOH \cdot H_2O$. In some embodiments, the base system comprises $K_2CO_3$. In some embodiments, the base system comprises KOH. In some embodiments, the base system comprises triethylamine. In some embodiments, the base system comprises an alkali metal alkoxide. In some specific embodiments, the base system comprises potassium methoxide. In some embodiments, the molar ratio of the base system to the compound of formula (A-I) is about 1:1, 1.5:1, 2:1, 2.5:1, 3:1, 3.5:1, 4:1, 4.5:1 or 5:1. In some embodiments, the molar ratio of the base system the compound of formula (A-I) can be in the range of about 1:1 to 5:1, 1.5:1 to 5:1, 2:1 to 4:1, 2.5:1 to 3.5:1 or 3:1 to 5:1. In some embodiments, the molar ratio of the base system to the compound of formula (A-I) can be in less than 5:1, less than 4:1, less than 3:1, less than 2.5;1, less than 2:1, less than 1.5:1, or less than 1.25:1.

In some embodiments the carbonate base can be a mixture of $Cs_2CO_3$ and $K_2CO_3$. In some embodiments the cesium to potassium carbonate base ratio may be from about 1:2 to 2:1. In some embodiments the cesium to potassium carbonate base ratio may be from 1.5:1, 1.6:1, 1.7:1 or 1.8:1.

In some embodiments, the borylation reaction of the compound of formula (A-I) and a borylating agent is performed using a catalyst system comprising $NiCl_2$ and $P(n-Bu)_3$ in the presence of $Cs_2CO_3$. In some specific embodiments, the molar ratio of $Cs_2CO_3$ to the compound of formula (A-I) is from about 1:1 to about 5:1. For example, in some embodiments, the molar ratio of $Cs_2CO_3$ to the compound of formula (A-I) is about 1:1, 1.5:1, 2:1, 2.5:1, 3:1, 3.5:1, 4:1, 4.5:1 or 5:1. In some embodiments, the molar ratio of $Cs_2CO_3$ to the compound of formula (A-I) can be in the range of about 1:1 to 5:1, 1.5:1 to 5:1, 2:1 to 4:1, 2.5:1 to 3.5:1 or 3:1 to 5:1. In some embodiments, the borylation reaction of the compound of formula (A-I) and a borylating agent is performed using a catalyst system comprising $NiCl_2$ and $P(n-Bu)_3$ in the presence of $CsOH \cdot H_2O$. In some specific embodiments, the molar ratio of $CsOH \cdot H_2O$ to the compound of formula (A-I) is from about 1:1 to about 5:1. For example, in some embodiments, the molar ratio of $CsOH \cdot H_2O$ to the compound of formula (A-I) is about 1:1, 1.5:1, 2:1, 2.5:1, 3:1, 3.5:1, 4:1, 4.5:1 or 5:1. In some embodiments, the molar ratio of $CsOH \cdot H_2O$ to the compound of formula (A-I) can be in the range of about 1:1 to 5:1, 1:1 to 4:1, 1:1 to 3:1, 1:1 to 2:1.

In some embodiments, the reaction of the compound of formula (A-I) and the borylating agent is performed in a solvent system. In some embodiments, the solvent system comprises tetrahydrofuran (THF). In some embodiments, the solvent system comprises 2-methyltetrahydrofuran (MeTHF). In some embodiments, the solvent system comprises 1,4-dioxane. In some embodiments, the solvent system comprises methyl tert-butyl ether.

In some embodiments, the solvent system may further comprise water. In some embodiments, water may be present in 1, 2, 3, 4, 5, 6, 7, 8, 9, 10, 15, 20, 25, 30, 35, 40, 45, or 50% v/v. In some embodiments, the solvent system may comprise water in the range of about 1% to 10% v/v, 2% to 8% v/v 4% to 7% v/v, 3% to 8% v/v, 5% to 10% v/v or 5% to 15% v/v. In some specific embodiments, the water may be present in 5% v/v. In other embodiments, the solvent system may further comprise an alcohol. In some embodiments, the alcohol may be present in 1, 2, 3, 4, 5, 6, 7, 8, 9, 10, 15, 20, 25, 30, 35, 40, 45, or 50% v/v. In some embodiments, the solvent system may comprise an alcohol in the range of about 1% to 10% v/v, 2% to 8% v/v 4% to 7% v/v, 3% to 8% v/v, 5% to 10% v/v or 5% to 15% v/v. In some specific embodiments, the alcohol may be present in 5% v/v. In some embodiments, the alcohol may be methanol. In some embodiments, the alcohol may be ethanol.

In some embodiments, the solvent system may be toluene. In some embodiments, the solvent system may further comprise about 1% to 10% v/v, 2% to 8% v/v 4% to 7% v/v, 3% to 8% v/v, 5% to 10% v/v or 5% to 15% v/v $H_2O$. In some embodiments, $H_2O$ may be present in 1, 2, 3, 4, 5, 6, 7, 8, 9, 10, 15, 20, 25, 30, 35, 40, 45, or 50%. In some embodiments, the solvent system may be 99/1, 98/2, 97/3, 96/4 95/5 94/6, 93/7, 92/8, 91/9 or 90/10% v/v toluene/$H_2O$. In some embodiments, the solvent system may be toluene/ethanol 95/5% v/v. In some embodiments, the solvent system may comprise about 1% to 10% v/v, 2% to 8% v/v 4% to 7% v/v, 3% to 8% v/v, 5% to 10% v/v or 5% to 15% v/v ethanol. In some embodiments, ethanol may be present in 1, 2, 3, 4, 5, 6, 7, 8, 9, 10, 15, 20, 25, 30, 35, 40, 45, or 50%. In some embodiments, the solvent system may be 99/1, 98/2, 97/3, 96/4 95/5 94/6, 93/7, 92/8, 91/9 or 90/10% v/v toluene/ethanol. In some embodiments, the solvent system may be toluene/ethanol 95/5% v/v.

In some embodiments, the solvent system may be THF. In some embodiments, the solvent system may further comprise about 1% to 10% v/v, 2% to 8% v/v 4% to 7% v/v, 3% to 8% v/v, 5% to 10% v/v or 5% to 15% v/v $H_2O$. In some embodiments, $H_2O$ may be present in 1, 2, 3, 4, 5, 6, 7, 8, 9, 10, 15, 20, 25, 30, 35, 40, 45, or 50%. In some embodiments, the solvent system may be 99/1, 98/2, 97/3, 96/4 95/5 94/6, 93/7, 92/8, 91/9 or 90/10% v/v THF/$H_2O$. In some embodiments, the solvent system may be THF/$H_2O$ 95/5% v/v. In some embodiments, the solvent system may comprise about 1% to 10% v/v, 2% to 8% v/v 4% to 7% v/v, 3% to 8% v/v, 5% to 10% v/v or 5% to 15% v/v ethanol. In some embodiments, ethanol may be present in 1, 2, 3, 4, 5, 6, 7, 8, 9, 10, 15, 20, 25, 30, 35, 40, 45, or 50%. In some embodiments, the solvent system may be 99/1, 98/2, 97/3, 96/4 95/5 94/6, 93/7, 92/8, 91/9 or 90/10% v/v THF/ethanol. In some embodiments, the solvent system may be THF/ethanol 95/5% v/v. In some embodiments, the solvent system may be ethanol.

In some embodiments, the solvent system may be 2-methyltetrahydrofuran (MeTHF). In some embodiments, the solvent system may further comprise about 1% to 10% v/v, 2% to 8% v/v 4% to 7% v/v, 3% to 8% v/v, 5% to 10% v/v or 5% to 15% v/v $H_2O$. In some embodiments, $H_2O$ may be present in 1, 2, 3, 4, 5, 6, 7, 8, 9, 10, 15, 20, 25, 30, 35, 40, 45, or 50%. In some embodiments, the solvent system may be 99/1, 98/2, 97/3, 96/4 95/5 94/6, 93/7, 92/8, 91/9 or 90/10% v/v MeTHF/$H_2O$. In some embodiments, the solvent system may be MeTHF/$H_2O$ 95/5% v/v. In some embodiments, the solvent system may comprise about 1% to 10% v/v, 2% to 8% v/v 4% to 7% v/v, 3% to 8% v/v, 5% to 10% v/v or 5% to 15% v/v ethanol. In some embodiments, ethanol may be present in 1, 2, 3, 4, 5, 6, 7, 8, 9, 10, 15, 20, 25, 30, 35, 40, 45, or 50%. In some embodiments, the solvent system may be 99/1, 98/2, 97/3, 96/4 95/5 94/6, 93/7, 92/8, 91/9 or 90/10% v/v MeTHF/ethanol. In some embodiments, the solvent system may be MeTHF/ethanol 95/5% v/v. In some embodiments, the solvent system may be ethanol.

In some embodiments, the borylation reaction of the compound of formula (A-I) may include a step of premixing the borylating agent and the base.

In some embodiments, the borylation reaction of the compound of formula (A-I) may be performed at a temperature in the range of about 60° C. to 100° C. In some embodiments, the borylation reaction of the compound of formula (A-I) may performed at a temperature of about 60, 65, 70, 75, 80, 85, 90, 95, or 100° C. In some embodiments, the borylation reaction of the compound of formula (A-I) is performed at a temperature in the range of about 60 to 100° C., 70 to 100° C., 80 to 100° C., 90 to 100° C., 60 to 70° C., 60 to 80° C., 60 to 90° C., 65 to 85° C., 65 to 90° C., or 75 to 95° C.

In some embodiments, the organoboron intermediate of formula (A-II) is combined with one or more chiral auxiliaries to form a chiral complex. In some embodiments, the chiral complex has a structure of formula (B-III). In some embodiments, the chiral auxiliary is (1S,2S)-(+)-pseudoephedrine so as to form a chiral complex having the structure of Formula (A-III).

In some embodiments, the chiral auxiliary is a compound of Formula (Aux-I)

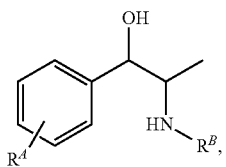

Aux-I or stereoisomers thereof,
wherein
$R^A$ may be hydrogen, halogen, or $C_1$-$C_6$ alkyl; and
$R^B$ may $C_1$-$C_6$ alkyl;

In some embodiments, the chiral auxiliary is a compound of Formula Aux-I-a:

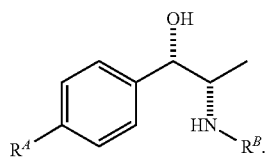

Aux-I-a

In some embodiments, the chiral auxiliary is a compound of Formula Aux-I-b:

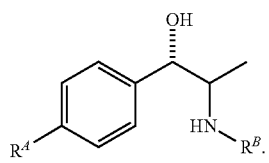

Aux-I-b

In some embodiments, the chiral auxiliary is a compound of Formula Aux-I-c:

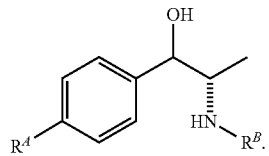

Aux-I-c

In some embodiments, the chiral auxiliary is a compound of Formula Aux-I-d:

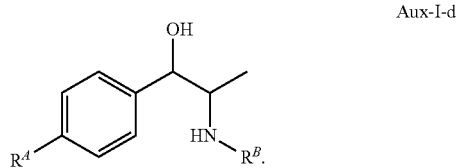

Aux-I-d

In some embodiments, $R^A$ may be hydrogen; in some embodiments, $R^A$ may be methyl.

In some embodiments, $R^A$ may not be methyl.

In some embodiments, $R^B$ may be hydrogen. In other embodiments, $R^B$ may be methyl. In yet other embodiments, $R^B$ may be ethyl. In some embodiments, $R^B$ may be isopropyl.

In some embodiments, $R^A$ may be methyl and $R^B$ may be methyl. In other embodiments, $R^A$ may be methyl and $R^B$ may be ethyl.

In some embodiments, the chiral auxiliary is (1S,2S)-(+)-pseudoephedrine. In some embodiments, the chiral auxiliary is not (1S,2S)-(+)-pseudoephedrine. In other embodiments, the chiral auxiliary is (1S,2S)-2-(methylamino)-1-(p-tolyl)propan-1-ol. In other embodiments, the chiral auxiliary may be (1S,2S)-2-(ethylamino)-1-(p-tolyl)propan-1-ol. In some embodiments, the chiral auxiliary may be (1S,2S)-2-(isopropylamino)-1-(p-tolyl)propan-1-ol. In some embodiments, the chiral auxiliary may be (1S,2R)-2-(methylamino)-1-phenylpropan-1-ol. In other embodiments, the chiral auxiliary may be (1R,2S)-2-(methylamino)-1-(p-tolyl)propan-1-ol. In yet other embodiments, chiral auxiliary may be (1R,2S)-2-(ethylamino)-1-(p-tolyl)propan-1-ol. In some embodiments, the chiral auxiliary may be (1R,2S)-2-(isopropylamino)-1-(p-tolyl)propan-1-ol.

Some embodiments relate to a compound having the structure of Formula (B-III).

In some embodiments, the compound of Formula (B-III) has the structure of Formula (A-III). In some embodiments, the compound of Formula (A-III) has the structure of compound A-3. In some embodiments, the compound of Formula (B-III) is

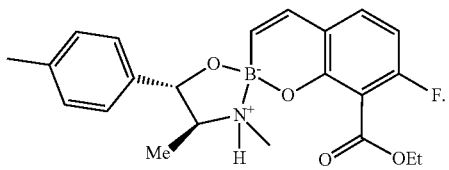 [SMILES: CCOC(=O)c1c(F)ccc2c1O[B-]1(C=C2)O[C@@H](c2ccc(C)cc2)[C@H](C)[NH+]1C]

In other embodiments, the compound of Formula (B-III) is

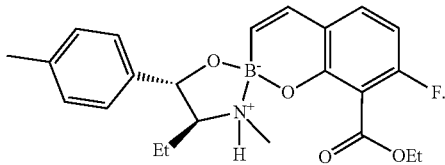 [SMILES: CCOC(=O)c1c(F)ccc2c1O[B-]1(C=C2)O[C@@H](c2ccc(C)cc2)[C@H](CC)[NH+]1C]

In some embodiments, the chiral complex of formula (A-III) can be reacted with a cyclopropanating agent to introduce a cyclopropyl group to form a compound of Formula (A-IV). In some embodiments, the cyclopropyl group is introduced by reacting the compound of formula (A-III) with a carbenoid or with diazomethane in the presence of a second catalyst. In some embodiments, the cyclopropyl group is introduced by reacting the compound of formula (A-III) with diazomethane. In some embodiments, the introduction of the cyclopropyl group in the compound of formula (A-III) is performed in the presence of a second catalyst. In some embodiments, the cyclopropyl group is introduced by reacting the compound of formula (A-III) with a cyclopropanating reagent comprising $CH_2I_2$ or $CH_2Br_2$; and one or more metal compounds. In some embodiments, the cyclopropanating reagent comprises $CH_2I_2$. In other embodiments, the cyclopropylating reagent comprises $CH_2Br_2$. In some embodiments, the metal compound comprises one or more metals selected from the group consisting of zinc, copper, samarium, aluminum, and silver. In some specific embodiments, the metal compound may be Zn/Cu couple, Zn/Ag couple, Sm/Hg couple, $ZnEt_2$, or a mixture of zinc and CuCl. In some embodiments, the cyclopropyl group is introduced by reacting the compound of formula (A-III) with $CH_2I_2$ and Zn/Cu couple. In other embodiments, the cyclopropyl group is introduced by reacting the compound of formula (A-III) with $CH_2Br_2$, Zn, and CuCl. In yet other embodiments, the cyclopropyl group is introduced by reacting the compound of formula (A-III) with $CH_2I_2$ and diethylzinc. In some embodiments, the cyclopropyl group is introduced using diazomethane. In some embodiments, the cyclopropyl group is introduced using diazomethane and a palladium catalyst. In some embodiments, the cyclopropyl group is introduced using diazomethane and palladium (II) acetate. In some embodiments, the cyclopropyl group is introduced using diazomethane and $Pd_2(DVTMS)_3$. In some embodiments, the cyclopropyl group is introduced using diazomethane and Pd(acac)$_2$. In some embodiments, the cyclopropyl group is introduced using diazomethane and Pd(TFA)$_2$. In some embodiments, the cyclopropyl group is introduced using diazomethane and Pd(OPiv)$_2$.

In some embodiments, the compound of Formula (B-III) undergoes a cyclopropanation reaction to form a compound of Formula (B-IV). In some embodiments, the cyclopropyl group is introduced by reacting the compound of formula (B-III) with a carbenoid or with diazomethane in the presence of a second catalyst. In some embodiments, the cyclopropyl group is introduced by reacting the compound of formula (B-III) with diazomethane. In some embodiments, the introduction of the cyclopropyl group in the compound of formula (B-III) is performed in the presence of a second catalyst. In some embodiments, the cyclopropyl group is introduced by reacting the compound of formula (B-III) with a cyclopropanating reagent comprising $CH_2I_2$ or $CH_2Br_2$; and one or more metal compounds. In some embodiments, the cyclopropanating reagent comprises $CH_2I_2$. In other embodiments, the cyclopropylating reagent comprises $CH_2Br_2$. In some embodiments, the metal compound comprises one or more metals selected from the group consisting of zinc, copper, samarium, aluminum, and silver. In some specific embodiments, the metal compound may be Zn/Cu couple, Zn/Ag couple, Sm/Hg couple, $ZnEt_2$, or a mixture of zinc and CuCl. In some embodiments, the cyclopropyl group is introduced by reacting the compound of formula (A-III) with $CH_2I_2$ and Zn/Cu couple. In other embodiments, the cyclopropyl group is introduced by reacting the compound of formula (B-III) with $CH_2Br_2$, Zn, and CuCl. In yet other embodiments, the cyclopropyl group is introduced by reacting the compound of formula (B-III) with $CH_2I_2$ and diethylzinc. In some embodiments, the cyclopropyl group is introduced using diazomethane. In some embodiments, the cyclopropyl group is introduced using diazomethane and a palladium catalyst. In some embodiments, the cyclopropyl group is introduced using diazomethane and palladium (II) acetate. In some embodiments, the compound of Formula B-IV is

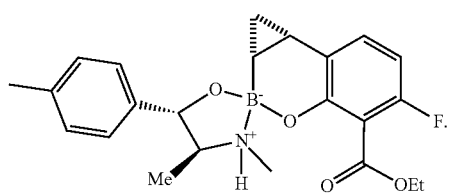

In other embodiments, the compound of Formula B-IV is

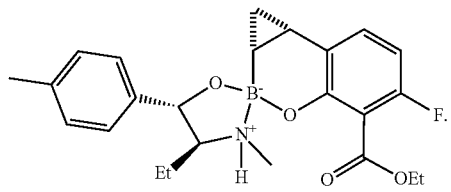

In some embodiments, the compound of formula (A-IV) can be made with an enantiomeric excess of greater than about 50%, about 60%, about 70%, about 80%, about 90%, about 95%, about 98%, about 99%. In some embodiments, the compound of formula (A-IV) can be made with an enantiomeric excess of less than about 50%, about 60%, about 70%, about 80%, about 90%, about 95%, about 98%, about 99%. In some embodiments, the compound of formula (A-IV) can be made with an enantiomeric excess in the range of about 30%-60%, about 30%-80%, about 30%-90%, 40%-60%, about 40%-80%, about 40%-90%, about 50%-90%, about 30%-99%, about 40%-99%, or about 50%-99%. In some embodiments, the synthesis of the compound of formula (A-IV) can be achieved with an enantiomeric excess of greater than about 50%, about 60%, about 70%, about 80%, about 90%, or about 95%.

In some embodiments, the compound of formula (B-IV) can be made with an enantiomeric excess of greater than about 50%, about 60%, about 70%, about 80%, about 90%, about 95%, about 98%, about 99%. In some embodiments, the compound of formula (B-IV) can be made with an enantiomeric excess of less than about 50%, about 60%, about 70%, about 80%, about 90%, about 95%, about 98%, about 99%. In some embodiments, the compound of formula (B-IV) can be made with an enantiomeric excess in the range of about 30%-60%, about 30%-80%, about 30%-90%, 40%-60%, about 40%-80%, about 40%-90%, about 50%-90%, about 30%-99%, about 40%-99%, or about 50%-99%. In some embodiments, the synthesis of the compound of formula (B-IV) can be achieved with an enantiomeric excess of greater than about 50%, about 60%, about 70%, about 80%, about 90%, or about 95%.

Scheme A below summarizes the synthetic route for compound I' described herein starting from compound (A-1), which is a compound of Formula (A-I) wherein $R^1$ is ethyl and the chiral auxiliary is (1S,2S)-(+)-pseudoephedrine. This reaction sequence can lead to high enantioselectivity in the cyclopropanation step, leading to Compound I' with high optical purity. In some embodiments, the reaction can be performed in an organic solvent selected from toluene, THF, MeTHF, dioxane, and any combination thereof.

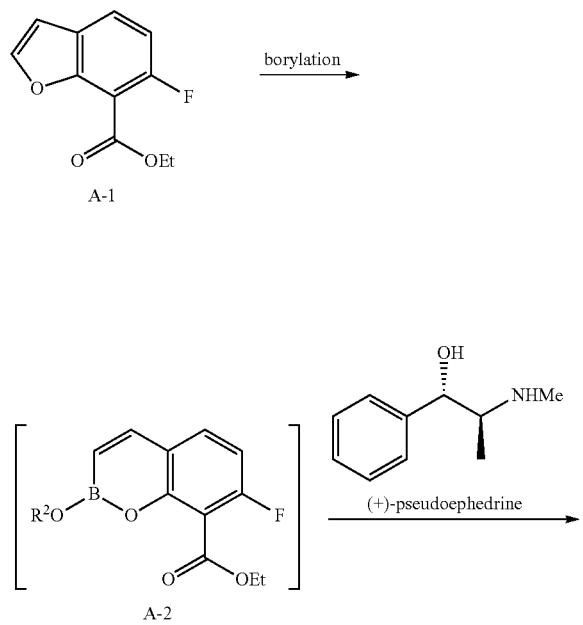

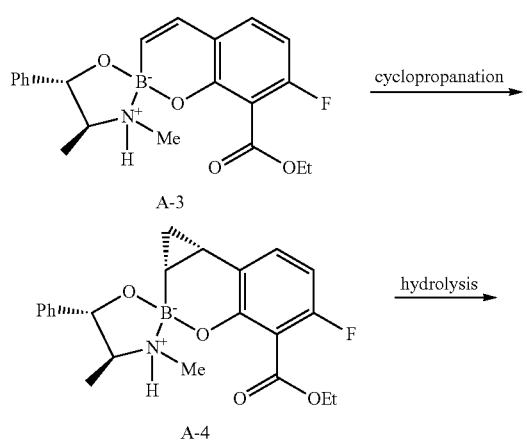

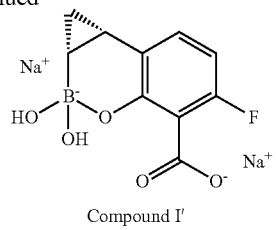

Compound I'

Alternatively, Compound A-3 may first be converted to Compound A-5 and then hydrolyzed to form Compound I'. Conversion of Compound A-3 to A-5 and subsequently hydrolyzing compound A-5 may result in more efficient synthesis and purification leading to improved yields and purity for Compound I'. The synthesis is shown in Scheme A' below.

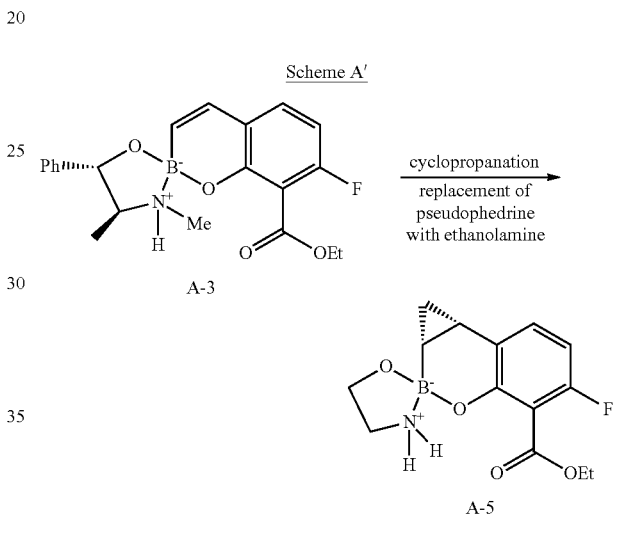

Compound A-3 may be converted to Compound A-5 using the cyclopropanating conditions described herein. In some embodiments, Compound A-3 may be treated with zinc/copper couple and $CH_2I_2$. In other embodiments, Compound A-3 may be treated with zinc/copper couple and $CH_2Br_2$. In other embodiments, Compound A-3 may be treated with zinc, CuCl, and $CH_2Br_2$. Once cyclopropanation is achieved, an organic the crude product may be washed with aqueous acid to remove pseudoephedrine and subsequently treated with ethanolamine to obtain Compound A-5.

Scheme B below summarizes the synthetic route for compound I' described herein starting from compound (A-1), which is a compound of Formula (A-I) wherein $R^1$ is ethyl, and the chiral auxiliary is Aux-I-a. Thus, compounds (B-III) and (B-IV) are shown as the ethyl ester. This reaction sequence can lead to high enantioselectivity in the cyclopropanation step, leading to Compound I' with high optical purity. In some embodiments, the reaction can be performed in an organic solvent selected from toluene, THF, MeTHF, dioxane, and any combination thereof. In some embodiments, compound (B-III) may alternatively be cyclopropanated and subsequently converted to compound (B-V), ultimately leading to the formation of Compound I'

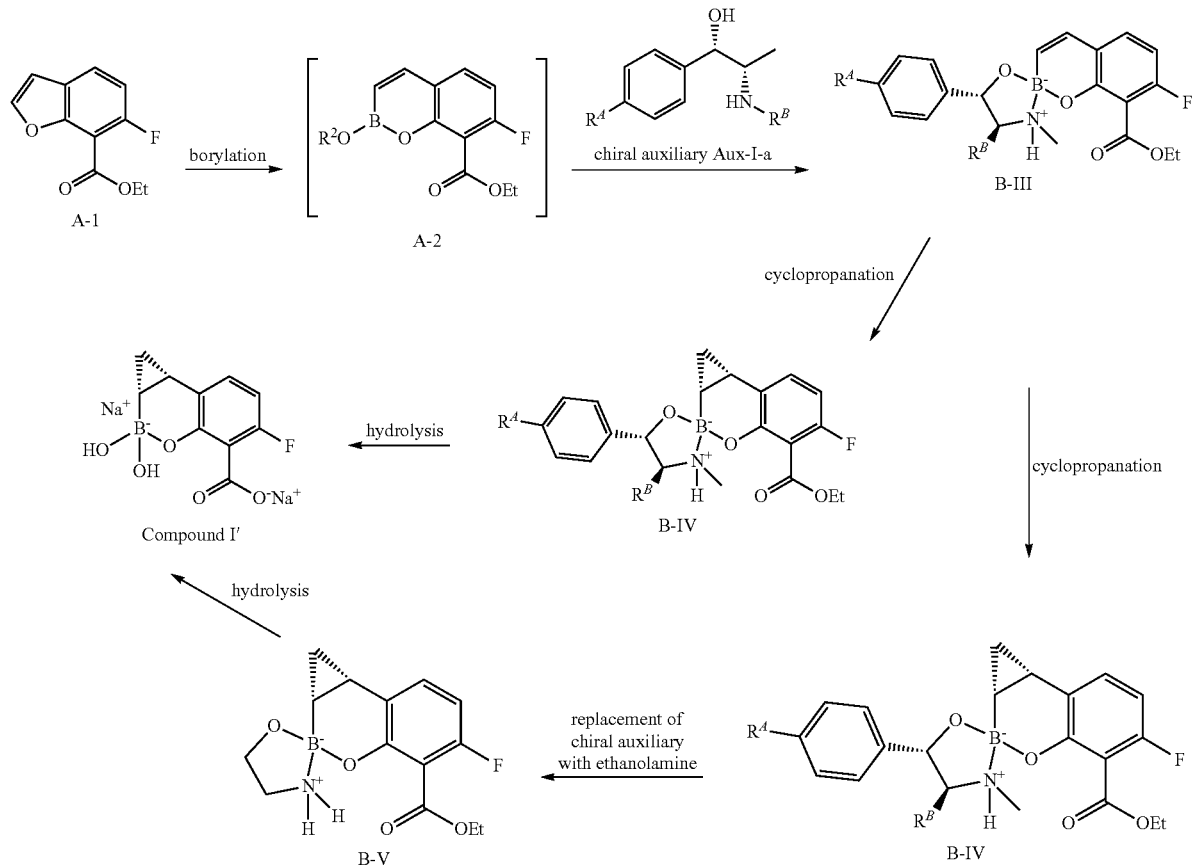

Scheme B

In some embodiments described herein, the compound of Formula (B-IV) or Formula (B-V) may be washed with aqueous acid prior to hydrolysis. Such treatment with aqueous acid may lead to the removal of unwanted impurities and leads to improved purity of Compound I' formed in the hydrolysis step.

Some embodiments relate to a method of making Compound I', comprising the step of: reacting a compound of formula (A-I) with a borylating agent in the presence of a nickel catalyst precursor and a base system to form a compound of Formula (A-II). In some embodiments, the compound of Formula (A-I) is compound A-1. In some embodiments, the compound of Formula (A-II) is compound A-2.

Figure 8:
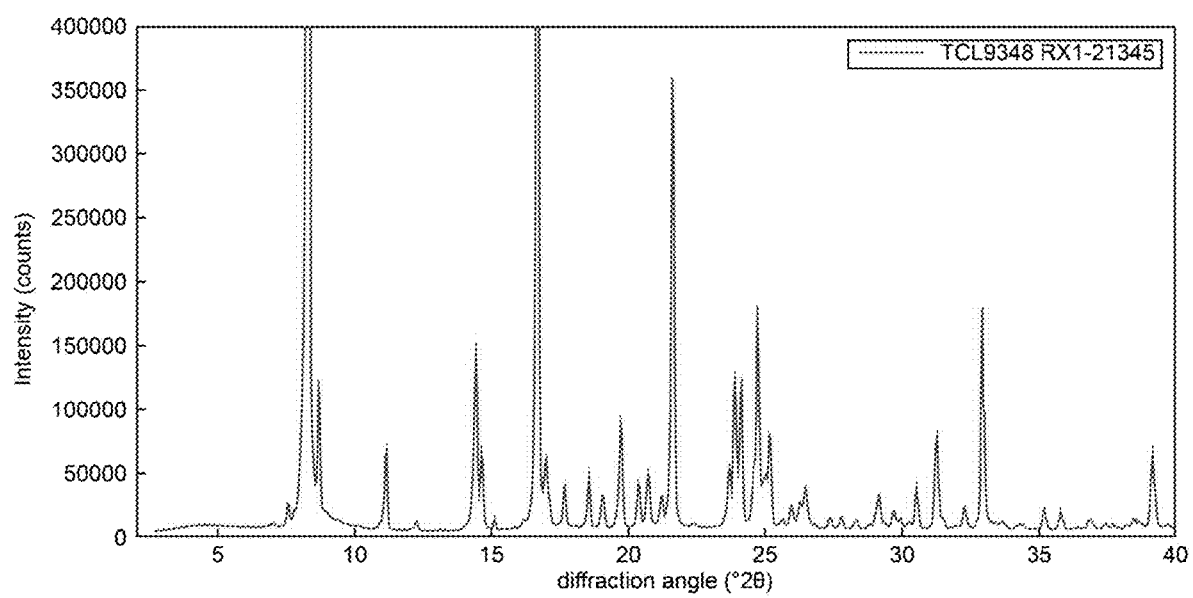
FIG. 8 is an X-ray powder diffraction pattern of a crystalline form of Compound A-3.

FIG. 8 shows the crystalline structure of compound A-3 as determined by XRPD. Compound A-3 exhibits prominent peaks at approximately 7.6. 8.0, 10.4, 13.7, 14.0, 16.0, 16.3, 19.0, 20.9, 23.2, 23.4, and 24.4 degrees 2θ. Thus, in some embodiments, a crystalline form of compound A-3 has at least one characteristic peak (e.g., one, two, three, four, five, six, seven, eight, nine, ten, eleven, or twelve characteristic peaks) selected from approximately 7.6. 8.0, 10.4, 13.7, 14.0, 16.0, 16.3, 19.0, 20.9, 23.2, 23.4, and 24.4 degrees 2θ. In some embodiments, a crystalline form of compound A03 has at least three characteristic peaks selected from approximately 7.6. 8.0, 10.4, 13.7, 14.0, 16.0, 16.3, 19.0, 20.9, 23.2, 23.4, and 24.4 degrees 2θ.

Figure 9:
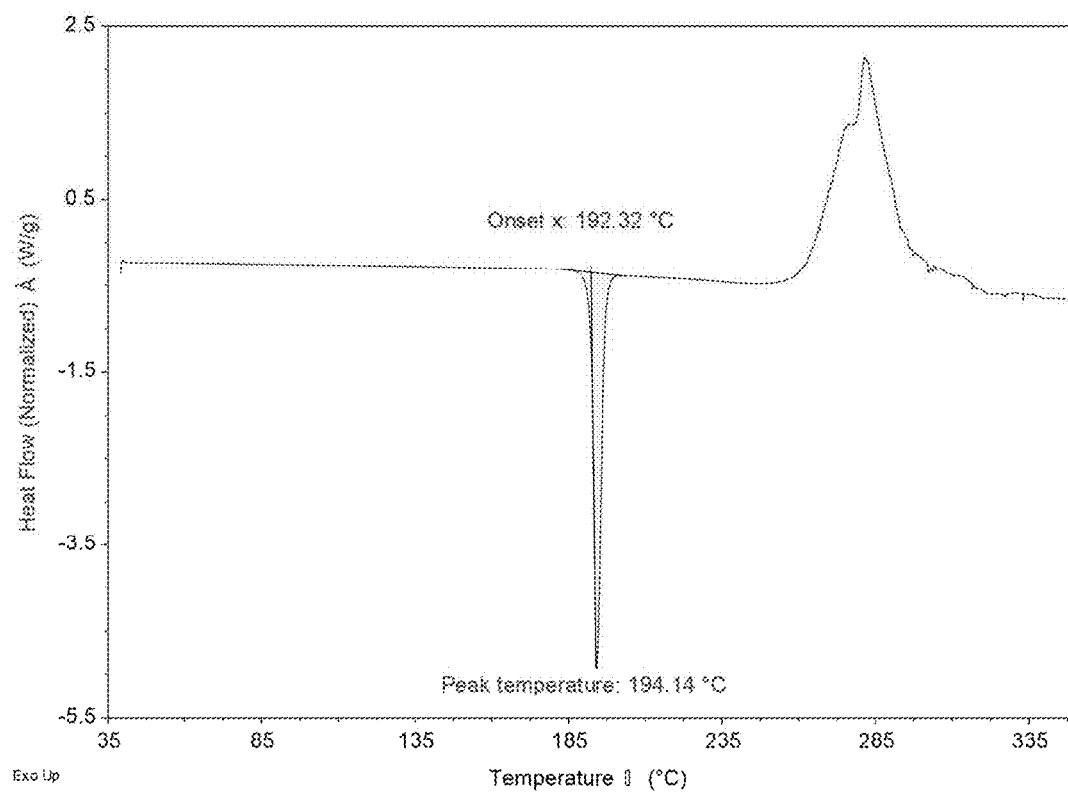
FIG. 9 shows a differential scanning calorimetry analysis for a crystalline form of Compound A-3.

FIG. 9 shows results obtained by DSC for crystalline compound A-3. The DSC results show a peak at temperature of about 194° C., which indicates the melting point for the crystal. Accordingly, in some embodiments, crystalline compound A-3 exhibits a melting point from about 191° C. to about 197° C., from about 192° C. to about 196° C., or at about 194° C.

Figure 10:
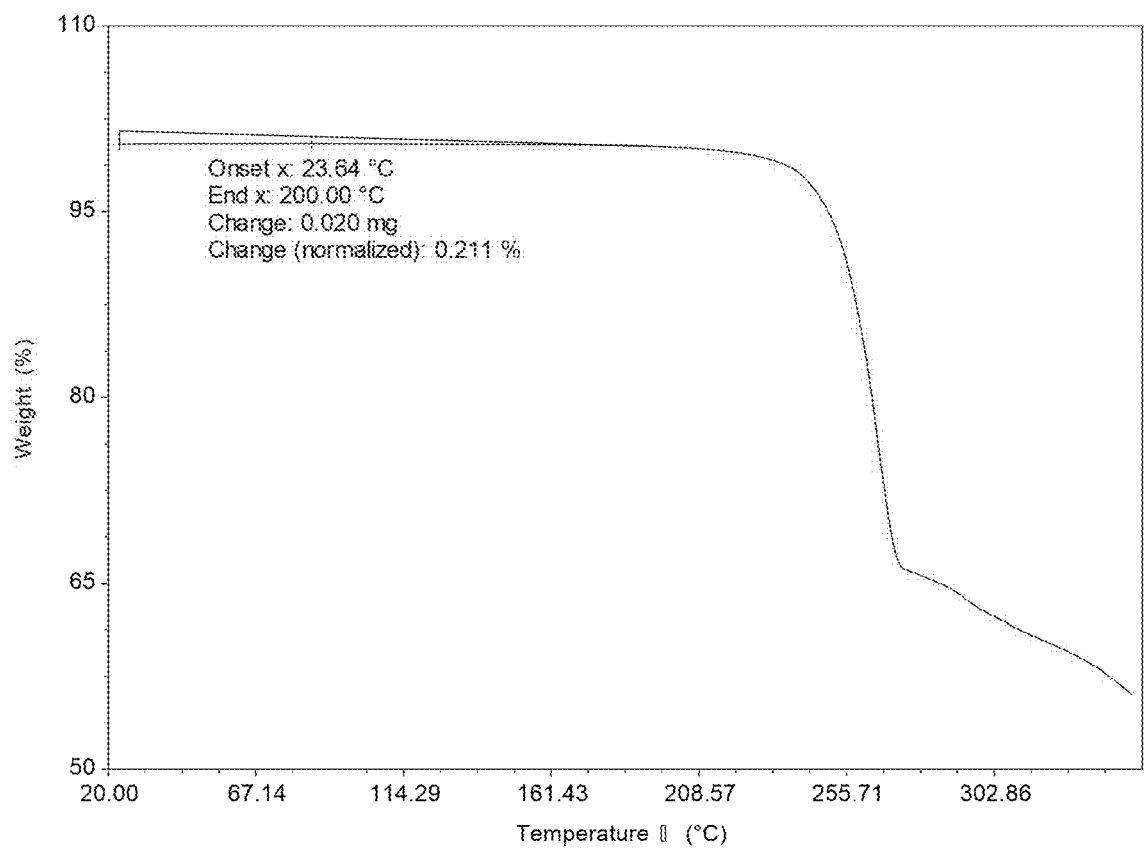
FIG. 10 shows thermogravimetric analysis results for a crystalline form of Compound A-3.
Figure 11:
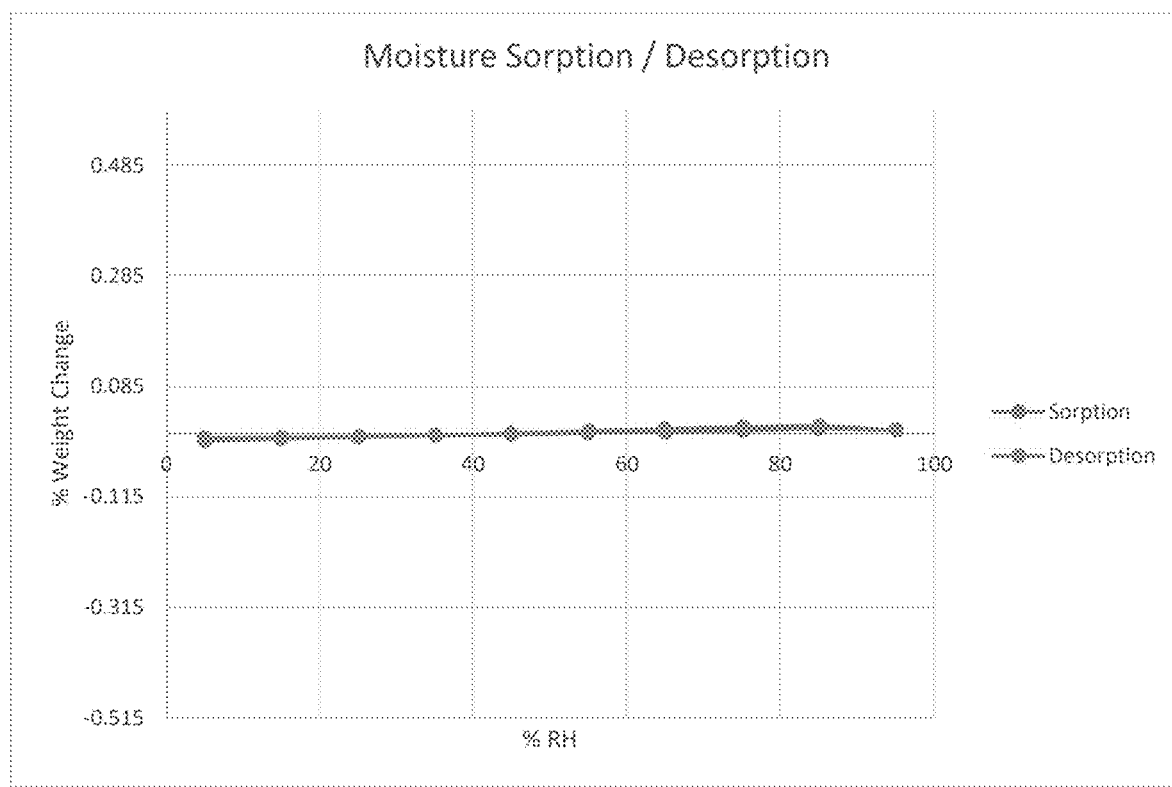
FIG. 11 shows dynamic vapor sorption results for a crystalline form of Compound A-3.

FIG. 10 shows results obtained by TGA for crystalline compound A-3. The TGA results show that crystalline compound A-3 exhibited a 0.21% weight loss when carried from 25° C. to 350° C. Meanwhile, FIG. 11 shows DVS results for crystalline compound A-3, and shows no significant water uptake and indicates that crystalline compound A-3 is not hygroscopic.

Figure 12:
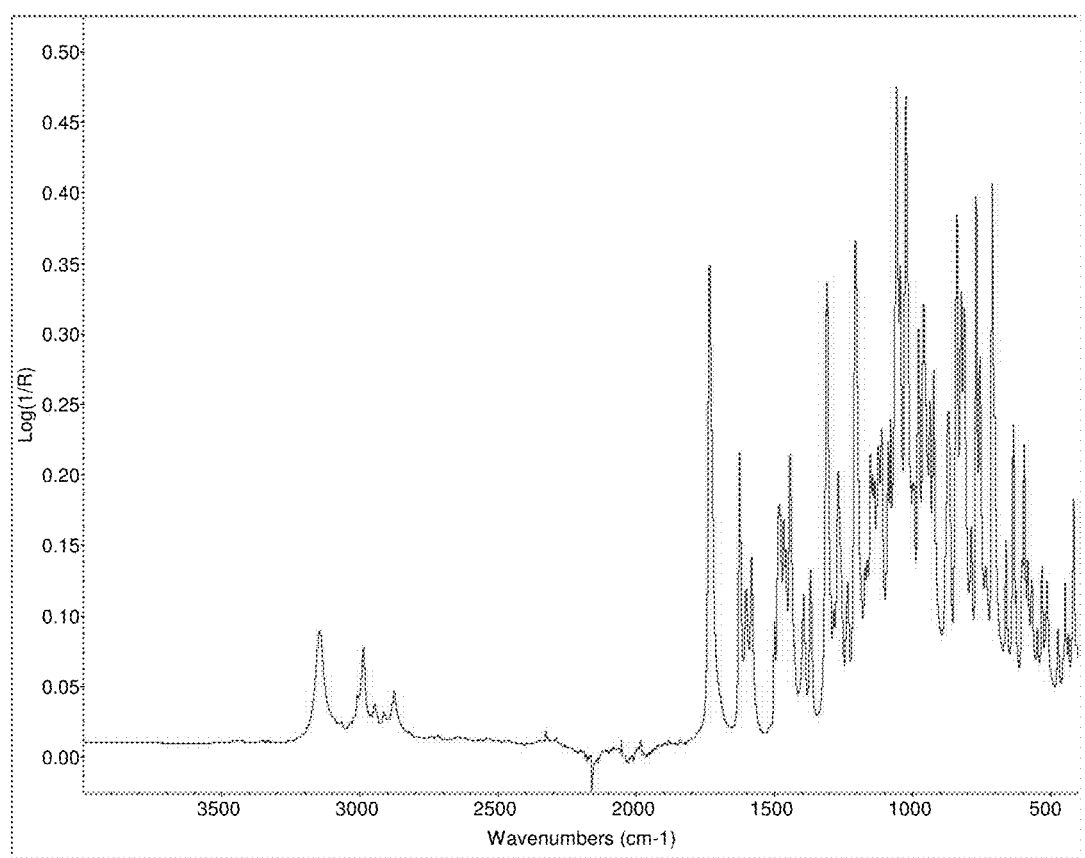
FIG. 12 shows results obtained by FTIR spectroscopy for a crystalline form of Compound A-3.

FIG. 12 shows results obtained by Fourier Transform Infrared (FTIR) spectroscopy for crystalline compound A-3. Crystalline compound A-3 exhibits prominent peaks at approximately 3143, 2984, 2873, 1731, 1622, 1598, 1578, 1306, 1202, 1053, and 1019 cm$^{-1}$. Thus, in some embodiments, a crystalline form of compound A-3 has at least one characteristic FTIR peak (e.g., one, two, three, four, five, six, seven, eight, nine, ten, or eleven characteristic peaks) selected from approximately 3143, 2984, 2873, 1731, 1622, 1598, 1578, 1306, 1202, 1053, and 1019 cm$^{-1}$. In some embodiments, a crystalline form of compound A-3 has at least three characteristic peaks selected from 3143, 2984, 2873, 1731, 1622, 1598, 1578, 1306, 1202, 1053, and 1019 cm$^{-1}$. In some embodiments, peak positions recited herein include variability within ±2 cm$^{-1}$.

Figure 13:
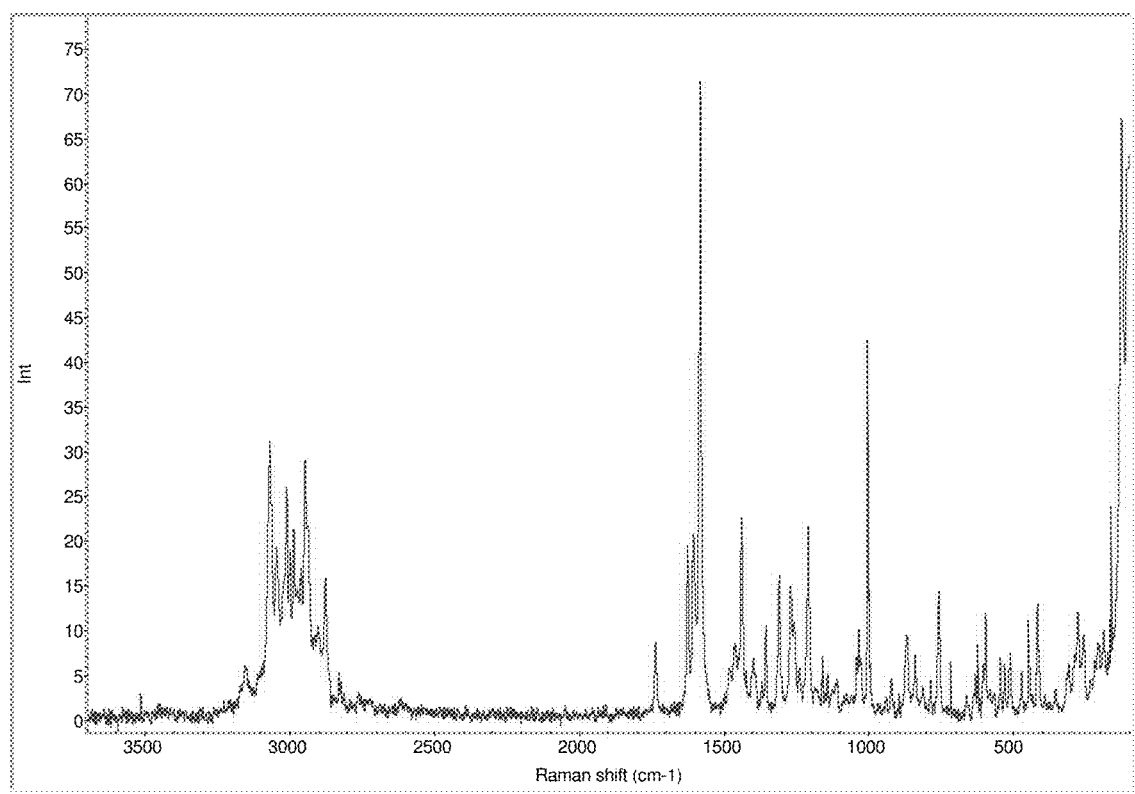
FIG. 13 shows results obtained by FT Raman spectroscopy for a crystalline form of Compound A-3.

FIG. 13 shows results obtained by Fourier Transform Raman spectroscopy for crystalline compound A-3. Crystalline compound A-3 exhibits prominent peaks at approximately 3066, 3007, 2943, 2873, 1733, 1623, 1603, 1579, and 1437 cm$^{-1}$. Thus, in some embodiments, a crystalline form of compound A-3 has at least one characteristic FT Raman peak (e.g., one, two, three, four, five, six, seven, eight, or nine characteristic peaks) selected from approximately 3066, 3007, 2943, 2873, 1733, 1623, 1603, 1579, and 1437 cm$^{-1}$. In some embodiments, a crystalline form of compound A-3 has at least three characteristic peaks selected from 3066, 3007, 2943, 2873, 1733, 1623, 1603, 1579, and 1437 cm$^{-1}$. In some embodiments, peak positions recited herein include variability within ±2 cm$^{-1}$.

Figure 14:
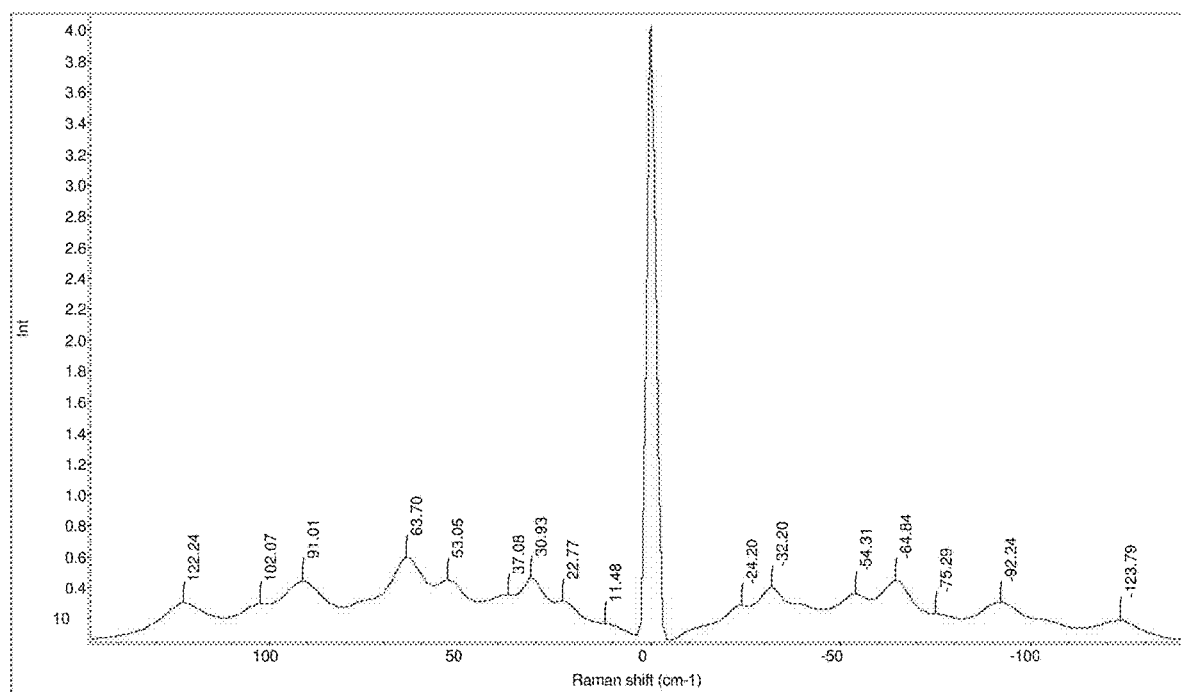
FIG. 14 shows results obtained by low frequency Raman (LF Raman) spectroscopy for a crystalline form of Compound A-3

FIG. 14 shows results obtained by Low Frequency Raman (LF Raman) spectroscopy for crystalline compound A-3. Crystalline compound A-3 exhibits prominent peaks at approximately 122, 102, 91, 64, 53, 37, 31, 23, and 11 cm$^{-1}$. Thus, in some embodiments, a crystalline form of compound A-3 has at least one characteristic FT Raman peak (e.g., one, two, three, four, five, six, seven, eight, or nine characteristic peaks) selected from approximately 122, 102, 91, 64, 53, 37, 31, 23, and 11 cm$^{-1}$. In some embodiments, a crystalline form of compound A-3 has at least three characteristic peaks selected from 122, 102, 91, 64, 53, 37, 31, 23, and 11 cm$^{-1}$. In some embodiments, peak positions recited herein include variability within ±2 cm$^{-1}$.

Figure 15:
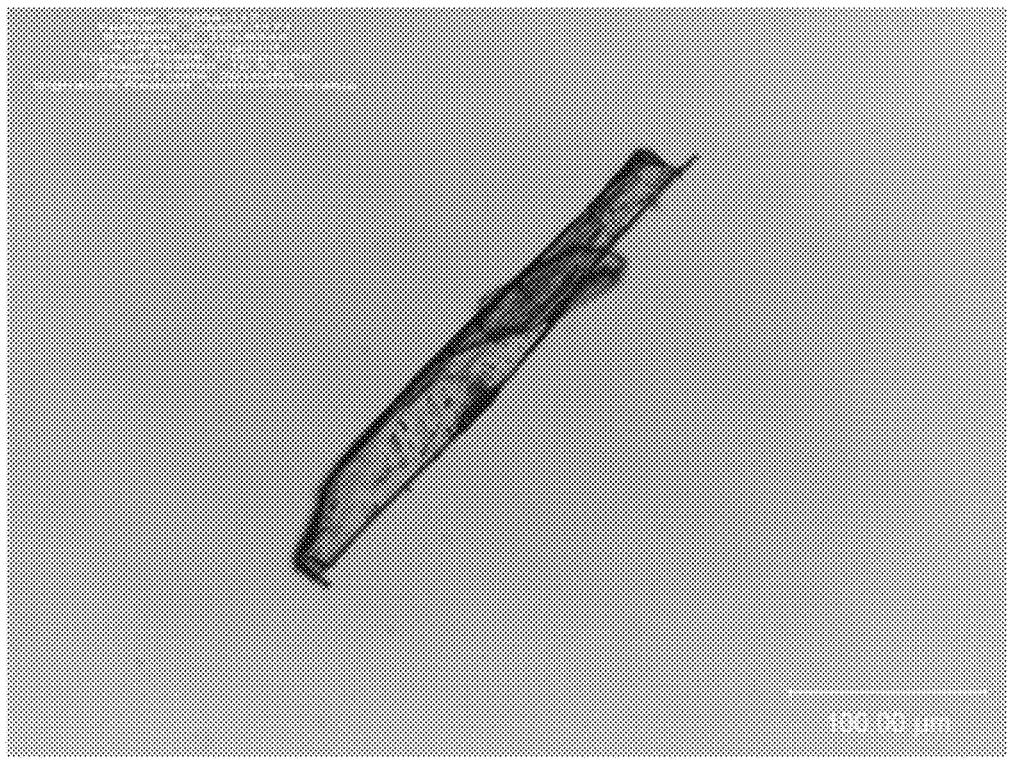
FIG. 15 is an optical microscopy image of a crystalline form of Compound A-3.
Figure 16:
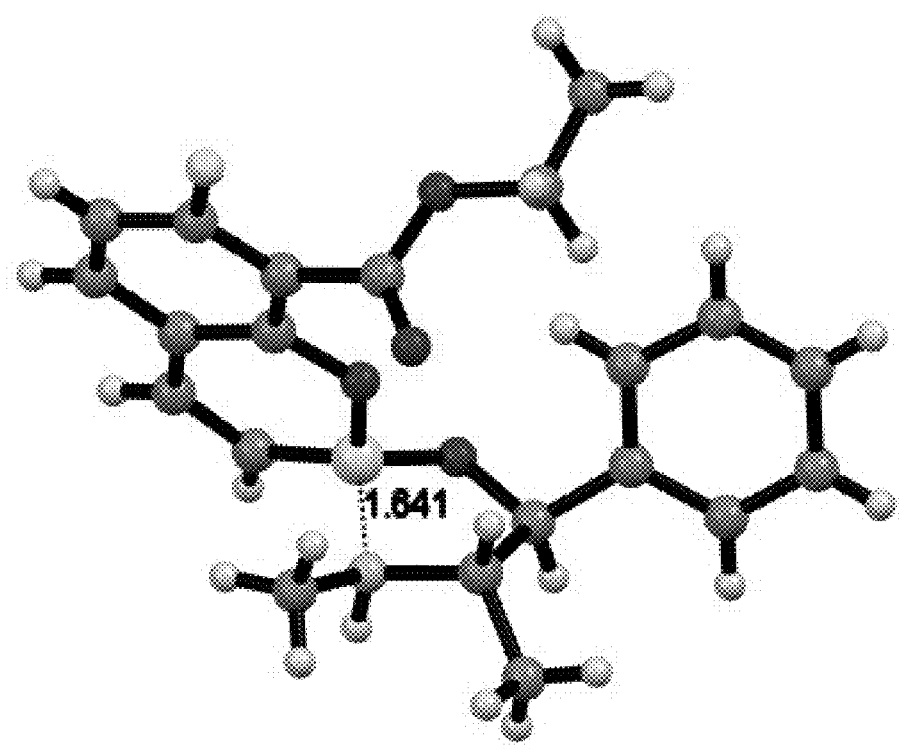
FIG. 16 shows the asymmetric unit of the crystal structure of Compound A-3.

Compound A-3 can therefore be characterized as an unsolvated, non-hygroscopic solid. Compound A-3 also shows good crystallinity with large blade shaped crystals (FIG. 15) and a relatively high melting point (approximately 194° C.). Single crystal X-ray structure determination reveals that compound A-3 has a monoclinic crystal system with a P2$_1$ space group and has the following dimensions: a (Å)=11.191 (4), b (Å)=7.751 (3), c (Å)=11.795 (4), β=95.867 (12) °, V=1017.8 (6) Å$^3$. Z=2. The asymmetric unit of the crystal structure of compound A-3 has a B—N bond distance of 1.641 Å (FIG. 16)

Some embodiments relate to a method of making Compound I', comprising the step of: reacting a compound of Formula (A-III) with a cyclopropylating agent in the presence of optional catalyst to provide a compound of Formula (A-IV). In some embodiments, the cyclopropanating agent is CH$_2$N$_2$. In some embodiments, the optional catalyst is a palladium catalyst. In some embodiments, the palladium catalyst is Pd(OAc)$_2$. In some embodiments, the compound of Formula (A-IV) is compound A-4.

Figure 17:
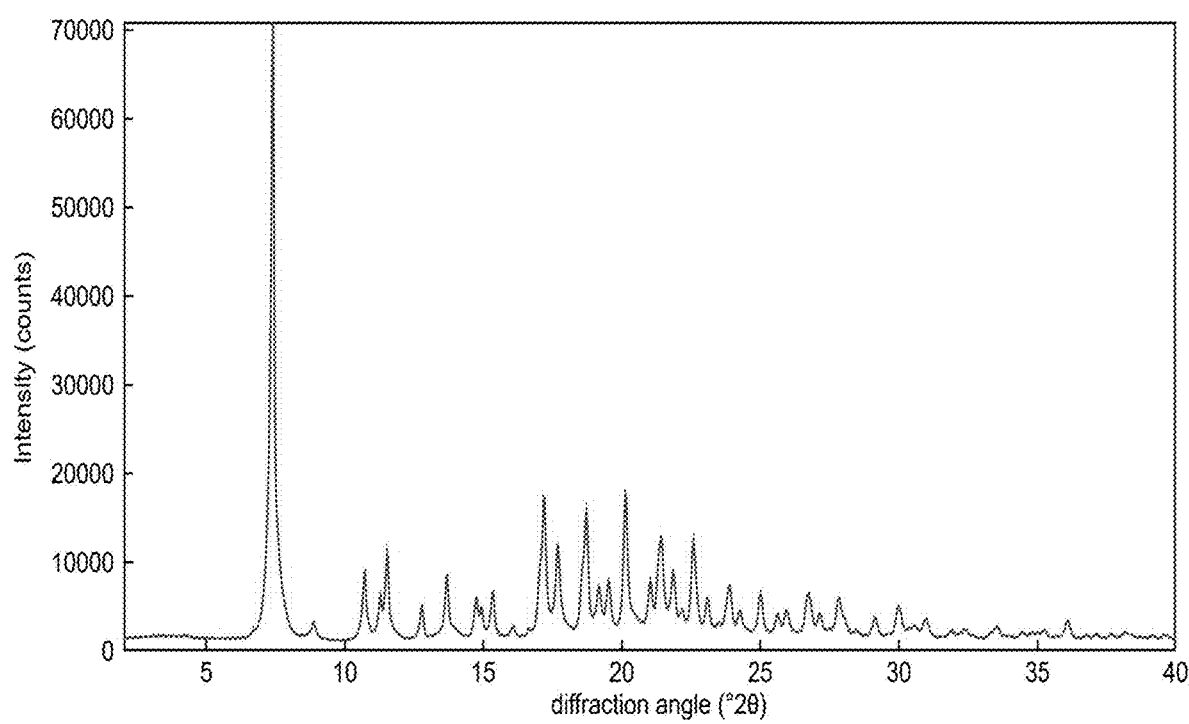
FIG. 17 is an X-ray powder diffraction pattern of a crystalline form of Compound A-4.

FIG. 17 shows a crystalline structure of compound A-4 as determined by XRPD. Crystalline compound A-4 exhibits prominent peaks at approximately 7.4, 8.9, 10.7, 11.2, 11.5, 12.8, 13.7, 15.3, 17.0, 17.7, 18.7, 20.1, 21.4, and 22.6 degrees 2θ. Thus, in some embodiments, a crystalline form of compound A-4 has at least one characteristic peak (e.g., one, two, three, four, five, six, seven, eight, nine, ten, eleven, twelve, thirteen, or fourteen characteristic peaks) selected from approximately 7.4, 8.9, 10.7, 11.2, 11.5, 12.8, 13.7, 15.3, 17.0, 17.7, 18.7, 20.1, 21.4, and 22.6 degrees 2θ. In some embodiments, a crystalline form of compound A-4 has at least three characteristic peaks selected from approximately 7.4, 8.9, 10.7, 11.2, 11.5, 12.8, 13.7, 15.3, 17.0, 17.7, 18.7, 20.1, 21.4, and 22.6 degrees 2θ.

Figure 18:
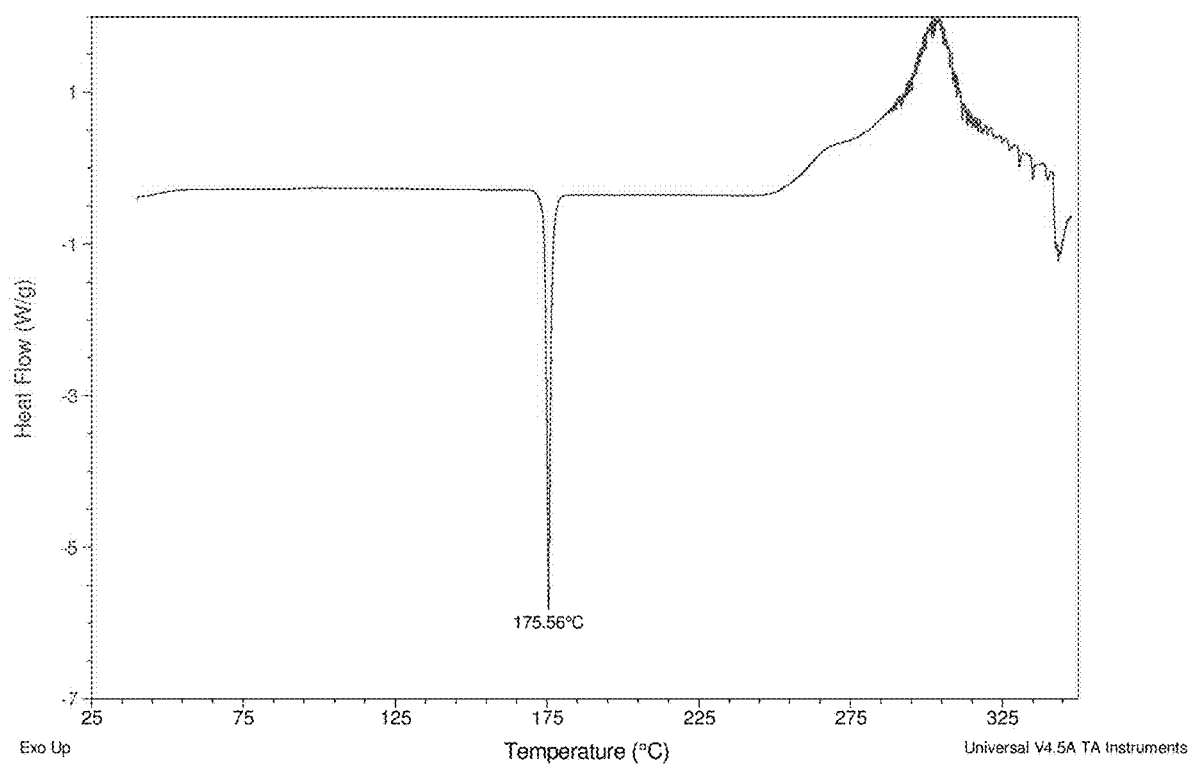
FIG. 18 shows a differential scanning calorimetry analysis for a crystalline form of Compound A-4.

FIG. 18 shows results obtained by DSC for crystalline compound A-4. The DSC results show a peak at temperature of about 176° C., which indicates the melting point for the crystal. Accordingly, in some embodiments, crystalline compound A-4 exhibits a melting point from about 173° C. to about 179° C., from about 174° C. to about 178° C., or at about 176° C.

Figure 19:
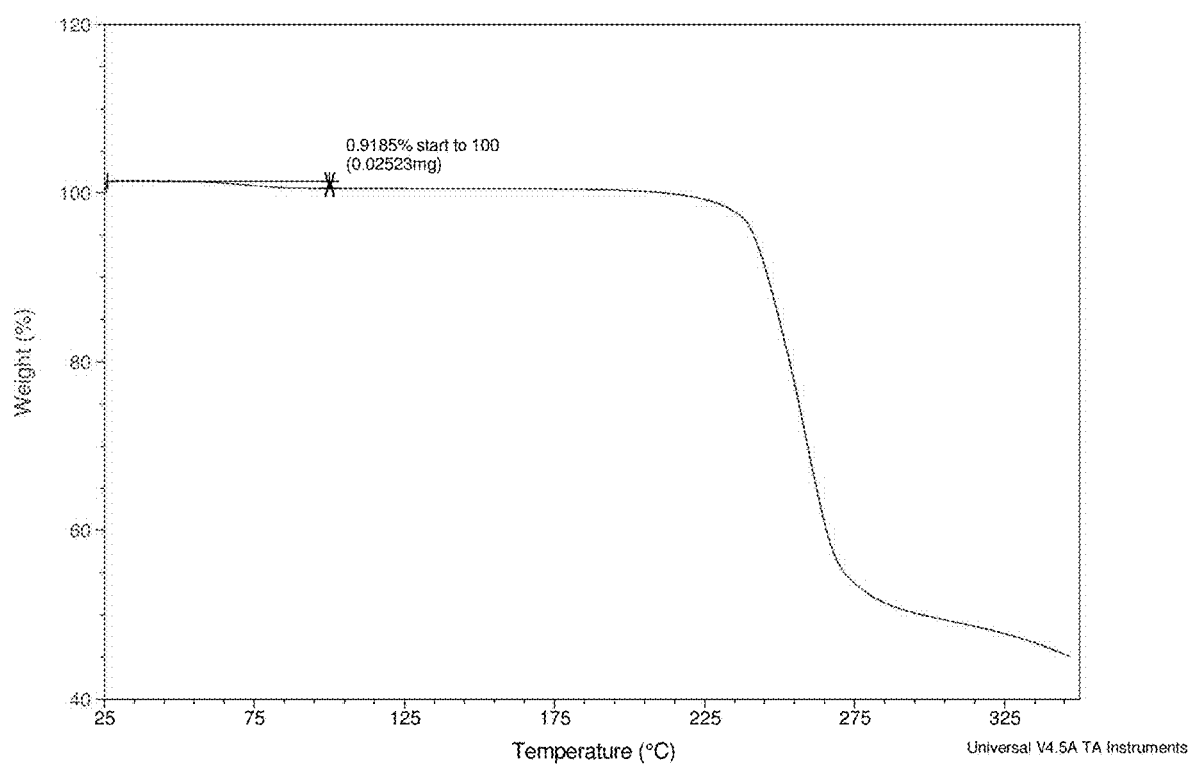
FIG. 19 shows thermogravimetric analysis results for a crystalline form of Compound A-4.
Figure 20:
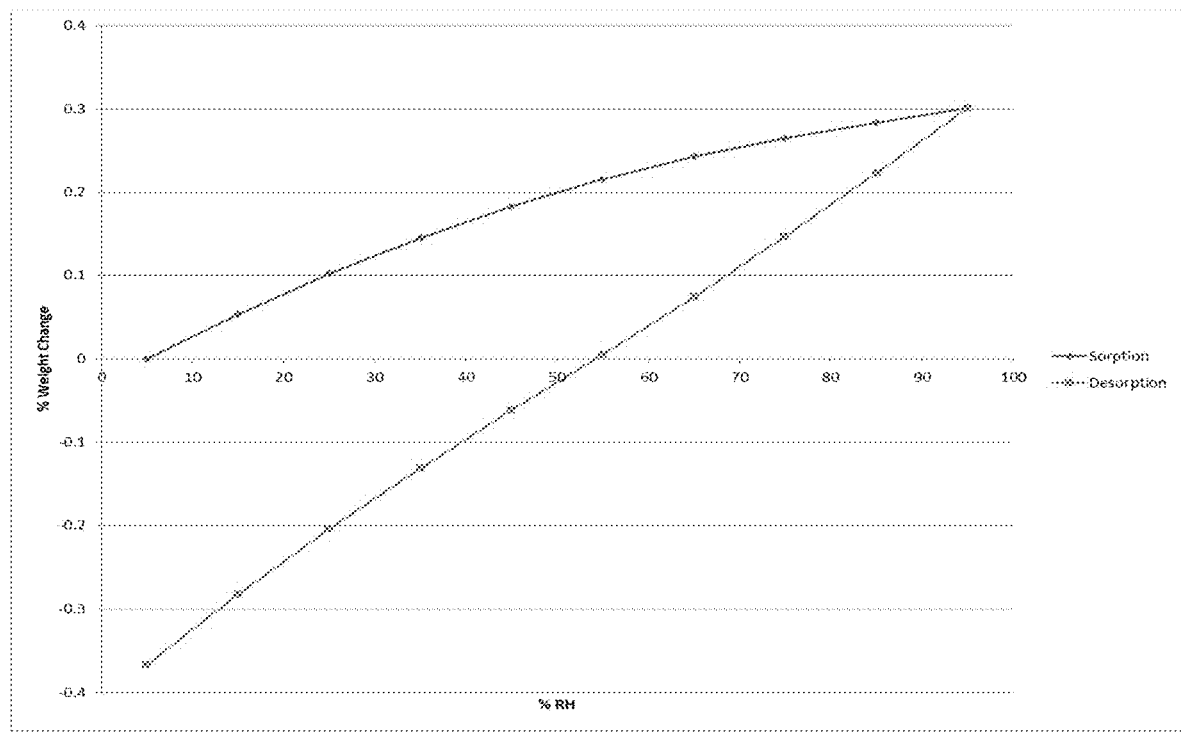
FIG. 20 shows dynamic vapor sorption results for a crystalline form of Compound A-4.

FIG. 19 shows results obtained by TGA for crystalline compound A-4. The TGA results show that crystalline compound A-4 exhibited a 0.92% weight loss below 100° C. FIG. 20 shows DVS results for crystalline compound A-4, shows no significant water uptake and indicates that crystalline compound A-4 is not hygroscopic.

Figure 21:
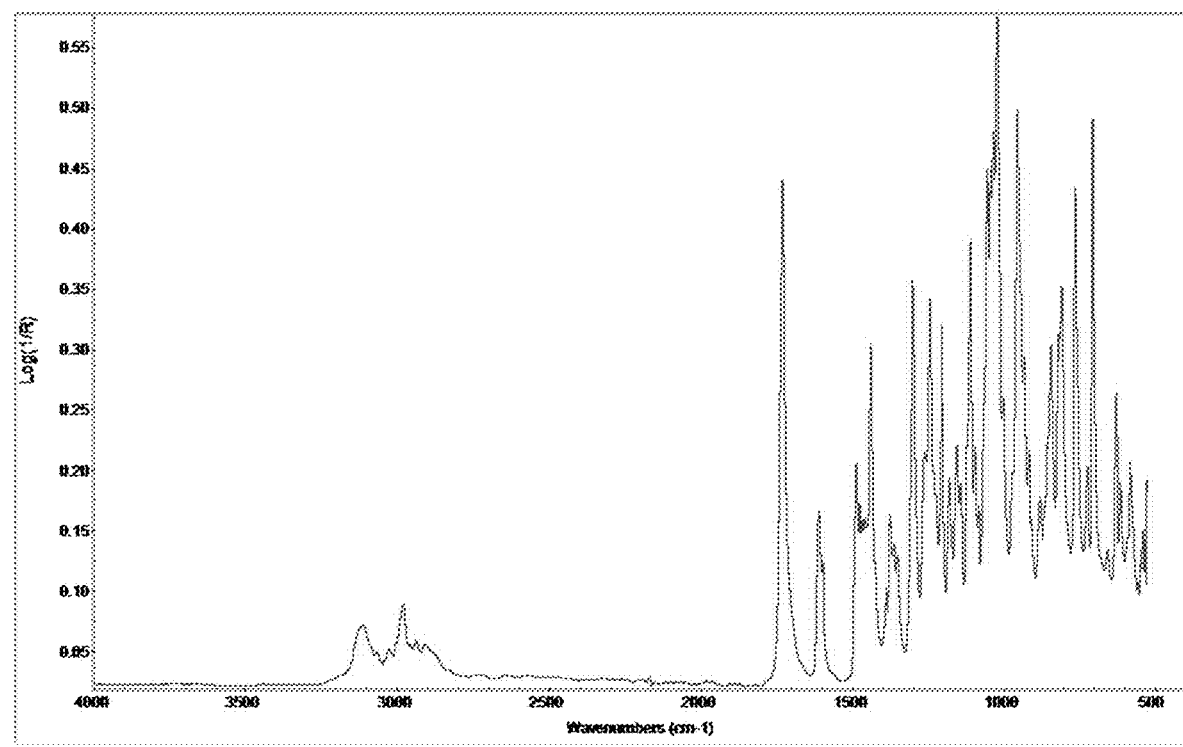
FIG. 21 shows results obtained by FTIR spectroscopy for a crystalline form of Compound A-4.

FIG. 21 shows results obtained by Fourier Transform Infrared (FTIR) spectroscopy for crystalline compound A-4. Crystalline compound A-4 exhibits prominent peaks at approximately 1727, 1608, 1481, 1437, and 1298 cm$^{-1}$. Thus, in some embodiments, a crystalline form of compound A-4 has at least one characteristic FTIR peak (e.g., one, two, three, four, or five characteristic peaks) selected from approximately 1727, 1608, 1481, 1437, and 1298 cm$^{-1}$. In some embodiments, a crystalline form of compound A-4 has at least three characteristic peaks selected from 1727, 1608, 1481, 1437, and 1298 cm$^{-1}$. In some embodiments, peak positions recited herein include variability within ±1 cm$^{-1}$.

Figure 22:
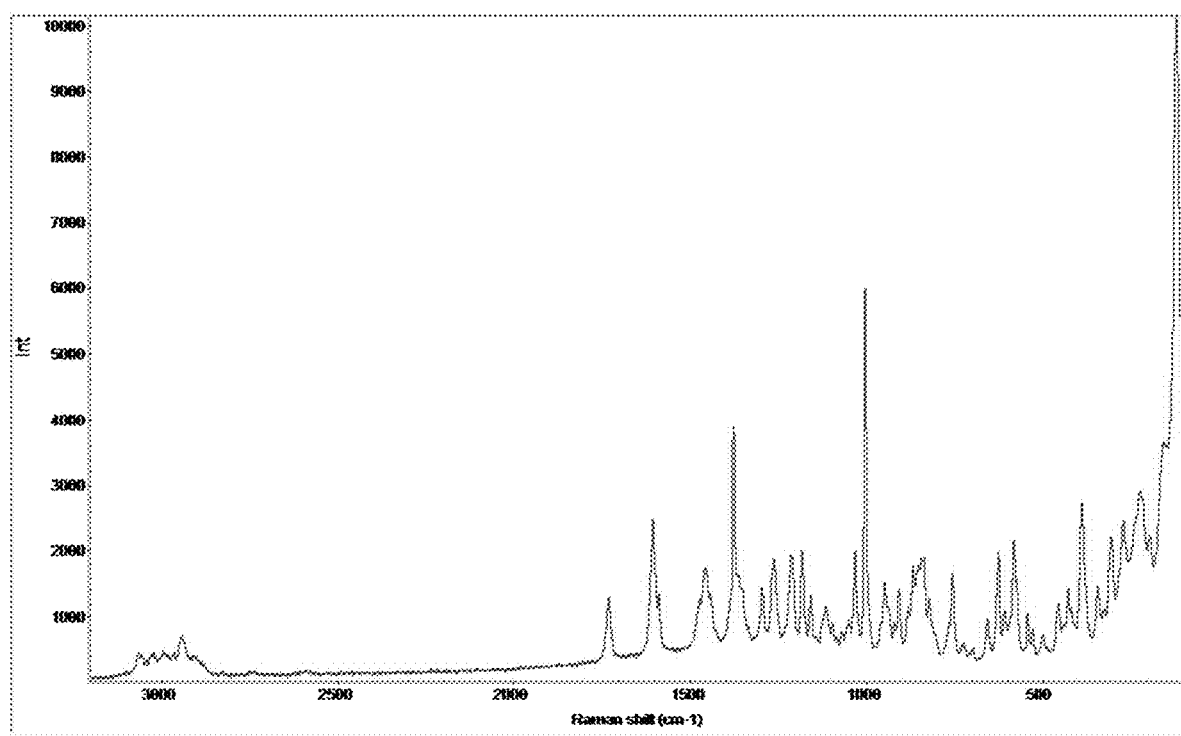
FIG. 22 shows results obtained by FT Raman spectroscopy for a crystalline form of Compound A-4.

FIG. 22 shows results obtained by Fourier Transform Raman spectroscopy for crystalline compound A-4. Crystalline compound A-4 exhibits prominent peaks at approximately 1730, 1602, 1455, and 1437 cm$^{-1}$. Thus, in some embodiments, a crystalline form of compound A-4 has at least one characteristic FT Raman peak (e.g., one, two, three, or four characteristic peaks) selected from approximately 1730, 1602, 1455, and 1437 cm$^{-1}$. In some embodiments, a crystalline form of compound A-4 has at least three characteristic peaks selected from 1730, 1602, 1455, and 1437 cm$^{-1}$. In some embodiments, peak positions recited herein include variability within ±2 cm$^{-1}$.

Figure 23:
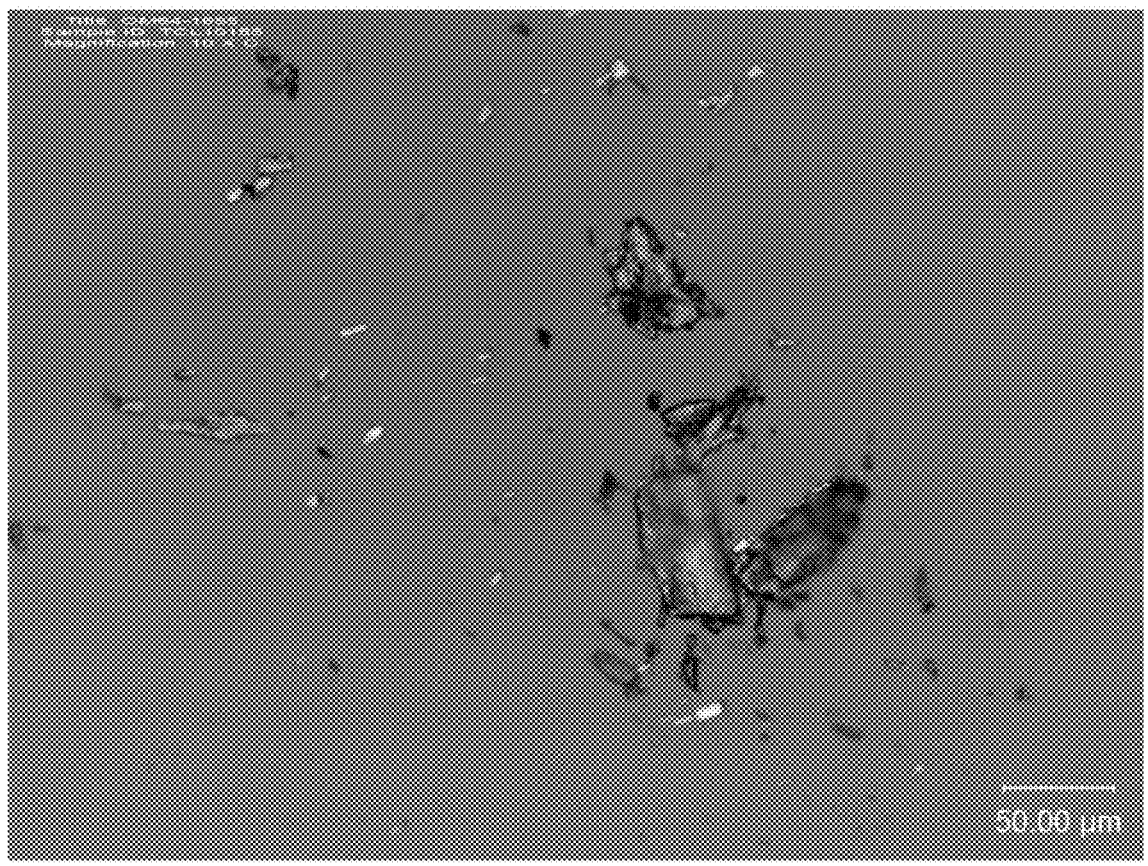
FIG. 23 shows an optical microscopy image of a crystalline form of Compound A-4.

Compound A-4 can therefore be characterized as an unsolvated, non-hygroscopic solid. Compound A-4 also shows good crystallinity with blade shaped crystals of varying size and shape (FIG. 23) and a relatively high melting point (approximately 176° C.).

Figure 26:
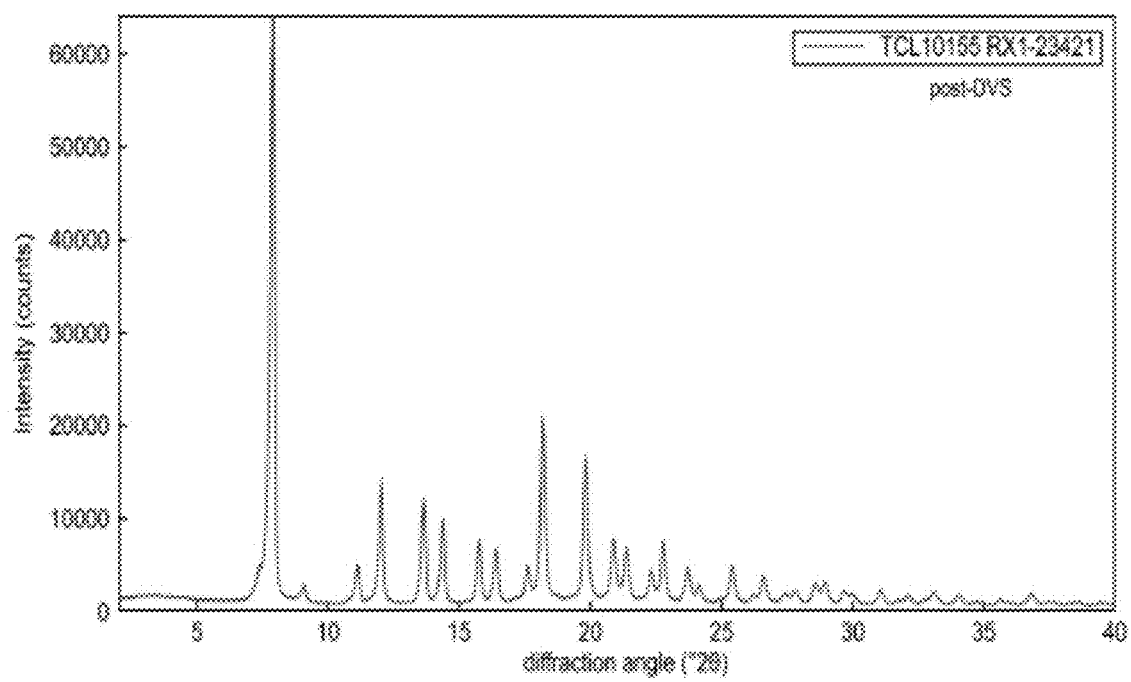
FIG. 26 is an X-ray powder diffraction pattern of a crystalline form of Compound A-4 obtained after dynamic vapor sorption analysis.

FIG. 26 shows a crystalline structure of compound A-4 as determined by XRPD. This crystalline form was obtained upon subjecting the crystal form as characterized in FIG. 17 to dynamic vapor sorption (DVS) analysis where the sample was exposed to 95% relative humidity (RH) and down to 5% RH. The post-DVS crystalline compound A-4 exhibits prominent peaks at approximately 7.4, 7.9, 9.1, 11.1, 12.0, 13.7, 14.4, 15.8, 16.4, 17.6, 19.8, 20.9, and 22.8 degrees 2θ. Thus, in some embodiments, the post-DVS crystalline form of compound A-4 has at least one characteristic peak (e.g., one, two, three, four, five, six, seven, eight, nine, ten, eleven, twelve, or thirteen characteristic peaks) selected from approximately 7.4, 7.9, 9.1, 11.1, 12.0, 13.7, 14.4, 15.8, 16.4, 17.6, 19.8, 20.9, and 22.8 degrees 2θ. In some embodiments, post-DVS crystalline form of compound A-4 has at least three characteristic peaks selected from 7.4, 7.9, 9.1, 11.1, 12.0, 13.7, 14.4, 15.8, 16.4, 17.6, 19.8, 20.9, and 22.8 degrees 2θ.

Where the compounds disclosed herein have at least one chiral center, they may exist as individual enantiomers and diastereomers or as mixtures of such isomers, including racemates. Separation of the individual isomers or selective synthesis of the individual isomers is accomplished by application of various methods which are well known to practitioners in the art. Unless otherwise indicated, all such isomers and mixtures thereof are included in the scope of the compounds disclosed herein. Furthermore, compounds disclosed herein may exist in one or more crystalline or amorphous forms. Unless otherwise indicated, all such forms are included in the scope of the compounds disclosed herein including any polymorphic forms. In addition, some of the compounds disclosed herein may form solvates with water (i.e., hydrates) or common organic solvents. Unless otherwise indicated, such solvates are included in the scope of the compounds disclosed herein.

The skilled artisan will recognize that some structures described herein may be resonance forms or tautomers of compounds that may be fairly represented by other chemical structures, even when kinetically; the artisan recognizes that such structures may only represent a very small portion of a sample of such compound(s). Such compounds are considered within the scope of the structures depicted, though such resonance forms or tautomers are not represented herein.

DEFINITIONS

Unless defined otherwise, all technical and scientific terms used herein have the same meaning as is commonly understood by one of ordinary skill in the art to which this disclosure belongs. All patents, applications, published applications, and other publications are incorporated by reference in their entirety. In the event that there is a plurality of definitions for a term herein, those in this section prevail unless stated otherwise.

The term "pharmaceutically acceptable salt" refers to salts that retain the biological effectiveness and properties of a compound and, which are not biologically or otherwise undesirable for use in a pharmaceutical. In many cases, the compounds disclosed herein are capable of forming acid and/or base salts by virtue of the presence of amino and/or carboxyl groups or groups similar thereto. Pharmaceutically acceptable acid addition salts can be formed with inorganic acids and organic acids. Inorganic acids from which salts can be derived include, for example, hydrochloric acid, hydrobromic acid, sulfuric acid, nitric acid, phosphoric acid, and the like. Organic acids from which salts can be derived include, for example, acetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, and the like. Pharmaceutically acceptable salts can also be formed using inorganic and organic bases. Inorganic bases from which salts can be derived include, for example, bases that contain sodium, potassium, lithium, ammonium, calcium, magnesium, iron, zinc, copper, manganese, aluminum, and the like; particularly preferred are the ammonium, potassium, sodium, calcium and magnesium salts. In some embodiments, treatment of the compounds disclosed herein with an inorganic base results in loss of a labile hydrogen from the compound to afford the salt form including an inorganic cation such as $Li^+$, $Na^+$, $K^+$, $Mg^{2+}$ and $Ca^{2+}$ and the like. Organic bases from which salts can be derived include, for example, primary, secondary, and tertiary amines, substituted amines including naturally occurring substituted amines, cyclic amines, basic ion exchange resins, and the like, specifically such as isopropylamine, trimethylamine, diethylamine, triethylamine, tripropylamine, and ethanolamine. Many such salts are known in the art, as described in WO 87/05297, Johnston et al., published Sep. 11, 1987 (incorporated by reference herein in its entirety).

As used herein, "alkyl" refers to a straight or branched hydrocarbon chain that is fully saturated (i.e., contains no double or triple bonds). The alkyl group may have 1 to 20 carbon atoms (whenever it appears herein, a numerical range such as "1 to 20" refers to each integer in the given range; e.g., "1 to 20 carbon atoms" means that the alkyl group may consist of 1 carbon atom, 2 carbon atoms, 3 carbon atoms, etc., up to and including 20 carbon atoms, although the present definition also covers the occurrence of the term "alkyl" where no numerical range is designated). The alkyl group may also be a medium size alkyl having 1 to 9 carbon atoms. The alkyl group could also be a lower alkyl having 1 to 4 carbon atoms. The alkyl group may be designated as "$C_{1-4}$ alkyl" or similar designations. By way of example only, "$C_{1-4}$ alkyl" indicates that there are one to four carbon atoms in the alkyl chain, i.e., the alkyl chain is selected from the group consisting of methyl, ethyl, propyl, iso-propyl, n-butyl, iso-butyl, sec-butyl, and t-butyl. Typical alkyl groups include, but are in no way limited to, methyl, ethyl, propyl, isopropyl, butyl, isobutyl, tertiary butyl, pentyl, hexyl, and the like.

Protecting Groups

In some circumstances, a chemical reaction may need to be performed selectively at one reactive site in a multifunctional compound. One such method that is useful for accomplishing such selectivity is to temporarily block one or more reactive sites in the multifunctional compound with a protective group. Such a method is often referred to as "protecting" the functional group. Many protecting groups are known in the art. See, e.g., Greene et al., Protective Groups in Organic Synthesis, Third Ed. (John Wiley & Sons, Inc. 1999), herein incorporated by reference in its entirety; Wutz et al., Greene's Protective Groups in Organic Synthesis, Fourth Ed. (John Wiley & Sons, Inc. 2007), herein incorporated by reference in its entirety. When more than one reactive site in a multifunctional compound requires protecting, or when a compound is prepared that will possess more than one protected functional group, it is important to use orthogonal protecting groups. Protecting groups are orthogonal if they are susceptible to selective removal.

In some embodiments, it may be necessary to protect one or more functional groups so as to prevent their interference in the desired reaction. For example, it may be necessary to protect one or more functional groups such as amines, carboxylic acids, and/or hydroxyl groups.

Suitable protecting groups for carboxylic acids include: esters such as enzymatically cleavable esters including heptyl, 2-N-(morpholino)ethyl, choline, (methoxyethoxy)ethyl, methoxyethyl; alkyl esters such as methyl, ethyl, propyl, isopropyl, butyl, tert-butyl, sec-butyl, pentyl, neopentyl, hexyl, heptyl, nonnyl, decanyl, and configurational isomers thereof; substituted methyl esters such as 9-fluorenylmethyl, methoxymethyl, methylthiomethyl, tetrahydropyranyl, tetrahydrofuranyl, methoxyethoxymethyl, 2-(trimethylsilyl) ethoxymethyl, benzyloxymethyl, pivaloyloxymethyl, phenylacetoxymethyl, triisopropylsilylmethyl, cyanomethyl, acetol, phencacyl, p-bromophenacyl, α-methylphenacyl, p-methoxyphenacyl, desyl, carboamidomethyl, p-azobenzenecarboxamidomethyl, N-phthalidimdomethyl; 2-substituted ethyl esters such as 2,2,2-trichloroethyl, 2-haloethyl, ω-chloroalkyl, 2-(trimethylsilyl)ethyl, 2-methylthioethyl, 1,3-dithianyl-2-methyl, 2-(p-nitrophenylsulfenyl)ethyl, 2-(p-toluenesulfonyl)ethyl, 2-(2'-pyridyl)ethyl, 2-(p-methoxyphenyl)ethyl, 2-(diphenylphosphino)ethyl, 1-methyl-1-phenylethyl, 2-(4-acetyl-2-nitrophenyl)ethyl, 2-cyanoethyl, 3-methyl-3-pentyl, dicyclopropylmethyl, 2,4-dimethyl-3-pentyl, cyclopentyl, cyclohexyl, allyl, methallyl, 2-methylbut-e-en-2-yl, 3-methylbut-2-(prenyl), 3-buten-1-yl, 4-(trimethylsilyl)-2-buten-1-yl, cinnamyl, α-methylcinnamyl, prop-2-ynyl, phenyl; 2,6-dialkylphenyl esters such as 2,6-dimethylphenyl, 2,6-diisopropylphenyl, 2,6-di-t-butyl-4-methylphenyl, 2,6-di-t-butyl-4-methoxyphenyl, p-(methylthio)phenyl, pentafluorophenyl, benzyl; substituted benzyl esters such as triphenylmethyl, diphenylmethyl, bis(o-mitrophenyl)methyl, 9-anthrylmethyl, 2-(9,10-dioxo)anthrylmethyl, 5-dibenzosuberyl, 1-pyreneylmethyl, 2-(trifluoromethyl)-6-chromonylmethyl, 2,4,6-trimethylbenzyl, p-bromobenzyl, o-nitrobenzyl, p-nitrobenzyl, p-methoxybenzyl, 2,6-dimethoxybenzyl, 4-(methylsulfinyl)benzyl, 4-sulfobenzyl, 4-azidomethoxybenzyl, 4-{N-[1-(4,4-dimethyl-2,6-dioxocyclohexylidene)-3-methylbutyl]amino}benzyl, piperonyl, 4-picolyl, polymer supported p-benzyl; silyl esters such as trimethylsilyl, triethylsilyl, t-butyldimethylsilyl, i-propyldimethylsilyl, phenyldimethylsilyl, di-t-butylmethylsilyl, triisopropylsilyl; activated esters such as thiol esters; oxazoles; 2-alkyl-1,3-axazoline; 4-alkyl-5-oxo-1,3-oxazolidine; 2,2-bistrifluoromethyl-4-alkyl-5-oxo-1,3-oxazolidine; 5-alkyl-4-oxo-1,3-dioxolane; dioxanones; ortho esters; pentaaminocobalt(III) complexes; and stannyl esters such as triethylstannyl and tri-n-butylstannyl; amides such as N,N-dimethyl, pyrrolidinyl, piperidinyl, 5,6-dihydrophenanthridinyl, o-nitroanilide, N-7-nitroindolyl, N-8-nitro-1,2,3,4-tetrahydroquinolyl, 2-(2-aminophenyl)acetaldehyde dimethyl acetal amide, and polymer supported p-benzenesulfonamide; hydrazides such as N-phenyl, N,N'diisopropyl; and tetraalkylammonium salts such as methyl, ethyl, propyl, isopropyl, butyl, tert-butyl, sec-butyl, pentyl, neopentyl, hexyl, heptyl, nonnyl, decanyl, and configurational isomers thereof.

Administration and Pharmaceutical Compositions

The compounds disclosed herein (for example, crystalline Form A of Compound I') are administered at a therapeutically effective dosage. While human dosage levels have yet to be optimized for the compounds described herein, generally, a daily dose may be from about 0.25 mg/kg to about 120 mg/kg or more of body weight, from about 0.5 mg/kg or less to about 70 mg/kg, from about 1.0 mg/kg to about 50 mg/kg of body weight, or from about 1.5 mg/kg to about 10 mg/kg of body weight. Thus, for administration to a 70 kg person, the dosage range would be from about 17 mg per day to about 8000 mg per day, from about 35 mg per day or less to about 7000 mg per day or more, from about 70 mg per day to about 6000 mg per day, from about 100 mg per day to about 5000 mg per day, or from about 200 mg to about 3000 mg per day. The amount of active compound administered will, of course, be dependent on the subject and disease state being treated, the severity of the affliction, the manner and schedule of administration and the judgment of the prescribing physician.

Administration of the compounds disclosed herein can be via any of the accepted modes of administration for agents that serve similar utilities including, but not limited to, orally, subcutaneously, intravenously, intranasally, topically, transdermally, intraperitoneally, intramuscularly, intrapulmonarily, vaginally, rectally, or intraocularly. Oral and parenteral administrations are customary in treating the indications that are the subject of the preferred embodiments.

The compounds useful as described above can be formulated into pharmaceutical compositions for use in treatment of these conditions. Standard pharmaceutical formulation techniques are used, such as those disclosed in Remington's The Science and Practice of Pharmacy, 21st Ed., Lippincott Williams & Wilkins (2005), incorporated by reference in its entirety. Accordingly, some embodiments include pharmaceutical compositions comprising: (a) a safe and therapeutically effective amount of a compound described herein (including enantiomers, diastereoisomers, tautomers, polymorphs, and solvates thereof), or pharmaceutically acceptable salts thereof; and (b) a pharmaceutically acceptable carrier, diluent, excipient or combination thereof.

In addition to the selected compound useful as described above, come embodiments include compositions containing a pharmaceutically-acceptable carrier. The term "pharmaceutically acceptable carrier" or "pharmaceutically acceptable excipient" includes any and all solvents, dispersion media, coatings, antibacterial and antifungal agents, isotonic and absorption delaying agents and the like. The use of such media and agents for pharmaceutically active substances is well known in the art. Except insofar as any conventional media or agent is incompatible with the active ingredient, its use in the therapeutic compositions is contemplated. In addition, various adjuvants such as are commonly used in the art may be included. Considerations for the inclusion of various components in pharmaceutical compositions are described, e.g., in Gilman et al. (Eds.) (1990); Goodman and Gilman's: The Pharmacological Basis of Therapeutics, 8th Ed., Pergamon Press, which is incorporated herein by reference in its entirety.

Some examples of substances, which can serve as pharmaceutically-acceptable carriers or components thereof, are sugars, such as lactose, glucose and sucrose; starches, such as corn starch and potato starch; cellulose and its derivatives, such as sodium carboxymethyl cellulose, ethyl cellulose, and methyl cellulose; powdered tragacanth; malt; gelatin; talc; solid lubricants, such as stearic acid and magnesium stearate; calcium sulfate; vegetable oils, such as peanut oil, cottonseed oil, sesame oil, olive oil, corn oil and oil of theobroma; polyols such as propylene glycol, glycerine, sorbitol, mannitol, and polyethylene glycol; alginic acid; emulsifiers, such as the TWEENS; wetting agents, such sodium lauryl sulfate; coloring agents; flavoring agents; tableting agents, stabilizers; antioxidants; preservatives; pyrogen-free water; isotonic saline; and phosphate buffer solutions.

The choice of a pharmaceutically-acceptable carrier to be used in conjunction with the subject compound is basically determined by the way the compound is to be administered.

The compositions described herein are preferably provided in unit dosage form. As used herein, a "unit dosage form" is a composition containing an amount of a compound that is suitable for administration to an animal, preferably mammal subject, in a single dose, according to good medical practice. The preparation of a single or unit dosage form however, does not imply that the dosage form is administered once per day or once per course of therapy. Such dosage forms are contemplated to be administered once, twice, thrice or more per day and may be administered as infusion over a period of time (e.g., from about 30 minutes to about 2-6 hours), or administered as a continuous infusion, and may be given more than once during a course of therapy, though a single administration is not specifically excluded. The skilled artisan will recognize that the formulation does not specifically contemplate the entire course of therapy and such decisions are left for those skilled in the art of treatment rather than formulation.

The compositions useful as described above may be in any of a variety of suitable forms for a variety of routes for administration, for example, for oral, nasal, rectal, topical (including transdermal), ocular, intracerebral, intracranial, intrathecal, intra-arterial, intravenous, intramuscular, or other parental routes of administration. The skilled artisan will appreciate that oral and nasal compositions comprise compositions that are administered by inhalation, and made using available methodologies. Depending upon the particular route of administration desired, a variety of pharmaceutically-acceptable carriers well-known in the art may be used. Pharmaceutically-acceptable carriers include, for example, solid or liquid fillers, diluents, hydrotropies, surface-active agents, and encapsulating substances. Optional pharmaceutically-active materials may be included, which do not substantially interfere with the inhibitory activity of the compound. The amount of carrier employed in conjunction with the compound is sufficient to provide a practical quantity of material for administration per unit dose of the compound. Techniques and compositions for making dosage forms useful in the methods described herein are described in the following references, all incorporated by reference herein: Modern Pharmaceutics, 4th Ed., Chapters 9 and 10 (Banker & Rhodes, editors, 2002); Lieberman et al., Pharmaceutical Dosage Forms: Tablets (1989); and Ansel, Introduction to Pharmaceutical Dosage Forms 8th Edition (2004).

Various oral dosage forms can be used, including such solid forms as tablets, capsules, granules and bulk powders. Tablets can be compressed, tablet triturates, enteric-coated, sugar-coated, film-coated, or multiple-compressed, containing suitable binders, lubricants, diluents, disintegrating agents, coloring agents, flavoring agents, flow-inducing agents, and melting agents. Liquid oral dosage forms include aqueous solutions, emulsions, suspensions, solutions and/or suspensions reconstituted from non-effervescent granules, and effervescent preparations reconstituted from effervescent granules, containing suitable solvents, preservatives, emulsifying agents, suspending agents, diluents, sweeteners, melting agents, coloring agents and flavoring agents.

The pharmaceutically-acceptable carrier suitable for the preparation of unit dosage forms for peroral administration is well-known in the art. Tablets typically comprise conventional pharmaceutically-compatible adjuvants as inert diluents, such as calcium carbonate, sodium carbonate, mannitol, lactose and cellulose; binders such as starch, gelatin and sucrose; disintegrants such as starch, alginic acid and croscarmellose; lubricants such as magnesium stearate, stearic acid and talc. Glidants such as silicon dioxide can be used to improve flow characteristics of the powder mixture. Coloring agents, such as the FD&C dyes, can be added for appearance. Sweeteners and flavoring agents, such as aspartame, saccharin, menthol, peppermint, and fruit flavors, are useful adjuvants for chewable tablets. Capsules typically comprise one or more solid diluents disclosed above. The selection of carrier components depends on secondary considerations like taste, cost, and shelf stability, which are not critical, and can be readily made by a person skilled in the art.

Peroral compositions also include liquid solutions, emulsions, suspensions, and the like. The pharmaceutically-acceptable carriers suitable for preparation of such compositions are well known in the art. Typical components of carriers for syrups, elixirs, emulsions and suspensions include ethanol, glycerol, propylene glycol, polyethylene glycol, liquid sucrose, sorbitol and water. For a suspension, typical suspending agents include methyl cellulose, sodium carboxymethyl cellulose, AVICEL RC-591, tragacanth and sodium alginate; typical wetting agents include lecithin and polysorbate 80; and typical preservatives include methyl paraben and sodium benzoate. Peroral liquid compositions may also contain one or more components such as sweeteners, flavoring agents and colorants disclosed above.

Such compositions may also be coated by conventional methods, typically with pH or time-dependent coatings, such that the subject compound is released in the gastrointestinal tract in the vicinity of the desired topical application, or at various times to extend the desired action. Such dosage forms typically include, but are not limited to, one or more of cellulose acetate phthalate, polyvinylacetate phthalate, hydroxypropyl methyl cellulose phthalate, ethyl cellulose, Eudragit coatings, waxes and shellac.

Compositions described herein may optionally include other drug actives.

Other compositions useful for attaining systemic delivery of the subject compounds include sublingual, buccal and nasal dosage forms. Such compositions typically comprise one or more of soluble filler substances such as sucrose, sorbitol and mannitol; and binders such as acacia, microcrystalline cellulose, carboxymethyl cellulose and hydroxypropyl methyl cellulose. Glidants, lubricants, sweeteners, colorants, antioxidants and flavoring agents disclosed above may also be included.

A liquid composition, which is formulated for topical ophthalmic use, is formulated such that it can be administered topically to the eye. The comfort should be maximized as much as possible, although sometimes formulation considerations (e.g. drug stability) may necessitate less than optimal comfort. In the case that comfort cannot be maximized, the liquid should be formulated such that the liquid is tolerable to the patient for topical ophthalmic use. Additionally, an ophthalmically acceptable liquid should either be packaged for single use, or contain a preservative to prevent contamination over multiple uses.

For ophthalmic application, solutions or medicaments are often prepared using a physiological saline solution as a major vehicle. Ophthalmic solutions should preferably be maintained at a comfortable pH with an appropriate buffer system. The formulations may also contain conventional, pharmaceutically acceptable preservatives, stabilizers and surfactants.

Preservatives that may be used in the pharmaceutical compositions disclosed herein include, but are not limited to, benzalkonium chloride, PHMB, chlorobutanol, thimerosal, phenylmercuric, acetate and phenylmercuric nitrate. A useful surfactant is, for example, Tween 80. Likewise, various useful vehicles may be used in the ophthalmic preparations disclosed herein. These vehicles include, but are not limited to, polyvinyl alcohol, povidone, hydroxypropyl methyl cellulose, poloxamers, carboxymethyl cellulose, hydroxyethyl cellulose and purified water.

Tonicity adjustors may be added as needed or convenient. They include, but are not limited to, salts, particularly sodium chloride, potassium chloride, mannitol and glycerin, or any other suitable ophthalmically acceptable tonicity adjustor.

Various buffers and means for adjusting pH may be used so long as the resulting preparation is ophthalmically acceptable. For many compositions, the pH will be between 4 and 9. Accordingly, buffers include acetate buffers, citrate buffers, phosphate buffers and borate buffers. Acids or bases may be used to adjust the pH of these formulations as needed.

In a similar vein, an ophthalmically acceptable antioxidant includes, but is not limited to, sodium metabisulfite, sodium thiosulfate, acetylcysteine, butylated hydroxyanisole and butylated hydroxytoluene.

Other excipient components, which may be included in the ophthalmic preparations, are chelating agents. A useful chelating agent is edetate disodium, although other chelating agents may also be used in place or in conjunction with it.

For topical use, creams, ointments, gels, solutions or suspensions, etc., containing the compound disclosed herein are employed. Topical formulations may generally be comprised of a pharmaceutical carrier, co-solvent, emulsifier, penetration enhancer, preservative system, and emollient.

For intravenous administration, the compounds and compositions described herein may be dissolved or dispersed in a pharmaceutically acceptable diluent, such as a saline or dextrose solution. Suitable excipients may be included to achieve the desired pH, including but not limited to NaOH, sodium carbonate, sodium acetate, HCl, and citric acid. In various embodiments, the pH of the final composition ranges from 2 to 8, or preferably from 4 to 7. Antioxidant excipients may include sodium bisulfite, acetone sodium bisulfite, sodium formaldehyde, sulfoxylate, thiourea, and EDTA. Other non-limiting examples of suitable excipients found in the final intravenous composition may include sodium or potassium phosphates, citric acid, tartaric acid, gelatin, and carbohydrates such as dextrose, mannitol, and dextran. Further acceptable excipients are described in Powell, et al., Compendium of Excipients for Parenteral Formulations, *PDA J Pharm Sci and Tech* 1998, 52 238-311 and Nema et al., Excipients and Their Role in Approved Injectable Products: Current Usage and Future Directions, *PDA J Pharm Sci and Tech* 2011, 65 287-332, both of which are incorporated herein by reference in their entirety. Antimicrobial agents may also be included to achieve a bacteriostatic or fungistatic solution, including but not limited to phenylmercuric nitrate, thimerosal, benzethonium chloride, benzalkonium chloride, phenol, cresol, and chlorobutanol.

The compositions for intravenous administration may be provided to caregivers in the form of one more solids that are reconstituted with a suitable diluent such as sterile water, saline or dextrose in water shortly prior to administration. In other embodiments, the compositions are provided in solution ready to administer parenterally. In still other embodiments, the compositions are provided in a solution that is further diluted prior to administration. In embodiments that include administering a combination of a compound described herein and another agent, the combination may be provided to caregivers as a mixture, or the caregivers may mix the two agents prior to administration, or the two agents may be administered separately.

The actual dose of the active compounds described herein depends on the specific compound, and on the condition to be treated; the selection of the appropriate dose is well within the knowledge of the skilled artisan.

Methods of Treatment

Some embodiments of the present invention include methods of treating bacterial infections with the compounds and compositions comprising the compounds described herein. Some methods include administering a compound, composition, pharmaceutical composition described herein to a subject in need thereof. In some embodiments, a subject can be an animal, e.g., a mammal (including a human). In some embodiments, the bacterial infection comprises a bacteria described herein. As will be appreciated from the foregoing, methods of treating a bacterial infection include methods for preventing bacterial infection in a subject at risk thereof.

In some embodiments, the subject is a human.

Further embodiments include administering a combination of compounds to a subject in need thereof. A combination can include a compound, composition, pharmaceutical composition described herein with an additional medicament.

Some embodiments include co-administering a compound, composition, and/or pharmaceutical composition described herein, with an additional medicament. By "co-administration," it is meant that the two or more agents may be found in the patient's bloodstream at the same time, regardless of when or how they are actually administered. In one embodiment, the agents are administered simultaneously. In one such embodiment, administration in combination is accomplished by combining the agents in a single dosage form. In another embodiment, the agents are administered sequentially. In one embodiment the agents are administered through the same route, such as orally. In another embodiment, the agents are administered through different routes, such as one being administered orally and another being administered intravenous (i.v.).

Examples of additional medicaments include an antibacterial agent, antifungal agent, an antiviral agent, an anti-inflammatory agent and an anti-allergic agent.

Preferred embodiments include combinations of a compound, composition or pharmaceutical composition described herein with an antibacterial agent such as a β-lactam. Examples of such β-lactams include Amoxicillin, Ampicillin (e.g., Pivampicillin, Hetacillin, Bacampicillin, Methampicillin, Talampicillin), Epicillin, Carbenicillin (Carindacillin), Ticarcillin, Temocillin, Azlocillin, Piperacillin, Mezlocillin, Mecillinam (Pivmecillinam), Sulbenicillin, Benzylpenicillin (G), Clometocillin, Benzathine benzylpenicillin, Procaine benzylpenicillin, Azidocillin, Penamecillin, Phenoxymethylpenicillin (V), Propicillin, Benzathine phenoxymethylpenicillin, Pheneticillin, Cloxacillin (e.g., Dicloxacillin, Flucloxacillin), Oxacillin, Methicillin, Nafcillin, Faropenem, Biapenem, Doripenem, Ertapenem, Imipenem, Meropenem, Panipenem, Cefazolin, Cefacetrile, Cefadroxil, Cefalexin, Cefaloglycin, Cefalonium, Cefaloridine, Cefalotin, Cefapirin, Cefatrizine, Cefazedone, Cefazaflur, Cefradine, Cefroxadine, Ceftezole, Cefaclor, Cefamandole, Cefminox, Cefonicid, Ceforanide, Cefotiam, Cefprozil, Cefbuperazone, Cefuroxime, Cefuzonam, Cefoxitin, Cefotetan, Cefmetazole, Loracarbef, Cefixime, Ceftazidime, Ceftriaxone, Cefcapene, Cefdaloxime, Cefdinir, Cefditoren, Cefetamet, Cefmenoxime, Cefodizime, Cefoperazone, Cefotaxime, Cefpimizole, Cefpiramide, Cefpodoxime, Cefsulodin, Cefteram, Ceftibuten, Ceftiolene, Ceftizoxime, Flomoxef, Latamoxef, Cefepime, Cefozopran, Cefpirome, Cefquinome, Ceftobiprole, Ceftaroline, Ceftiofur, Cefquinome, Cefovecin, Aztreonam, Tigemonam and Carumonam.

Preferred embodiments include β-lactams such as Ceftazidime, Biapenem, Doripenem, Ertapenem, Imipenem, Meropenem, Tebipenem, Tebipenem pivoxil, Apapenem, and Panipenem.

Additional preferred embodiments include β-lactams such as Aztreonam, Tigemonam, and Carumonam.

Some embodiments include a combination of the compounds, compositions and/or pharmaceutical compositions described herein with an additional agent, wherein the additional agent comprises a monobactam. Examples of monobactams include aztreonam, tigemonam, nocardicin A, carumonam, and tabtoxin. In some such embodiments, the compound, composition and/or pharmaceutical composition comprises a class A, C, or D beta-lactamase inhibitor. Some embodiments include co-administering the compound, composition or pharmaceutical composition described herein with one or more additional agents.

Some embodiments include a combination of the compounds, compositions and/or pharmaceutical compositions described herein with an additional agent, wherein the additional agent comprises a class B beta lactamase inhibitor. An example of a class B beta lactamase inhibitor includes ME1071 (Yoshikazu Ishii et al, "In Vitro Potentiation of Carbapenems with ME1071, a Novel Metallo-β-Lactamase Inhibitor, against Metallo-β-lactamase Producing *Pseudomonas aeruginosa* Clinical Isolates." Antimicrob.

Agents Chemother. doi:10.1128/AAC.01397-09 (July 2010)). Some embodiments include co-administering the compound, composition or pharmaceutical composition described herein with one or more additional agents.

Some embodiments include a combination of the compounds, compositions and/or pharmaceutical compositions described herein with an additional agent, wherein the additional agent comprises one or more agents that include a class A, B, C, or D beta lactamase inhibitor. Some embodiments include co-administering the compound, composition or pharmaceutical composition described herein with the one or more additional agents.

Indications

The compounds and compositions comprising the compounds described herein can be used to treat bacterial infections. Bacterial infections that can be treated with the compounds, compositions and methods described herein can comprise a wide spectrum of bacteria. Example organisms include gram-positive bacteria, gram-negative bacteria, aerobic and anaerobic bacteria, such as Staphylococcus, Lactobacillus, Streptococcus, Sarcina, Escherichia, Enterobacter, Klebsiella, Pseudomonas, Acinetobacter, Mycobacterium, Proteus, Campylobacter, Citrobacter, Neisseria, Bacillus, Bacteroides, Peptococcus, Clostridium, Salmonella, Shigella, Serratia, Haemophilus, Brucella and other organisms.

More examples of bacterial infections include Pseudomonas aeruginosa, Pseudomonas fluorescens, Pseudomonas acidovorans, Pseudomonas alcaligenes, Pseudomonas putida, Stenotrophomonas maltophilia, Burkholderia cepacia, Aeromonas hydrophilia, Escherichia coli, Citrobacter freundii, Salmonella typhimurium, Salmonella typhi, Salmonella paratyphi, Salmonella enteritidis, Shigella dysenteriae, Shigella flexneri, Shigella sonnei, Enterobacter cloacae, Enterobacter aerogenes, Klebsiella pneumoniae, Klebsiella oxytoca, Serratia marcescens, Francisella tularensis, Morganella morganii, Proteus mirabilis, Proteus vulgaris, Providencia alcalifaciens, Providencia rettgeri, Providencia stuartii, Acinetobacter baumannii, Acinetobacter calcoaceticus, Acinetobacter haemolyticus, Yersinia enterocolitica, Yersinia pestis, Yersinia pseudotuberculosis, Yersinia intermedia, Bordetella pertussis, Bordetella parapertussis, Bordetella bronchiseptica, Haemophilus influenzae, Haemophilus parainfluenzae, Haemophilus haemolyticus, Haemophilus parahaemolyticus, Haemophilus ducreyi, Pasteurella multocida, Pasteurella haemolytica, Branhamella catarrhalis, Helicobacter pylori, Campylobacter fetus, Campylobacter jejuni, Campylobacter coli, Borrelia burgdorferi, Vibrio cholerae, Vibrio parahaemolyticus, Legionella pneumophila, Listeria monocytogenes, Neisseria gonorrhoeae, Neisseria meningitidis, Kingella, Moraxella, Gardnerella vaginalis, Bacteroides fragilis, Bacteroides distasonis, Bacteroides 3452A homology group, Bacteroides vulgatus, Bacteroides ovalus, Bacteroides thetaiotaomicron, Bacteroides uniformis, Bacteroides eggerthii, Bacteroides splanchnicus, Clostridium difficile, Mycobacterium tuberculosis, Mycobacterium avium, Mycobacterium intracellulare, Mycobacterium leprae, Corynebacterium diphtheriae, Corynebacterium ulcerans, Streptococcus pneumoniae, Streptococcus agalactiae, Streptococcus pyogenes, Enterococcus faecalis, Enterococcus faecium, Staphylococcus aureus, Staphylococcus epidermidis, Staphylococcus saprophyticus, Staphylococcus intermedius, Staphylococcus hyicus subsp. hyicus, Staphylococcus haemolyticus, Staphylococcus hominis, or Staphylococcus saccharolyticus.

To further illustrate this invention, the following examples are included. The examples should not, of course, be construed as specifically limiting the invention. Variations of these examples within the scope of the claims are within the purview of one skilled in the art and are considered to fall within the scope of the invention as described, and claimed herein. The reader will recognize that the skilled artisan, armed with the present disclosure, and skill in the art is able to prepare and use the invention without exhaustive examples. The following examples will further describe the present invention, and are used for the purposes of illustration only, and should not be considered as limiting.

EXAMPLES

X-Ray Powder Diffraction (XRPD)

The Rigaku Smart-Lab X-ray diffraction system was configured for reflection Bragg-Brentano geometry using a line source X-ray beam. The x-ray source was a Cu Long Fine Focus tube that was operated at 40 kV and 44 ma. That source provides an incident beam profile at the sample that changes from a narrow line at high angles to a broad rectangle at low angles. Beam conditioning slits were used on the line X-ray source to ensure that the maximum beam size was less than 10 mm both along the line and normal to the line. The Bragg-Brentano geometry is a para-focusing geometry controlled by passive divergence and receiving slits with the sample itself acting as the focusing component for the optics. The inherent resolution of Bragg-Brentano geometry is governed in part by the diffractometer radius and the width of the receiving slit used. Typically, the Rigaku Smart-Lab is operated to give peak widths of 0.1° 2θ or less. The axial divergence of the X-ray beam was controlled by 5.0-degree Soller slits in both the incident and diffracted beam paths. The instrument was qualified using ASTM silicon standard on the same day of the analysis.

Powder samples were prepared in a low background Si holder using light manual pressure to keep the sample surfaces flat and level with the reference surface of the sample holder. Each sample was analyzed from 2 to 40° 2θ using a continuous scan of 6° 2θ per minute with an effective step size of 0.02° 2θ.

Differential Scanning Calorimetry (DSC)

DSC analyses were carried out using a TA Instruments Q2500 Discovery Series instrument. The instrument temperature calibration was performed using indium. The DSC cell was kept under a nitrogen purge of ~50 mL per minute during each analysis. The sample was placed in a standard, crimped, aluminum pan and was heated from approximately 25° C. to 350° C. at a rate of 10° C. per minute.

Melt Point (MP) Analysis

Melt point analysis was carried out using a Stuart SMP3 melt point apparatus. The sample was placed in a glass capillary and heated at 10° C. per minute.

Thermogravimetric (TG) Analysis

TG analysis was carried out using a TA Instruments Q5500 Discovery Series instrument. The instrument balance was calibrated using class M weights and the temperature calibration was performed using alumel. The nitrogen purge was ~40 mL per minute at the balance and ~60 mL per minute at the furnace. Each sample was placed into a pre-tared platinum pan and heated from approximately 25° C. to 350° C. at a rate of 10° C. per minute.

Dynamic Vapor Sorption (DVS) Analysis

DVS analysis was carried out using a TA Instruments Q5000 Dynamic Vapor Sorption analyzer. The instrument was calibrated with standard weights and a sodium bromide standard for humidity. Approximately 20 mg of sample was loaded into a metal-coated quartz pan for analysis. The sample was analyzed at 25° C. with a maximum equilibration time of one hour in 10% relative humidity (RH) steps from 5 to 95% RH (adsorption cycle) and from 95 to 5% RH (desorption cycle). The movement from one step to the next occurred either after satisfying the equilibrium criterion of 0.01% weight change or, if the equilibrium criterion was not met, after one hour. The percent weight change values were calculated using Microsoft Excel®. The temperature for the DVS analysis can impact the outcome of the results.

Karl Fischer (KF) Analyses

Karl Fischer analyses were carried out using a Mettler-Toledo C20 Coulometric KF titrator with oven attachment heated at 175° C. The instrument was calibrated using a Hydranal water standard containing 1% water. The titrant was a Hydranal methanol solution. The sample was analyzed in triplicate.

Optical Microscopy

Optical microscopy experiments were carried out on a Leica DM 2500 P compound microscope with a 10× magnification eye piece and a 10× magnification objective, for a total magnification of 100×. Images were captured using a QImaging MicroPublisher 3.3 RTV camera.

Infrared (IR) Spectroscopy

The IR spectra were obtained using a Thermo Nicolet model 6700 Fourier-transform (FT) IR spectrophotometer equipped with a deuterated triglycine sulfate (DTGS) detector, a potassium bromide (KBr) beamsplitter, and an electronically temperature controlled (ETC) Ever-Glo® IR source. The instrument was configured with a SMART iTR diamond attenuated total reflectance (ATR) sampling accessory. The single beam scan of the background (air) and sample were collected with 128 signal-averaged scans at a resolution of 2 cm$^{-1}$ over the spectral range 4000-400 cm$^{-1}$. The final sample spectrum was automatically calculated and presented in Log 1/R units. The wavelength calibration was verified using a certified polystyrene standard. Data collection and processing was performed using Omnic 9.7.46 software.

Raman Spectroscopy

Fourier transform (FT) Raman spectra were acquired on a Nicolet model 6700 spectrometer interfaced to a Nexus Raman accessory module. This instrument is configured with a Nd:YAG laser operating at 1024 nm, a CaF$_2$ beamsplitter, and a indium gallium arsenide detector. OMNIC 8.1 software was used for control of data acquisition and processing of the spectra. Samples were packed into a 3-inch glass NMR tube for analysis.

Low-Frequency Raman Spectroscopy

Raman spectroscopy is a complementary technique to infrared (IR) spectroscopy and both techniques provide a full vibrational analysis of an entity being studied. Commercial Raman instruments typically utilize notch filters that block Rayleigh scattering and only allow for good quality Raman spectra to be obtained down to ~100 cm$^{-1}$. The spectral region from approximately 500 to 50 cm$^{-1}$ or lower, depending upon the type of filter, is referred to as the low frequency Raman spectral region. In this region, vibrational modes originate from the crystalline lattice of organic compounds, or from heavy atoms such as those incorporated into organometallic or inorganic molecules. The natural frequency of the crystal lattice is termed a phonon mode. Phonon modes arise from a fundamental structure, namely the specific crystal lattice for the particular compound being studied. Different crystalline forms typically display a unique crystal lattice, and therefore a unique phonon mode is displayed for each distinct crystalline form.

Low frequency (LF) Raman spectra became available owing to new filter designs, and it has been demonstrated that this region permits the identification/differentiation of different crystalline forms (See Roy, S., Chamberlin, B., and Matzger, A. J., "Polymorph Discrimination Using Low Wavenumber Raman Spectroscopy," Org. Process Res. Dev. 2013, 17, 976-980) The LF Raman spectroscopy allows the spectral acquisition in the Raman spectrum region, including Stokes region from 2200 cm$^{-1}$ to 0 cm$^{-1}$ and Anti-Stokes region from 0 cm$^{-1}$ to −900 cm$^{-1}$. The LF Raman spectroscopy allows observation of phonon modes (natural vibration frequency of the crystal lattice) which can be used to differentiate crystalline forms. The same "mirror image" signals corresponding to the phonon modes are visible in both Stokes and anti-Stokes regions, however, Stokes signals are normally used for differentiating crystalline forms owing to their stronger intensity than anti-Stokes signals.

LF Raman spectra were obtained using a Renishaw Raman, equipped with a ONDAX THz Raman system (excitation laser 853 nm, notch filter). The solid sample was analyzed with exposure time of 10 seconds and 32 accumulations. The solid sample was spread on a gold slide and analyzed using ONDAX TR-probe (Marqme TriX) contacting the solid sample. The LF-Raman was calibrated using sulfur reference standard prior to the sample analysis.

$^{13}$C Nuclear Magnetic Resonance (NMR) Spectroscopy

The solid-state $^{13}$C cross polarization magic angle spinning (CPMAS) experiments were carried out on a Bruker Avance II 400 spectrometer. Each sample (approximately 200 mg) was packed into a 4-mm zirconia rotor closed with Kel-F end caps for subsequent data acquisition. Adamantane, set to 29.5 ppm, was used as an external standard. Acquisition and processing parameters used are shown in the table below.

| Nucleus | $^{13}$C |
|---|---|
| Temperature (K) | 297 |
| Observe Frequency (MHz) | 100.64 |
| Sweep Width (Hz) | 29762 |
| Dwell Time (μsec) | 16.8 |
| Acquisition Time (msec) | 275 |
| Recycle Delay (sec) | 20 |
| Spin Speed (kHz) | 7.0 |
| Number of Scans | 10240 |
| Processing Parameters | |
| Reference | external |
| Line Broadening (Hz) | 10 |

Example 1

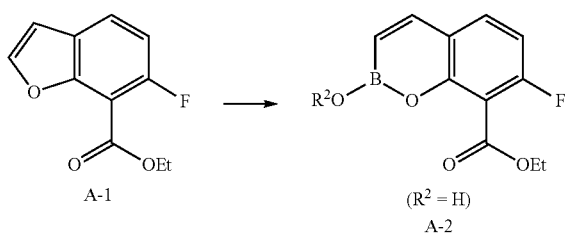

Solvent screening for borylation of A-1

Catalyst preparation: Inside the N$_2$ filled glovebox, NiCl$_2$ anhydrous (0.45 mmol; 58.2 mg) and P(Oct)$_3$ (0.9 mmol;

333.6 mg) were added to a 5 mL vial equipped with a magnetic stirrer. Dry and degassed THF (3.0 mL) was added to the vial and the catalyst stock solution was stirred for 1.5 h at 60° C. After that time, a dark red solution of the NiCl$_2$(P(Oct)$_3$)$_2$ complex was obtained (Note: no unreacted NiCl$_2$ was observed in the vial).

Reaction: Inside the N$_2$ filled glovebox, the corresponding base(s) (0.45 to 0.9 mmol) and the B$_2$Pin$_2$ (0.46 mmol; 117 mg) were added to a 5 mL vial equipped with a magnetic stirrer. Next, dry and degassed solvent (0.5, 0.95 or 1.0 mL) and an aliquot of the catalyst stock solution (100 µL, 5 mol %) was added to the vial followed by the substrate (0.3 mmol, 62.5 µL). Finally, DI water (50 or 500 µL) was added if needed. The vials were capped and placed inside the stem block where they heated overnight (ca. 17 h) at 80° C. or 90° C. (Toluene reactions) with a stirring speed of 750 rpm.

Reaction conditions: A-1 (0.3 mmol), base (1.5 to 3 equiv/A-1); B$_2$Pin$_2$ (1.5 equiv/A-1); Solvent (1.1 mL); 17 h.

Analysis: The capped vials were taken outside of the glovebox, allowed to cool down to room temperature and decapped. DI water (1 mL) and toluene or THF (500 µL) was added to each vial. A 6N HCl solution (100-200 µL) was added dropwise to each vial to neutralize the excess of base and reach a pH of 1-2. The vials were stirred for 1 h. The two phases were separated and an aliquot of the organic phase (50 µL) was added to a GC vial. Acetonitrile (950 µL) was added and the vial was capped and subjected to HPLC analysis. The results are summarized in Table 1. Qualitative results are presented based on % Area Product (P) and % Area Starting Material (SM). The HPLC yield is determined using the calibration curve (dilution: Reaction volume: 1.50 mL, Aliquot HPLC: 50 µL).

TABLE 1

Effect of solvent on yield of A-2

| # | Base | Base equiv | Solvent | Additive | A(% P) | A(% SM) | A(% unk) | Quant. HPLC yield Prod (%) |
|---|---|---|---|---|---|---|---|---|
| 1 | Cs$_2$CO$_3$ | 3 | Toluene | H$_2$O 5% | 51 | 44 | | 51 |
| 2 | | 3 | | H$_2$O 50% | 40 | 56 | | 44 |
| 3 | Cs$_2$CO$_3$ | 3 | THF | none | 55 | 44 | | 73 |
| 4 | | 3 | | H$_2$O 5% | 88 | 9 | | 98 |
| 5 | | 3 | | H$_2$O 50% | 39 | 61 | | 45 |
| 6 | Cs$_2$CO$_3$ | 3 | DMF | | 43 | 57 | | 51 |
| 7 | | 3 | DMA | | 49 | 51 | | 49 |
| 8 | | 3 | NEt3 | | 51 | 44 | | 71 |
| 9 | | 3 | MTBE | | 63 | 36 | | 85 |
| 10 | | 3 | Bu2O | | 55 | 44 | | 67 |
| 11 | ButOLi | 1.5 | THF | | 55 | 18 | 14 | 58 |
| 12 | ButOLi | 2 | THF | | 59 | 2 | 14 | 56 |
| 13 | ButOLi | 3 | THF | | 46 | 1 | 8 | 47 |
| 14 | ButOLi | 3 | Toluene | | 41 | 1 | 11 | 40 |
| 15 | LiOH | 2 | THF | | 38 | 48 | | 42 |
| 16 | LiOH | 2 | Toluene | | 38 | 57 | | 40 |
| 17 | MeOK | 2 | THF | | 73 | 3 | | 66 |
| 18 | MeOK | 2 | Toluene | | 67 | 6 | | 68 |
| 19 | NEt3 | 3 | Toluene | | 36 | 63 | | 40 |
| 20 | KOH | 2 | THF | | 49 | 37 | | 59 |
| 21 | CsF/ButOLi | 1 + 1 | THF | | 60 | 30 | 2 | 78 |
| 22 | CsF/ButOLi | 0.8 + 1 | THF | | 63 | 31 | 2 | 81 |
| 23 | CsF/ButOLi | 0.6 + 1 | THF | | 66 | 28 | 1 | 65 |
| 24 | CsF/ButOLi | 1 + 1 | Toluene | | 59 | 29 | 6 | 58 |
| 25 | CsF/ButOLi | 0.8 + 1 | Toluene | | 54 | 31 | 9 | 54 |
| 26 | CsF/ButOLi | 0.6 + 1 | Toluene | | 52 | 34 | 8 | 53 |
| 27 | KF/ButOLi | 0.8 + 1 | THF | | 60 | 28 | | 78 |
| 28 | KF/ButOLi | 0.8 + 1 | Toluene | | 44 | 30 | 17 | 48 |
| 29 | CsF/LiOH | 0.8 + 1 | THF | | 57 | 43 | | 77 |
| 30 | KF/LiOH | 0.8 + 1 | THF | | 35 | 54 | | 43 |

When $Cs_2CO_3$ is used as a base in toluene, the presence of water does not have a significant impact on the yield of desired product. At 50% $H_2O$, the reaction behaved as a biphasic system. In contrast, the presence of a small amount of $H_2O$ (5% vol) exerted a very beneficial effect when THF was used as solvent However, lower amounts of product were detected at 50% $H_2O$.

Example 2

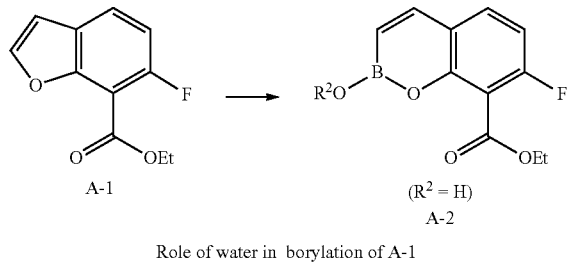

Role of water in borylation of A-1

To further understand the positive effect of water on the borylation of A-1 to form A-2, a new set of experiments was performed using $Cs_2CO_3$ as base and various amounts of water (1; 2.5; 5; and 10% $H_2O$) in THF. Four other bases ($K_2CO_3$; KOH; MeOK and $NEt_3$) were also investigated in presence of 5% $H_2O$ in THF. The borylation of A-1 was also studied using $CsOH \cdot H_2O$ as base (1 equiv/A-1) in THF. All the reactions were run using $NiCl_2/2P(Oct)_3$ as catalyst in 5 mol % loading at 80° C. in an overnight reaction. A total of 9 reactions were performed under these conditions.

Catalyst preparation: Inside the $N_2$ filled glovebox, $NiCl_2$ anhydrous (0.45 mmol; 58.2 mg) and $P(Oct)_3$ (0.9 mmol; 333.6 mg) were added to a 5 mL vial equipped with a magnetic stirrer. Dry and degassed THF (3.0 mL) was added to the vial and the catalyst stock solution was stirred for 1.5 h at 60° C. After that time, a dark red solution of the $NiCl_2 \cdot 2P(Oct)_3$ complex was obtained (note: no unreacted $NiCl_2$ was observed in the vial).

Reaction: Inside the $N_2$ filled glovebox, the corresponding base (0.3 to 0.9 mmol) and the $B_2Pin_2$ (0.46 mmol; 117 mg) were added to a 5 mL vial equipped with a magnetic stirrer. Next, dry and degassed solvent (0.9, 0.95, 0.975, 0.99 or 1.0 mL) and an aliquot of the catalyst stock solution (100 μL, 5 mol %) was added to the vial followed by the substrate (0.3 mmol, 62.5 μL). Finally, DI water (10, 25, 50 or 100 μL) was added if needed. The vials were capped and placed inside the stem block were they heated overnight (ca. 17 h) at 80° C. with a stirring speed of 750 rpm.

Reaction conditions: A-1 (0.3 mmol), base (1.1 to 3 equiv/A-1); $B_2Pin_2$ (1.5 equiv/A-1); Solvent (1.1 mL); 17 h.

Analysis: The capped vials were taken outside of the glovebox, allowed to cool down to room temperature and decapped. DI water (1 mL) and diethyl ether ($Et_2O$) (500 μL) was added to each vial. A 6N HCl solution (100-200 μL) was added dropwise to each vial to neutralize the excess of base and reach a pH of 1-2. The vials were stirred for 1 h. The two phases were separated and an aliquot of the organic phase (50 μL) was added to a GC vial. Acetonitrile (MeCN) (950 μL) was added and the vial was capped and subjected to HPLC analysis.

TABLE 2

Effect of water on yield of A-2

| | | | | Area % | | |
|---|---|---|---|---|---|---|
| # | Base | Additive | Base equiv | A (% Product) | A (% Starting Material) | A (% impurities) | Quantitative HPLC yield Product (%) |
| 1 | $Cs_2CO_3$ | $H_2O$ 5% | 3 | 92 | 22 | — | 105 |
| 2 | $Cs_2CO_3$ | $H_2O$ 10% | 3 | 63 | 27 | — | — |
| 3 | $Cs_2CO_3$ | $H_2O$ 1% | 3 | 73 | 14 | 2 | — |
| 4 | $Cs_2CO_3$ | $H_2O$ 2.5% | 3 | 78 | 10 | — | — |
| 5 | $Cs_2CO_3$ | $H_2O$ 5% | 3 | 35 | 49 | 1 | — |
| 6 | KOH | $H_2O$ 5% | 2 | 48 | 38 | 1 | — |
| 7 | MeOK | $H_2O$ 5% | 2 | 56 | 16 | 1 | — |
| 8 | $NEt_3$ | $H_2O$ 5% | 3 | 34 | 53 | 5 | — |
| 9 | $CsOH \cdot H_2O$ | — | 1.1 | 91 | 0 | — | 84 |

The positive effect of the addition of small amounts of H₂O when Cs₂CO₃ was used as the base was confirmed, with an optimal amount of water of around 5% by volume. The yield of product determined by quantitative HPLC is also very high (higher than 100% due to inaccuracy in volume). It was also observed visually that the addition of H₂O improved dramatically the solubility of the Cs₂CO₃ in THF. The borylation of A-1 reached completion when CsOH·H₂O (1.02 equiv/A-1) was used as base. This result suggests that CsOH may be formed from Cs₂CO₃ and H₂O.

Example 3

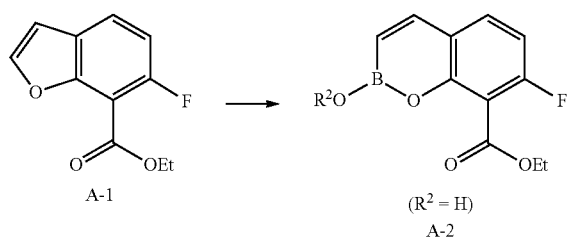

A-1 → (R² = H) A-2

Catalyst preparation and solvent effect on borylation of A-1

The NiCl₂/2P(Oct)₃ catalyst was prepared in THF, toluene, 1,4-dioxane and MTBE (methyl tert-butyl ether) and the reactions were run in those four solvents too. The catalyst solution in THF was also used in the reactions run in toluene for comparison purposes. The reactions were run in the presence of Cs₂CO₃ or CsOH·H₂O as bases and H₂O (5 and 10% volume) was also added. The reactions in THF were also tested using a lower amount of Cs₂CO₃ (2 equiv/A-1) to identify whether a large excess of base is needed when small amounts of water are present in the reaction. All 24 reactions were run using 5 mol % catalyst loading at 80° C. (in THF) or at 90° C. (in Tol) in overnight.

Catalyst preparation: Inside the N₂ filled glovebox, NiCl₂ anhydrous (0.45 mmol; 58.2 mg) and P(Oct)₃ (0.9 mmol; 333.6 mg) were added to a 5 mL vial equipped with a magnetic stirrer. Dry and degassed THF (3.0 mL) was added to the vial and the catalyst stock solution was stirred for 1.5 h at 60° C. After that time, a dark red solution of the NiCl₂(P(Oct)₃)₂ complex was obtained (note: no unreacted NiCl₂ was observed in the vial).

Reaction: Inside the N₂ filled glovebox, the corresponding base (0.3 to 0.9 mmol) and the B₂Pin₂ (0.46 mmol; 117 mg) were added to a 5 mL vial equipped with a magnetic stirrer. Next, dry and degassed solvent (0.9, 0.95, 0.975, 0.99 or 1.0 mL) and an aliquot of the catalyst stock solution (100 μL, 5 mol %) was added to the vial followed by the substrate (0.3 mmol, 62.5 μL). Finally, DI water (10, 25, 50 or 100 μL) was added if needed. The vials were capped and placed inside the stem block were they heated overnight (ca. 17 h) at 80° C. or 90° C. (if toluene was used as solvent) with a stirring speed of 750 rpm.

Reaction conditions: A-1 (0.3 mmol), base (1.1 to 3 equiv/A-1); B₂Pin₂ (1.5 equiv/A-1); Solvent (1.1 mL); 17 h.

Analysis: The capped vials were taken outside of the glovebox, allowed to cool down to room temperature and decapped. DI water (1 mL) and Et₂O (350 μL) was added to each vial. A 6N HCl solution (100-200 μL) was added dropwise to each vial to neutralize the excess of base and reach a pH of 1-2. The vials were stirred for 1 h. The two phases were separated and an aliquot of the organic phase (50 μL) was added to a GC vial. MeCN (950 μL) was added and the vial was capped and subjected to HPLC analysis.

The reactions run in THF and MTBE were analyzed by a slightly different protocol: The capped vials were taken outside of the glovebox, allowed to cool down to room temperature and decapped. DI water (1 mL) and Et₂O (500 μL) was added to each vial. A 6N HCl solution (100-200 L) was added dropwise to each vial to neutralize the excess of base and reach a pH of 1-2. The vials were stirred for 1 h. The two phases were separated and Et₂O (1.0 mL) was added. The organic phase was extracted and placed in a flask. The solvent was removed under vacuo and then the reaction crude was dissolved in MeCN (1.35 mL). An aliquot of the MeCN solution (50 μL) was added to a GC vial followed by MeCN (950 μL). The GC vial was capped and subjected to HPLC analysis.

The results of the run are summarized in Table 3 below. Qualitative results are presented based on % Area Product (P) and % Area Starting Material (SM).

TABLE 3

Effect of catalyst preparation and solvent on borylation of A-1

| # | Base | Solvent | Additive | Base equiv | Cat solvent | A (% P) | A (% imp) | A (% H2imp) | A (% H2imp) | Quant. HPLC yield Prod (%) |
|---|------|---------|----------|------------|-------------|---------|-----------|-------------|-------------|----------------------------|
| 1 | Cs₂CO₃ | THF | 5% H₂O | 3 | THF | 80 | 14 | <1 | | 105 |
| 2 | | | 10% H₂O | | THF | 57 | 35 | 1 | | 74 |
| 3 | | | none | 3 | THF | 56 | 44 | <1 | | 80 |
| 4 | Cs₂CO₃ | THF | 5% H₂O | 2 | THF | 62 | 31 | <1 | | 80 |
| 5 | | | 10% H₂O | 2 | THF | 46 | 46 | | | 63 |
| 6 | | | none | 2 | THF | 57 | 42 | | | 83 |
| 7 | CsOH H₂O | THF | | 1 | THF | 70 | | | | 73 |
| 8 | CsOH H₂O | THF | | 1 | THF | 79 | | | | 77 |
| 9 | Cs₂CO₃ | Toluene | 5% H₂O | 3 | THF | 55 | 33 | | | 61 |
| 10 | | | 10% H₂O | 3 | THF | 60 | 29 | 1 | 1 | 61 |
| 11 | Cs₂CO₃ | Toluene | | 3 | THF | 55 | 45 | | | 62 |
| 12 | CsOH H₂O | Toluene | | 1 | THF | 84 | 3 | | | 65 |
| 13 | Cs₂CO₃ | Toluene | | 3 | Toluene | 52 | 48 | | | 59 |
| 14 | Cs₂CO₃ | Toluene | 5% H₂O | 3 | Toluene | 51 | 34 | | | 56 |
| 15 | | | 10% H₂O | 3 | Toluene | 58 | 34 | 1 | 1 | 62 |
| 16 | CsOH H₂O | Toluene | | 1 | Toluene | 85 | 3 | | | 60 |
| 17 | Cs₂CO₃ | Dioxane | | 3 | Dioxane | 57 | 42 | | | 73 |
| 18 | Cs₂CO₃ | Dioxane | 5% H₂O | 3 | Dioxane | 52 | 33 | | | 64 |
| 19 | | | Dioxane 10% H₂O | 3 | Dioxane | 35 | 52 | 1 | | 46 |

TABLE 3-continued

Effect of catalyst preparation and solvent on borylation of A-1

| # | Base | Solvent | Additive | Base equiv | Cat solvent | Area % A (% P) | A (% imp) | A (% H2imp) | A (% H2imp) | Quant. HPLC yield Prod (%) |
|---|---|---|---|---|---|---|---|---|---|---|
| 20 | CsOH H$_2$O | Dioxane | | 1 | Dioxane | 91 | | | | 70 |
| 21 | Cs$_2$CO$_3$ | MTBE | | 3 | MTBE | 64 | 36 | | | 87 |
| 22 | Cs$_2$CO$_3$ | MTBE | 5% H$_2$O | 3 | MTBE | 66 | 26 | | | 84 |
| 23 | | MTBE | 10% H$_2$O | 3 | MTBE | 54 | 30 | 1 | 1 | 72 |
| 24 | CsOH H$_2$O | MTBE | | 1 | MTBE | 95 | | | | 95 |

The positive effect of water was observed, with an optimum at 5% volume. The conversion drops significantly when the excess of Cs$_2$CO$_3$ was reduced from 3 to 2 equiv/A-1 in the reactions run in THF/H$_2$O. When CsOH·H$_2$O was used as base in THF solution, the reactions showed full consumption of the starting material. Reactions with Cs$_2$CO$_3$ in toluene showed lower conversions than those run in THF. Similar conversions were obtained independently of the solvent used for the catalyst preparation. The reactions with Cs$_2$CO$_3$ in dioxane and MTBE also showed slightly poorer conversions than in THF and no positive effect of added water. The reactions run with CsOH·H$_2$O as base showed full conversion of the starting material in THF, dioxane and MTBE, while small amounts of the starting material (ca. 5% area) were observed in toluene. In MTBE, a good quantitative yield of A-2 is also obtained.

Example 4

Effect of Phosphine, Mixture of Bases, Water and Diboron on Borylation of A-1

The effect of 4 different phosphines (P(Oct)$_3$; P(n-Bu)$_3$; P(n-Prop)$_3$ and TTMPP) and in combination with PPh$_3$ (1/1 ratio) on the borylation of A-1 was studied. The NiCl$_2$ phosphine catalysts were tested in the presence of Cs$_2$CO$_3$ as base and in THF as solvent. The commercially available complex NiCl$_2$(P(n-Bu)$_3$)$_2$ was also studied under the same reaction conditions. The combination of NiCl$_2$/2 P(Oct)$_3$ and dcype (1 equiv/Ni) was also studied. Additionally, mixtures of Cs$_2$CO$_3$/K$_2$CO$_3$ 1/9 and CsOH/K$_2$CO$_3$ 1/9 were investigated in THF/H$_2$O solution (0; 2.5; 5 and 10% v/v) at 80° C. using the NiCl$_2$/2 P(Oct)$_3$ catalyst at 5 mol % loading. Also studied were: (1) CsOH·H$_2$O (2 equiv/A-1) in THF and Cs$_2$CO$_3$ in THF/H$_2$O (95/5% v/v) at 80° C. using the NiCl$_2$/2 P(Oct)$_3$ catalyst at 5 mol % loading; (2) reactions with CsOH·H$_2$O (3; 2 and 1 equiv/A-1) in THF and in THF/H$_2$O (95/5% v/v) and a reaction with Cs$_2$CO$_3$ in THF/H$_2$O (95/5% v/v) at 65° C. using the NiCl$_2$/2 P(Oct)$_3$ catalyst at 5 mol % loading; and (3) two reactions using bis(catecholato)diboron and bis(neopentyl glycolato)diboron as boron sources in the presence of CsOH·H$_2$O (3 equiv/A-1) in THF at 65° C. using the NiCl$_2$/2 P(Oct)$_3$ catalyst at 5 mol % loading.

Catalyst preparation: Inside the N$_2$ filled glovebox, NiCl$_2$ anhydrous (0.45 mmol; 58.2 mg) and the corresponding phosphine (0.9 mmol) were added to a 5 mL vial equipped with a magnetic stirrer. Dry and degassed THF (3.0 mL) was added to the vial and the catalyst stock solution was stirred for 1.5 h at 60° C. After that time, the dark solutions were stirred at room temperature over the weekend. The catalyse solutions were as follows:

| Solution | A | B | C | D | E | F | G | H |
|---|---|---|---|---|---|---|---|---|
| Ligand | P(Oct)3 | P(nBu)3 | P(nProp)3 | TTMPP | P(Oct)3/PPh3 | P(nBu)3/PPh3 | P(nProp)3/PPh3 | TTMPP/PPh3 |
| Ligand equiv | 2 | 2 | 2 | 2 | (1/1) | (1/1) | (1/1) | (1/1) |

Reaction: Inside the $N_2$ filled glovebox, the corresponding base (0.3 to 0.9 mmol) and the $B_2Pin_2$ (0.46 mmol; 117 mg) were added to a 5 mL vial equipped with a magnetic stirrer. Next, dry and degassed solvent (0.9, 0.95, 0.975 or 1.0 mL) and an aliquot of the catalyst stock solution (100 L, 5 mol %) was added to the vial followed by the substrate (0.3 mmol, 62.5 mg). Finally, DI water (25, 50 or 100 μL) was added if needed. The vials were capped and placed inside the stem block were they heated overnight (ca. 17 h) at 80° C. or 65° C. with a stirring speed of 750 rpm.

Reaction conditions: A-1 (0.3 mmol), base (1.0 to 3 equiv/A-1); $B_2Pin_2$ (1.5 equiv/A-1); Solvent (1.1 mL); 17 h.

The capped vials were taken outside of the glovebox, allowed to cool down to room temperature and decapped. DI water (1 mL) and $Et_2$ (350 μL) was added to each vial. A 6N HCl solution (100-200 μL) was added dropwise to each vial to neutralize the excess of base and reach a pH of 1-2. The vials were stirred for 1 h. The two phases were separated and an aliquot of the organic phase (50 μL) was added to a GC vial. MeCN (950 μL) was added and the vial was capped and subjected to HPLC analysis.

The results are summarized in Table 4 below. Qualitative results are presented based on % Area P (Product) and % Area SM (Starting Material).

TABLE 4

Effect of phosphine, bases, water and diboron on borylation of A-1

| # | Cat sol | Base | Additive | T (° C.) | Time/h | A (% P) | A (% SM) | A (% imp) | A (% H2imp) | Quant HPLC yield (%) |
|---|---------|------|----------|----------|--------|---------|----------|-----------|-------------|----------------------|
| 1 | A | $Cs_2CO_3$ | none | 80 | 17 | 56 | 38 | | 6 | 54 |
| 2 | B | | | | | 53 | 39 | | 8 | 44 |
| 3 | C | | | | | 49 | 45 | | 6 | 55 |
| 4 | D | | | | | 16 | 71 | 1 | 4 | 19 |
| 5 | E | | | | | 44 | 48 | | 5 | 47 |
| 6 | F | | | | | 41 | 50 | | 6 | 44 |
| 7 | G | | | | | 39 | 51 | | 6 | 40 |
| 8 | H | | | | | 19 | 65 | 1 | 5 | 22 |
| 9 | NiCl2 2P(Bu)3 | | | | | 50 | 44 | | 6 | 51 |
| 10 | A and dcype | | | | | 42 | 52 | | 5 | 45 |
| 11 | A | $K_2CO_3/Cs_2CO_3$ 9/1 | | 80 | 17 | 48 | 44 | | 7 | 46 |
| 12 | | | 2.5% $H_2O$ | | | 29 | 53 | | 6 | 29 |
| 13 | | | 5% $H_2O$ | | | 36 | 38 | 2 | 7 | 31 |
| 14 | | | 10% $H_2O$ | | | 36 | 46 | 1 | 6 | 35 |
| 15 | | $K_2CO_3/CsOH$ 9/1 | | | | 47 | 43 | | 6 | 45 |
| 16 | | | 2.5% $H_2O$ | | | 42 | 40 | 1 | 7 | 34 |
| 17 | | | 5% $H_2O$ | | | 40 | 42 | 1 | 6 | 39 |
| 18 | | | 10% $H_2O$ | | | 32 | 49 | 1 | 6 | 31 |
| 19 | A duplo | CsOH $H_2O$ 2 equiv | | 80 | 1 | 76 | 6 | 2 | 9 | |
| 19 | A duplo | CsOH $H_2O$ 2 equiv | | 80 | 17 | 78 | 4 | 1 | 6 | 71 |
| 20 | A duplo | $Cs_2CO_3$ | 5% $H_2O$ | | 1 | 85 | 4 | 1 | 7 | |
| 20 | A duplo | $Cs_2CO_3$ | 5% $H_2O$ | | 17 | 87 | | 1 | 7 | 76 |
| 21 | A | CsOH $H_2O$ 3 equiv | | 65 | 1 | 71 | 1 | 1 | 14 | |
| 21 | A | CsOH $H_2O$ 3 equiv | | 65 | 17 | 61 | | | 6 | 54 |
| 22 | | CsOH $H_2O$ 2 equiv | | | 1 | 85 | | 2 | 8 | |
| 22 | | CsOH $H_2O$ 2 equiv | | | 17 | 83 | | 1 | 6 | 76 |
| 23 | | CsOH $H_2O$ 1 equiv | | | 1 | 72 | 19 | | 8 | |
| 23 | | CsOH $H_2O$ 1 equiv | | | 17 | 74 | 19 | 1 | 6 | 76 |
| 24 | | CsOH $H_2O$ 3 equiv | 2.5% $H_2O$ | | 1 | 64 | 10 | 2 | 9 | |
| 24 | | CsOH $H_2O$ 3 equiv | 2.5% $H_2O$ | | 17 | 48 | 12 | | 6 | 50 |
| 25 | | CsOH $H_2O$ 2 equiv | 2.5% $H_2O$ | | 1 | 67 | 16 | 2 | 9 | |
| 25 | | CsOH $H_2O$ 2 equiv | 2.5% $H_2O$ | | 17 | 65 | 17 | 1 | 5 | 72 |
| 26 | | CsOH $H_2O$ 1 equiv | 2.5% $H_2O$ | | 1 | 57 | 31 | 1 | 10 | |
| 26 | | CsOH $H_2O$ 1 equiv | 2.5% $H_2O$ | | 17 | 41 | 37 | 4 | 6 | 44 |
| 27 | | $Cs_2CO_3$ 3 equiv | 5% $H_2O$ | | 1 | 71 | 21 | | 7 | |
| 27 | | $Cs_2CO_3$ 3 equiv | 5% $H_2O$ | | 17 | 84 | 2 | 1 | 8 | 58 |
| 28 | A | CsOH $H_2O$ 3 equiv | | 65 | 1 | 37 | 50 | | 12 | |
| 28 | A | CsOH $H_2O$ 3 equiv | | 65 | 17 | 17 | 58 | | 5 | 20 |
| 29 | A | CsOH $H_2O$ 3 equiv | | | 1 | 32 | 47 | | 7 | |
| 29 | A | CsOH $H_2O$ 3 equiv | | | 17 | 21 | 16 | | 4 | 26 |

The three aliphatic phosphines (P(Oct)$_3$, P(nBu)$_3$ and P(nProp)$_3$) showed very similar results during the borylation of A-1 (entries #1-3). The reaction run with the commercial NiCl$_2$[P(n-Bu)$_3$]$_2$ complex also showed analogous performance to the in house prepared complex. In contrast, the reaction run with the aromatic TTMPP phosphine showed much poorer results. The combination of an aliphatic phosphine/PPh$_3$ (1/1) showed slightly lower product formation than in the presence of aliphatic phosphines alone. The addition of dcype (1 equiv/Ni) to the NiCl$_2$/2P(Oct)$_3$ catalyst showed a slightly lower conversion than in the presence of the NiCl$_2$/2P(Oct)$_3$ catalyst alone. The combination of K$_2$CO$_3$ with CsOH·H$_2$O or Cs$_2$CO$_3$ resulted in significantly lower yields of product than in those reactions run with CsOH·H$_2$O or Cs$_2$CO$_3$ alone. Reactions run with CsOH·H$_2$O (2 equiv/A-1) in THF or Cs$_2$CO$_3$ (3 equiv/A-1) in THF/H$_2$O (95/5% v/v) furnished the same results than the reactions run at 80° C. The reactions at 65° C. appear to be also very fast as very high conversions were already observed after only 1.

Optimal results were found using CsOH·H$_2$O (2 equiv/A-1). The addition of 3 equivalents was detrimental for the reaction as additional byproducts were observed in the chromatogram. The addition of 1 equivalent gave good conversions and a clean reaction, albeit some starting material remained unreacted. Addition of small amounts of water (2.5% v/v) to the reactions run with CsOH·H$_2$O resulted either in no further improvement of the reaction or caused a slightly negative effect. Reactions run with other boron sources showed some product formation, however, much better results were obtained with B$_2$Pin$_2$.

Example 5

Effect of Catalyst Loading on Borylation of A-1

The effect of catalyst loading in the borylation of A-1. The reactions were run using the NiCl$_2$/2 P(Oct)$_3$ catalyst at 2.5 and 1.25 mol % using the two best reaction conditions: CsOH·H$_2$O (2 equiv/A-1) in THF and Cs$_2$CO$_3$ (3 equiv/A-1) in THF/H$_2$O (95/5% v/v). The reactions were run at 80 and at 65° C. for comparison. A total of 8 reactions were run under these conditions.

Catalyst preparation: Inside the N$_2$ filled glovebox, NiCl$_2$ anhydrous (0.45 mmol; 58.2 mg) and the corresponding phosphine (0.9 mmol) were added to a 5 mL vial equipped with a magnetic stirrer. Dry and degassed THF (3.0 mL) was added to the vial and the catalyst stock solution was stirred for 1.5 h at 60° C. After that time, the dark solutions were stirred at room temperature over the weekend.

Reaction: Inside the N$_2$ filled glovebox, the corresponding base (0.6 to 0.9 mmol) and the B$_2$Pin$_2$ (0.46 mmol; 117 mg) were added to a 5 mL vial equipped with a magnetic stirrer. Next, dry and degassed solvent (0.95 or 1.0 mL) and an aliquot of the catalyst stock solution (100 µL, 5 mol %) was added to the vial followed by the substrate (0.3 mmol, 62.5 mg). Finally, DI water (50 µL) was added if needed. The vials were capped and placed inside the stem block where they heated overnight (ca. 17 h) at 80° C. or 65° C. with a stirring speed of 750 rpm.

Reaction conditions: A-1 (0.3 mmol), base (2.0 to 3 equiv/A-1); B$_2$Pin$_2$ (1.5 equiv/A-1); Solvent (1.1 mL); 17 h.

Analysis: The capped vials were taken outside of the glovebox, allowed to cool down to room temperature and decapped. DI water (1 mL) and Et$_2$O (350 µL) was added to each vial. A 6N HCl solution (100-200 µL) was added dropwise to each vial to neutralize the excess of base and reach a pH of 1-2. The vials were stirred for 1 h. The two phases were separated and an aliquot of the organic phase (50 µL) was added to a GC vial. MeCN (950 µL) was added and the vial was capped and subjected to HPLC analysis. The results are summarized in Table 5 below. Qualitative results are presented based on % Area P and % Area SM. Quantitative assay yield for the product A-2 [Dilution: Reaction volume: 1.35 mL; Aliquot HPLC: 50 µL].

TABLE 5

Effect of catalyst loading on borylation of A-1

| # | Cat Sol | Base | Additive | T | Time/h | A (% P) | A (% SM) | A (% imp) | A (% H2imp) | Quant HPLC yield (%) |
|---|---|---|---|---|---|---|---|---|---|---|
| 30 | A (2.5%) | CsOH H$_2$O 2 equiv | | 80 | 4 | 29 | 45 | 2 | 8 | |
| 30 | A (2.5%) | CsOH H$_2$O 2 equiv | | 80 | 17 | 24 | 48 | | 6 | 8 |
| 31 | A (1.25%) | CsOH H$_2$O 2 equiv | | 80 | 4 | 23 | 52 | 1 | 7 | |
| 31 | A (1.25%) | CsOH H$_2$O 2 equiv | | 80 | 17 | 22 | 53 | | 6 | 19 |
| 32 | A (2.5%) | Cs$_2$CO$_3$ 3 equiv | 5% H$_2$O | 80 | 4 | 27 | 43 | 4 | 6 | |
| 32 | A (2.5%) | Cs$_2$CO$_3$ 3 equiv | 5% H$_2$O | 80 | 17 | 27 | 42 | | 6 | 27 |
| 33 | A (1.25%) | Cs$_2$CO$_3$ 3 equiv | 5% H$_2$O | 80 | 4 | 22 | 59 | 1 | 7 | |
| 33 | A (1.25%) | Cs$_2$CO$_3$ 3 equiv | 5% H$_2$O | 80 | 17 | 17 | 61 | | 6 | 18 |
| 34 | A (2.5%) | CsOH H$_2$O 2 equiv | | 65 | 4 | 32 | 47 | 1 | 10 | |
| 34 | A (2.5%) | CsOH H$_2$O 2 equiv | | 65 | 17 | 20 | 53 | 1 | 5 | 21 |
| 35 | A (1.25%) | CsOH H$_2$O 2 equiv | | 65 | 4 | 28 | 46 | 1 | 8 | |
| 35 | A (1.25%) | CsOH H$_2$O 2 equiv | | 65 | 17 | 17 | 49 | | 5 | 18 |
| 36 | A (2.5%) | Cs$_2$CO$_3$ 3 equiv | 5% H$_2$O | 65 | 4 | 38 | 38 | 3 | 7 | |
| 36 | A (2.5%) | Cs$_2$CO$_3$ 3 equiv | 5% H$_2$O | 65 | 17 | 35 | 36 | 1 | 6 | 34 |
| 37 | A (1.25%) | Cs$_2$CO$_3$ 3 equiv | 5% H$_2$O | 65 | 4 | 28 | 56 | 1 | 8 | |
| 37 | A (1.25%) | Cs$_2$CO$_3$ 3 equiv | 5% H$_2$O | 65 | 17 | 19 | 58 | 1 | 6 | 18 |

At catalysts loadings lower than 5 mol % none of the reactions showed full consumption of the starting material.

Example 6

Base and $B_2Pin_2$ Optimization for Borylation of A-1

Three different amounts of base were tested (2.0; 1.5 and 1.2 equiv/A-1) in combination with three different amounts of $B_2Pin_2$ (1.1; 1.2 and 1.5 equiv/A-1). The reactions were all run in THF at 65° C. using a catalyst loading of 5 mol %. A blank reaction with no catalyst was also run to confirm the hydrolysis of the substrate.

Catalyst preparation: Inside the $N_2$ filled glovebox, $NiCl_2$ anhydrous (0.45 mmol; 58.2 mg) and P(n-Bu)$_3$ (0.9 mmol; 182.1 mg) were added to a 5 mL vial equipped with a magnetic stirrer. Dry and degassed THF (3.0 mL) was added to the vial and the catalyst stock solution was stirred for 1.5 h at 60° C. After that time, a dark red solution of the $NiCl_2(P(nBu)_3)_2$ complex was obtained (Note: no unreacted $NiCl_2$ was observed in the vial).

Reaction: Inside the $N_2$ filled glovebox, the CsOH·$H_2O$ (2.0 to 1.2 equiv/1) and the $B_2Pin_2$ (1.1 to 1.5 equiv/1) were added to a 5 mL vial equipped with a magnetic stirrer. Next, dry and degassed THF (1.0 mL) and an aliquot of the catalyst stock solution (100 μL, 5 mol %) was added to the vial followed by the substrate (0.3 mmol, 62.5 mg). The vials were capped and placed inside the stem block where they heated overnight (ca. 17 h) at 65° C. with a stirring speed of 750 rpm. Aliquots were taken after 1 h reaction.

Reaction conditions: A-1 (0.3 mmol), base (1.2 to 2.0 equiv/A-1); $B_2Pin_2$ (1.1 to 1.5 equiv/A-1); Solvent (1.1 mL); 17 h.

Analysis: The capped vials were taken outside of the glovebox, allowed to cool down to room temperature and decapped. DI water (1 mL) and $Et_2O$ (1000 μL) was added to each vial. A 6N HCl solution (100-200 μL) was added dropwise to each vial to neutralize the excess of base and reach a pH of 1-2. The vials were stirred for 1 h. The two phases were separated and an aliquot of the organic phase (50 μL) was added to a GC vial. MeCN (950 μL) was added and the vial was capped and subjected to HPLC analysis. The results are shown below in Table 6. Qualitative results are presented based on % Area P and % Area SM. Quantitative analysis was performed for samples 1 to 9.

conversion was lower. With more $B_2Pin_2$, the reaction was also not complete. Reducing the amount of base to only 1.2 equivalents resulted in lower conversions.

Example 7

Effect of Ethanol as Solvent on Borylation of A-1

Catalyst preparation: Inside the $N_2$ filled glovebox, $NiCl_2$ anhydrous (0.45 mmol; 58.2 mg) and P(nBu)$_3$ (0.9 mmol; 182.1 mg) were added to a 5 mL vial equipped with a magnetic stirrer. Dry and degassed THF (3.0 mL) was added to the vial and the catalyst stock solution was stirred for 1.5 h at 60° C. After that time, a dark red solution of the $NiCl_2$ 2P(nBu)$_3$ complex was obtained (note: no unreacted $NiCl_2$ was observed in the vial).

Reaction: Inside the $N_2$ filled glovebox, the corresponding base (0.45 to 0.9 mmol) and the $B_2Pin_2$ (0.46 mmol; 117 mg) were added to a 5 mL vial equipped with a magnetic stirrer. Next, dry and degassed solvent (0.9, 0.95, 0.975 or 1.0 mL) and an aliquot of the catalyst stock solution (100 μL, 5 mol %) was added to the vial followed by the substrate (0.3 mmol, 62.5 mg). Finally, DI water or absolute ethanol (EtOH) (50 μL) was added if needed. The vials were capped and placed inside the stem block where they heated overnight (ca. 17 h) at 65° C. with a stirring speed of 750 rpm.

Reaction conditions: A-1 (0.3 mmol), base (1.0 to 3 equiv/A-1); $B_2Pin_2$ (1.5 equiv/A-1); Solvent (1.1 mL); 17 h.

Analysis: The capped vials were taken outside of the glovebox, allowed to cool down to room temperature and decapped. DI water (1 mL) and $Et_2O$ (350 μL) was added to each vial. A 6N HCl solution (100-200 μL) was added dropwise to each vial to neutralize the excess of base and reach a pH of 1-2. The vials were stirred for 1 h. The two phases were separated and an aliquot of the organic phase (50 μL) was added to a GC vial. MeCN (950 μL) was added and the vial was capped and subjected to HPLC analysis.

When THF/EtOH (95/5% v/v) is used as solvent, the borylation proceeded very well showing better conversions than the one obtained for THF/$H_2O$. The borylation reaction can be run in EtOH as solvent if CsOH is used as a base. A lower excess of base should be used in order to prevent the undesired hydrolysis of the starting material and product. When $Cs_2CO_3$ was used as base, the use of EtOH as solvent led mostly to the hydrolyzed starting material.

TABLE 6

Base and $B_2Pin_2$ optimization for borylation of A-1

| # | Base | $B_2Pin_2$ | A(% P) | A(% SM) | A(% imp) | A(% H2imp) | Quant HPLC yield (%) |
|---|---|---|---|---|---|---|---|
| 1 | CsOH 2 equ | 1.1 equiv | 71 | 9 | | 2 | 84 |
| 2 | | 1.2 equiv | 71 | 6 | 1 | 3 | 83 |
| 3 | | 1.5 equiv | 73 | 8 | 1 | 3 | 78 |
| 4 | CsOH 1.5 equ | 1.1 equiv | 74 | 18 | 1 | 3 | 101 |
| 5 | | 1.2 equiv | 90 | 4 | 1 | 3 | 108 |
| 6 | | 1.5 equiv | 75 | 15 | 1 | 3 | 95 |
| 7 | CsOH 1.2 equiv | 1.1 equiv | 73 | 20 | 1 | 2 | 105 |
| 8 | | 1.2 equiv | 76 | 16 | 1 | 3 | 92 |
| 9 | | 1.5 equiv | 81 | 15 | 1 | 3 | 95 |
| 10 | CsOH 2 equiv | 1.5 equiv | | | | | |

In the presence of 2 equivalents of base, the reaction product was detected in good yields but a significant amount of impurities that were not hydrolyzed A-1 was also observed. Reducing the amount of base to 1.5 equiv/A-1 gave a cleaner chromatogram. With 1.2 equiv. of $B_2Pin_2$, a very good conversion was observed. With less $B_2Pin_2$, the

Example 8

Scale-Up Reactions for Borylation of A-1 Using CsOH·$H_2O$ as Base

Reaction conditions are shown in Table 7 below. All the reactions were performed using CsOH·$H_2O$ as base (1.5 equiv/A-1) and $B_2Pin_2$ (1.25 equiv/A-1) at 65° C. THF was used as solvent (8 mL) except in Experiment #4, where EtOH was used as the solvent. All the reactions were using the commercial $NiCl_2[P(nBu)_3]_2$ as catalyst in 5 mol % loading, added as a solid or in THF solution (0.6 mL). Experiments 1-4 were performed in the glovebox with 333 mg of A-1. Experiments 5-6 were performed in an Easymax reactor under inert atm with 832 mg of A-1. A-1 is denoted as starting material

TABLE 7

Reaction conditions for scale-up of borylation of A-1

| # | mmol sm | Protocol |
|---|---------|----------|
| 1 | 1.6 | base (solid), $B_2Pin_2$ (solid), solvent, sm (liq), catalyst (sol). Then start stirring and heat |
| 2 | 1.6 | base (solid), $B_2Pin_2$ (solid), solvent. Stir 1 h at 30 C. sm (liq), catalyst (sol). Then heat |
| 3 | 1.6 | base (solid; 25% total), $B_2Pin_2$ (solid), solvent, sm (liq), cat (sol). Start stirring and heating. Then add the rest of the base (solid) in 4 portions in 1 h interval |
| 4 | 1.6 | base (solid; 20% total), $B_2Pin_2$ (solid), EtOH, sm (liq), cat (sol). Start stirring and heating. Then add the rest of the base (liq) in 4 portions in 30 min interval |
| 5 | 4 | base (solid), cat (solid), Bpin and sm in solution. Then start stirring and heating |
| 6 | 4 | Base (solid), Bpin and sm in solution. Start stirring. Cat (in sol) then heat. |

The results of the run are summarized below. Qualitative results are presented based on % Area P; % Area SM, % Area PCOOH (hydrolyzed product), % Area smCOOH (hydrolyzed starting material).

| # | t/h | A (% P) | A (% SM) | A (% imp) | A (% H2imp) | A (% smCOOH) | Quant HPLC yield (%) |
|---|-----|---------|----------|-----------|-------------|--------------|----------------------|
| 1 | 1 | 87 | 10 | | 3 | | |
|   | 2.5 | 89 | 8 | | 3 | | 94 |
| 2 | 1 | 53 | 34 | 3 | 3 | | |
|   | 17 | 55 | 34 | 3 | 3 | | 56 |
| 3 | 0.25 | 35 | 63 | | 2 | | |
|   | 0.5 | 50 | 48 | | 2 | | |
|   | 0.75 | 60 | 38 | | 2 | | |
|   | 1 | 69 | 28 | | 2 | | |
|   | 17 | 82 | 14 | | 2 | | 86 |
| 4 | 1 | 88 | 5 | 2 | 3 | 1 | |
|   |   | 89 | 3 | 3 | 3 | 1 | 79 |
| 5 | 1 | 10 | 68 | 3 | 1 | 6 | |
|   | 2.5 | 7 | 67 | 3 | 1 | 7 | |
|   | 3 | 26 | 50 | 3 | 2 | 6 | |
|   | 17 | 25 | 50 | 2 | 2 | 6 | 32 |
| 6 | 1 | 25 | 63 | 2 | 2 | 1 | |
|   | 4 | 37 | 43 | 2 | 1 | 2 | 41 |

Observations: Exp #1. Excellent reproducibility was observed when following the same protocol as for the 1 mL scale reaction: addition of base and $B_2Pin_2$ as solids followed by THF, then the liquid substrate and finally the catalyst in THF solution. The stirring and heating was started once all the components were added and the vial was capped. Note that the amount of base is here reduced to 1.5 equivalents and the reaction proceeded very cleanly with no hydrolyzed products formation albeit not to full conversion (see chromatograms below). This sample was subjected to isolation and GC purity measurements.

Exp #2. Stirring $CsOH·H_2O$ and $B_2Pin_2$ at room temperature (ca. 30-32° C.) for 1 h before adding the rest of the components (substrate and catalyst) was found detrimental for the reaction: Only 55% area product was observed. This may be due to the partial decomposition of the reactive $sp^2$-$sp^3$ $B_2Pin_2$-CsOH adduct prior to the borylation reaction. Formation of an unknown impurity (7.496 min, unknown) was also noted.

Exp #3. Dosing $CsOH·H_2O$ as a solid over a 1 hour period also showed a positive effect, with the conversion increasing gradually with the corresponding addition of the base. Even though the reaction was clean, full conversion was not achieved. This could be due to a mismatch between the fast borylation reaction and the slow addition of base.

Exp #4. The reaction with $CsOH·H_2O$ was also performed in EtOH as a solvent with the base being dosed from an EtOH stock solution over a 30 min period (300 mg in 2 mL). Under these conditions, slightly better conversion (89 area %) was obtained compared to the previous experiment. The reaction was a homogenous solution instead of a slurry.

Exp #5. Premixing the solid base and the solid catalyst prior to the addition of solvent and substrates was found very detrimental for the reaction. It appeared that the contact of the catalyst with the base caused catalyst decomposition: Almost no reaction took place after 2.5 h. At this time, the addition of a new batch of catalyst (5 mol %) resulted in the formation of moderate amounts of product but full conversion was not reached.

Exp #6. The addition of $B_2Pin_2$ and substrate in THF solution to the solid CsOH followed stirring prior to the addition of the catalyst solution also showed poor conversion (37% area after 4 h). This may also be related to the decomposition of $B_2Pin_2$-base adduct (See Exp #2).

Example 9

Scale-Up Reactions for Borylation of A-1 Using $Cs_2CO_3$ as Base

All the reactions were run using $Cs_2CO_3$ as base (3.0 equiv/A-1) and $B_2Pin_2$ (1.5 equiv/A-1 at 65° C. THF was used as solvent (7.6 mL) with EtOH (0.4 mL) added as co-solvent. All the reactions were run using the commercial $NiCl_2[P(nBu)_3]_2$ as catalyst in 5 mol % loading added in THF solution (0.6 mL).

| # | Protocol |
|---|---|
| 1 | base (solid), B2Pin2 (solid), solvent, sm (liq), catalyst (sol). Then start stirring and heat |
| 2 | Base (solid), B2Pin2 (solid), THF. Stir 2.5 h at 30 C. sm (liq), catalyst (sol), EtOH. Then heat. |
| 3 | Base (solid), B2Pin2 (solid), THF and EtOH. Stir 2.5 h at 30 C. sm (liq), catalyst (sol). Then heat. |

Reaction conditions: substrate (1.6 mmol; 333 mg), $B_2Pin_2$ (2.4 mmol; 609 mg), $Cs_2CO_3$ (4.8 mmol; 1.563 g), THF (7.6 mL), EtOH (0.4 mL), $NiCl_2[P(nBu)_3]_2$ (0.08 mmol; 42.7 mg in 0.5 mL THF).

The results of the reactions are summarized below. Qualitative results are presented based on % Area P and % Area SM.

| # | A (% P) | A (% SM) | A (% imp) | A (% H2imp) | Quant HPLC yield (%) |
|---|---|---|---|---|---|
| 1 | 97 | | | 1 | 98 |
| 2 | 98 | | | 2 | 93 |
| 3 | 30 | 64 | 1 | 2 | 22 |

The results obtained with $Cs_2CO_3$ at small scale were reproduced showing full conversion and only a minor impurity. Pre-stirring the base and $B_2Pin_2$ in THF for 2.5 h at 30° C. before adding the rest of the components did not affect the results, which is contrary to what is observed with $CsOH \cdot H_2O$ as the base. This could be the best procedure at scale. Pre-stirring the base and $B_2Pin_2$ in THF/EtOH (95/5% v/v) for 2.5 h at 30° C. before adding the rest of the components showed a negative effect on the reaction with only a small fraction of the starting material being converted to the product.

Example 10

Preparation of (ethyl 7-fluoro-2-hydroxy-2H-benzo[e][1,2]oxaborinine-8-carboxylate (A-2) with $CsOH \cdot H_2O$ in THF All steps described were performed inside an $N_2$ filled glovebox. Commercial $NiCl_2[P(n-Bu)_3]_2$ (42.7 mg, 0.08 mmol, 0.05 eq.) Aldrich #332062; CAS #15274-43-8) was weighed into a 5 mL vial. Anhydrous THF (250 µL) was added to the vial. The catalyst dissolved immediately upon stirring.

In a 25 mL reaction vial equipped with a magnetic stirrer, solid $CsOH \cdot H_2O$ (403 mg, 2.4 mmol, 1.5 eq.; Aldrich, 99.95% trace metal basis) was added. Solid $B_2Pin_2$ (508 mg, 2 mmol, 1.25 eq.; Aldrich 99%) was next added to the vial, followed by anhydrous THF (8 mL). Benzofuran A-1 (333 mg, 1.6 mmol, 1 eq.) was added to the vial with a micropipette. The Ni catalyst in THF solution was then added to the reaction vial with a micropipette. The 5 mL vial of the catalyst solution was washed with THF (250 µL), and the wash added to the reaction vial with a micropipette. The reaction vial was capped and placed in a heating block and heated at 65° C. while stirring at 750 rpm. 92% area of benzofuran A-1 was converted after 1 h of reaction (89% area product).

Example 11

Preparation of (ethyl 7-fluoro-2-hydroxy-2H-benzo[e][1,2]oxaborinine-8-carboxylate (A-2) with $CsOH \cdot H_2O$ in Ethanol Solution All steps described were performed inside an $N_2$ filled glovebox. Commercial $NiCl_2[P(nBu)_3]_2$ (42.7 mg, 0.08 mmol, 0.05 eq.) Aldrich #332062; CAS #15274-43-8) was weighed into a 5 mL vial. Anhydrous THF (250 µL) was added to the vial. The catalyst dissolved immediately upon stirring.

A base solution was prepared by adding solid $CsOH \cdot H_2O$ (324 mg, 80% total amount of base) was added to a 5 mL vial. EtOH absolute (2 mL) was then added to the vial. After 1-2 min stirring at 30-32° C. all the CsOH was dissolved.

In a 25 mL vial equipped with a magnetic stirrer, solid $CsOH \cdot H_2O$ (80 mg, 20% total amount of base) was added. Solid $B_2Pin_2$ was next added to the vial and EtOH (6 mL) was added by syringe. Benzofuran A-1 (333 mg, 1.6 mmol, 1 eq.) was added to the vial followed by the Ni catalyst in THF solution. The vial of the catalyst solution was washed with THF (250 µL) and the wash was added to the reaction vial. The reaction vial was capped and placed in a heating block and heated at 65° C. while stirring at 750 rpm. The $CsOH \cdot H_2O$ solution in EtOH was added in 4 portions (500 µL each) to the reaction mixture by means of a syringe. The addition was performed over a total period of 30 minutes. 97% area of benzofuran A-1 was converted after 2 h of reaction (89% area product).

Example 12

Preparation of (ethyl 7-fluoro-2-hydroxy-2H-benzo[e][1,2]oxaborinine-8-carboxylate (A-2) with $Cs_2CO_3$ in THF/EtOH (95/5% v/v)

All steps described were performed inside an $N_2$ filled glovebox. Commercial $NiCl_2[P(nBu)_3]_2$ (42.7 mg, 0.08 mmol, 0.05 eq.) Aldrich #332062; CAS #15274-43-8) was weighed into a 5 mL vial. Anhydrous THF (250 µL) was added to the vial. The catalyst dissolved immediately upon stirring.

In a 25 mL vial equipped with a magnetic stirrer, solid Cs$_2$CO$_3$ (1564 mg, 4.8 mmol, 3.0 eq.; Alrich 99% ReagentPlus) was added. Solid B$_2$Pin$_2$ (610 mg, 2.4 mmol, 1.5 eq.; Aldrich 99%) was next added to the vial, followed by anhydrous THF (7.6 mL) and absolute ethanol (0.4 mL). Benzofuran A-1 (333 mg, 1.6 mmol, 1 eq.) was added to the reaction vial followed by the Ni catalyst in THF solution. The vial of the catalyst solution was washed with THF (250 µL) and the wash was added to the reaction vial. Absolute ethanol (0.4 mL) was added to the reaction vial. The reaction vial was capped and placed in a heating block and heated at 65° C. while stirring at 750 rpm. Full conversion was observed after 1 h of reaction.

Example 13

Preparation of (ethyl 7-fluoro-2-hydroxy-2H-benzo [e][1,2]oxaborinine-8-carboxylate (A-2) with Cs$_2$CO$_3$ in THF/EtOH (95/5% v/v) with Premixing of B$_2$Pin$_2$ and a Base All steps described were performed inside an N$_2$ filled glovebox. Commercial NiCl$_2$[P(nBu)$_3$]$_2$ (42.7 mg, 0.08 mmol, 0.05 eq.) Aldrich #332062; CAS #15274-43-8) was weighed into a 5 mL vial. Anhydrous THF (250 µL) was added to the vial. The catalyst dissolved immediately upon stirring.

In a 25 mL vial equipped with a magnetic stirrer, solid Cs$_2$CO$_3$ (1564 mg, 4.8 mmol, 3.0 eq.; Alrich 99% ReagentPlus) was added. Solid B$_2$Pin$_2$ (610 mg, 2.4 mmol, 1.5 eq.; Aldrich 99%) was next added to the vial, followed by anhydrous THF (7.6 mL). The vial was capped and the mixture was stirred for 2.5 h at 30-32° C. The vial was decapped and benzofuran A-1 (333 mg, 1.6 mmol, 1 eq.) was added to the reaction vial followed by the Ni catalyst in THF solution. The vial of the catalyst solution was washed with THF (250 µL) and the wash was added to the reaction vial. Absolute ethanol (0.4 mL) was added to the reaction vial. The reaction vial was capped and placed in a heating block and heated at 65° C. while stirring at 750 rpm. Full conversion was observed after 1 h of reaction.

Once the reaction complete, the reaction vial was cooled down to room temperature. DI water (3 mL) was added to the mixture and the vial was stirred at room temperature, followed by addition of Et$_2$O (2 mL) was added to the mixture. HCl (6 N) was added with a pipette until a pH of 1 was reached (1.6 mL approx.) The biphasic system was stirred at 0° C. for 1 h and the organic layer was extracted. The solvent was removed in vacuo and the crude mixture was redissolved in a small volume of EtOH absolute (ca. 3-4 mL). The solution was stirred overnight in the presence of 37% HCl (3 drops). The solvent was evaporated in vacuo and the residue purified by column chromatography (eluent: DCM/EtOH: 100/0 to 93/7% v/v).

Example 14

Preparation of Compound A-3

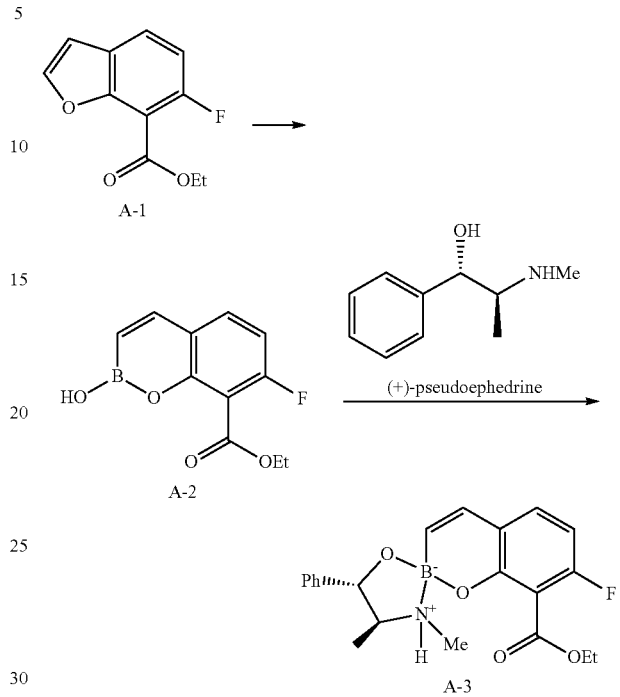

Preparation of (+)-pseudophedrine for reaction: 10 L of 2-methyl tetrahydrofuran (MeTHF) was loaded into 100 L reactor under nitrogen. Pseudoephedrine hydrochloride salt (3070 mg) was loaded into the reactor and suspended in MeTHF with stirring. Another 10 L of 2-MeTHF was loaded to wash down all the solid of pseudoephedrine hydrochloride salt that attached on the glass wall of the reactor. The jacket temperature was set at 20° C. Under nitrogen, 6.2 L of 4N NaOH (3.4 kg of 30% NaOH) was added into the suspension of pseudoephedrine hydrochloride salt in 2-MeTHF. The addition rate was maintained to keep the internal temperature below 50° C. The reaction mixture was stirred under nitrogen for about 1 hour, and then stopped stirring to let the solution stand still for more than 30 minutes. The phases were separated at room temperature, and the organic layer was kept inside 100 L reactor and washed with Brine (5 L) twice, the pH of the last water layer was pH 9-10. The organic layer was transferred out of the reactor and kept in inside a carboy.

Cesium carbonate (14.1 kg) was loaded into 100 L reactor under nitrogen. Solid diboron pinacolate (5.13 kg) was added to the reactor under nitrogen. 2-MeTHF (25.6 kg, 30 L) was added to wash down all solids attached to inner wall. The mixture was stirred for about 30 minutes to dissolve diboron pinacolate at room temperature. Benzofuran ester A-1 (3.0 kg) was added into the reactor. The reaction mixture was degassed three times by vacuum/filling with nitrogen. The reaction mixture was heated up to 50° C. under nitrogen with stirring. The P(n-Bu)$_3$/NiCl$_2$ catalyst solution in EtOH/2-MeTHF (540 g 1.5 L/6 L) was added portion wise: pumped about 30 seconds in every 3 minutes period, total time for catalyst addition was about 90 minutes. The reaction mixture was sampled by removing 0.2 mL of the mixture and diluting with MTBE (5 mL) and DI water (5 mL), and then acidifying with 6N HCl to pH 0-1. The organic layer was diluted with 10 volumes of acetonitrile for HPLC. Once the conversion of A-1 was higher than 95%, the reaction mixture was cooled to 0° C., then quenched with cold DI water (20 kg). The temperature of the mixture was maintained below 5° C. during quench. The pH of the reaction mixture was adjusted to pH=0-1 with 37% of HCl (approximately ~9.5 kg was used) under nitrogen at 0° C. MTBE (14.8 kg, 20 L) of was added to promote the precipitation of pinacol, and then the reaction mixture was stirred for overnight at 0° C. Pinacol was removed by filtration and the solid was washed with cold n-heptane (2×5.5 kg) to remove color from pinacol solid. All liquids from filtration and washes were pumped back into 100 L reactor. The layers were allowed to separate at room temperature and the organic layer was kept inside the reactor. The organic layer was washed with deionized water (4×20 kg) until the water layer had a pH of 6. The (+)-pseudophedrine solution was added to the reaction mixture at room temperature and the reaction mixture was stirred under nitrogen overnight. The jacket temperature was increased to 70° C. and volume of reaction was reduced to about 35 L by vacuum distillation. Toluene (15 kg) was added into the product mixture inside 100 L reactor to a total volume of about 55 L. Vacuum distillation was continued until about 25 L of reaction mixture was left inside the reactor. Toluene (13 kg) was then added to the reaction mixture until the total volume was about 40 L). Vacuum distillation was continued until about 10 L of reaction mixture remained inside the 100 L reactor, and toluene (10 kg) was added back into the reactor to raise the total volume to about 25 L. The reaction mixture was sampled and the content of 2-MeTHF was determined to be less than 5 wt. %. 3.5 k g of n-heptane was added, raising the total volume was about 30 L. The product solution was cooled down to 0° C. and held for overnight prior to filtration to give crude compound A-3. A-3 was then washed with cold n-heptane and dried under vacuum at 45° C. for more than 2 days to give compound A-3.

Single Crystal X-Ray Structure Determination for Compound A-3

A yellow rod shaped crystal of compound A-3 with formula $C_{21}H_{23}BFNO_4$ having approximate dimensions of 0.42×0.22×0.13 mm was mounted on a Mitegen micromesh mount in a random orientation. Preliminary examination and data collection were performed using Cu Kα radiation ($\lambda$=1.54178 Å) on Bruker AXS D8 Quest CMOS diffractometer equipped with a four axis kappa stage, an I-μ-S microsource X-ray tube laterally graded multilayer optics, a Photon2 CMOS area detector. The initial unit cell was determined and data were collected using Apex3 v2017.3-0 (Saint V8.38A, Bruker AXS Inc.: Madison (WI), USA, 2013/2014) at a temperature of 301 K (room temperature). Frames were integrated using SAINT V8.38A. A total of 27,647 reflections were collected, of which 4,242 were unique. Cell constants for data collection were obtained from least-squares refinement using 9,257 reflections between 5.7514 and 79.5737°. The monoclinic cell parameters and calculated volume are a=11.191(4) Å, b=7.751 (3) Å, c=11.795 (4) Å, β=95.867 (12)°, V=1017.8 (6) Å$^3$. For Z=2 and a formula weight of 383.21 the calculated density is 1.250 g/cm$^3$. The linear absorption coefficient is 0.753/mm for Cu Kα radiation. Scaling and a multi-scan absorption correction using SADABS (Apex3 v2017/3) was applied. Transmission coefficients ranged from 0.5825 to 0.7543. Intensities of equivalent reflections were not averaged during data processing.

The space group was determined by the program XPREP as embedded in SHELXTL (Version 6.14, Bruker AXS Inc., Madison, Wisconsin: USA). Systematic absences and intensity statistics indicated the space group $P2_1$ (#4). The structure was solved by direct methods using SHELXS and refined by full matrix least squares against $F^2$ with all reflections using SHELXL-2018 (Sheldrick, G. M. (2008). Acta Cryst., A64, 112-122.; Sheldrick, G. M. (2018). SHELXL2018. University of Göttingen, Germany) and the graphical user interface ShelXle (Hübschle, C. B., Sheldrick, G. M. and Dittrich, B. (2011). J. Appl. Cryst., 44, 1281-1284). Additional atoms were located in succeeding difference Fourier syntheses. The structure was refined using full-matrix least-squares where the function minimized was $\Sigma w(|F_o|^2-|F_c|^2)^2$ and the weight w is defined as $w=1/[\sigma^2 (F_o^2)+(0.0638P)^2+0.0447P]$ where $P=(F_o^2+2F_c^2)/3$. Scattering factors were taken from the International Tables for Crystallography (Vol C Tables 4.2.6.8 and 6.1.1.4). A total of 4,242 independent reflections were used in the refinements. 4,015 reflections with $F^2>2\sigma(F^2)$ were used in the calculation of R1. H atoms attached to carbon and nitrogen atoms were positioned geometrically and constrained to ride on their parent atoms, with carbon hydrogen bond distances of 0.95 Å for aromatic C—H, and 1.00, 0.99 and 0.98 Å for aliphatic C—H, CH$_2$ and CH$_3$ moieties, and 0.98 Å for N—H bond distances, respectively. Methyl H atoms were allowed to rotate but not to tip to best fit the experimental electron density. $U_{iso}(H)$ values were set to a multiple of $U_{eq}(C/N)$ with 1.5 for methyl, alcohol and water H atoms, and 1.2 for N—H, C—H and CH$_2$ units, respectively.

The absolute structure parameter (Flack x) was determined using 1,748 quotients $[(I+)-(I-)]/[(I+)+(I-)]$ using the method described by Parsons et al., Acta Cryst. 2013, B69, 249-259, and refined to -0.03 (6). Completeness of Friedel pairs to 67.679° in theta is 97.2%. For all data it is 93.6%.

The final cycle of refinement included 256 variable parameters and 1 restraint (for the origon) and converged (the largest parameter shift was 0.001 times its standard uncertainty) with unweighted and weighted agreement factors of: $R1=\Sigma|F_o|-|F_c|/\Sigma|F_o|=0.038$; $wR^2=\{\Sigma[w (F_o^2-F_c^2)^2]/ \Sigma[w(F_o^2)^2]\}^{0.5}=0.1119$. The goodness-of-fit parameter was 1.110. The highest peak in the final difference Fourier had a height of 0.167 e/Å$^3$. The minimum negative peak had a height of -0.117 e/Å$^3$.

Example 15

Preparation of Compound A-4

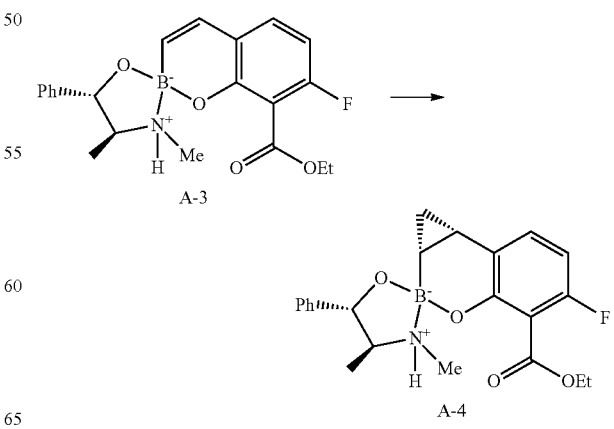

Preparation of Diazald Solution

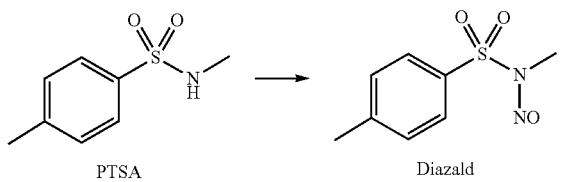

Diethyl ether (30 L) was charged into 100 L reactor under nitrogen with stirring. p-toulenesulfonic acid (PTSA) (15 kg) was charged into the reactor and suspended in ethyl ether. 40 L more of ethyl ether was added to wash down all PTSA solid that attached to glass wall. The reaction mixture was cooled down to 0° C., and 37% HCl (16 kg) was charged into the reactor, while maintained the temperature below 0° C. The addition line was then washed with 1 kg of DI water. A solution of $NaNO_2$ (5.85 kg $NaNO_2$ in 12 kg $H_2O$) was added slowly while maintaining the temperature at about 0° C. The reaction mixture was warmed up to 20° C. and stirring was continued for one hour to produce an orange-red solution. Stirring was stopped and the reaction mixture was kept still for more than 30 minutes. The organic phase was washed with sodium bicarbonate solution three times (3×1.2 kg sodium bicarbonate in 3.5 kg DI $H_2O$) to pH >6, then kept at about 0-5° C. with slow stirring with most of the diazald crystallizing out of solution.

The Diazald solution was warmed up slowly to 20° C. to dissolve all solid. Concentration and purity were checked with $^1$H-NMR (>200 ml of solution was concentrated to dryness for concentration).

Inside of a Generator, dimethoxyethane (6.9 kg) and 45% KOH in water (3.8 kg) was charged under nitrogen, then heated to above 53° C., and maintained between 53-58° C. during reaction.

Inside Reactor: compound A-3 (1.2 kg) was charged into the reactor, followed by THF (21.7 kg). The reactor contents were stirred under nitrogen to dissolve all A-3, and then cooled to a temperature between −25° C. and −15° C. Palladium acetate (12 g) was dissolved in THF (3.1 kg) with stirring at room temperature. An atmospheric distillation apparatus was inerted with a positive nitrogen sweep and checked for leaks (outlet was immersed in 60% acetic acid water solution swap. Continuous nitrogen bubbles were observed).

Once the temperature of the Generator reached 53° C. or higher. About 500 mL of diethyl ether was fed into the Generator. When the ether was received continuously by the reactor (ether drops continued fall into reactor from the tail of the condenser), the desired amount of Diazald solution in ether was continuous fed evenly into generator. The time for feeding Diazald was about 100-110 minutes total. The palladium catalyst solution was added with pump into reactor portion wise: the pump was turned on for about 30 s for each 3 minutes period. The time for catalyst addition was about 100-110 minutes. Yellow color diazomethane solution flowed continuously into reactor during reaction and gas bubbles were always observed inside acetic acid swap.

The reaction was sampled at 90 minutes and analyzed by HPLC for completion. The reaction temperature was maintained below −15° C. for 30 mins after catalyst addition in the presence of a nitrogen sweep. The generator contents were killed with 60% HOAc (3.7 kg) in water (the inner temperature was maintained below 60° C. during acetic acid addition). The reaction mixture was quenched with 60% HOAc in THF (3.22 kg). The quenched reaction mixture was transferred into carboys and kept at room temperature. Three batches of reactions with A-3 were combined for the workup. The reaction mixture was concentrated to almost dryness under reduced pressure at 50° C. The residue was dissolved in 18 L (for three combined batches) of THF. n-Heptane (25 kg) was continuously fed into the rotovap flask during distillation under reduced pressure. The product mixture was concentrated to almost dryness using rotovap distillation, again redissolved in 18 L THF and concentrated to near dryness after continuously feeding n-Heptane (25 kg) into the rotovap flask during distillation under reduced pressure. The residue was dissolved in 18 L (6 L for one batch of step 2 reaction) of THF, then diluted with isopropyl alcohol (35.4 kg). The solution was then filtered through a filtration bag (filled with about 300 g of Celite), 1-5 m polish filter, and 0.25 m polish filter. The product solution from filtration was concentrated to dryness using a rotovap under reduced pressure. Isopropyl alcohol (14.1 kg) was used to dissolve all residue, and then 6 L of n-heptane was added. The acetic acid content of the solution was checked, and it was below 1 wt %. The product solution in IPA was cooled down to 0-10° C. with stirring. The crystalline compound A-4 was isolated using filtration and washed once with cold isopropyl alcohol (3 L). The volume of filtrate was reduced to half first using distillation under reduced pressure, and then cooled down to 0° C., and additional A-4 was isolated using filtration and washed once with cold isopropyl alcohol (3 L). Crystalline compound A-4 was dried at 45° C. under vacuum for two days.

Example 16

Alternative Preparation of Compound A-4

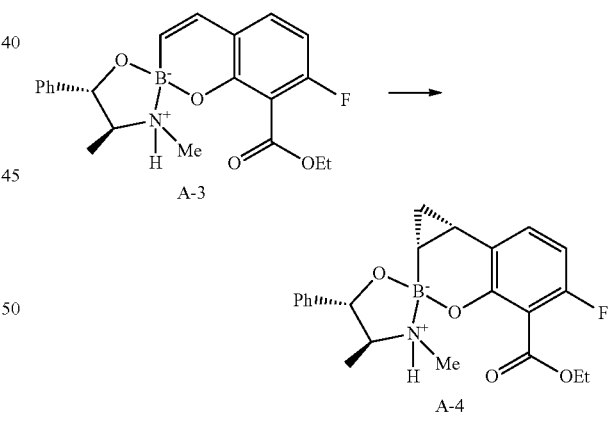

A heterogeneous mixture of Zn/Cu couple (1.71 g, 26.1 mmol, 2 eq,) and compound A-3 (5 g, 13 mmol) in 2-methyltetrahydrofuran (25 mL) was heated in an oil bath to 65° C. (bath 68° C.). Upon reaching 65° C., diiodomethane (0.5 mL, 6.2 mmol, 0.5 eq) was added. Iodine was then added to initiate the reaction followed by portion-wise addition of the diiodomethane (1.4 mL, 17.4 mmol, 1.3 eq,) to control the exotherm. Upon completion of the addition of diiodomethane, the black heterogeneous mixture was stirred at 65° C. for 30 min then cooled to room temperature, conversion was >99% and chemical purity was 96.9% by HPLC. The cooled reaction mixture was quenched with a 1:1 mixture of saturated NH₄Cl and water (25 mL), and after stirring at room temperature for 5 minutes, the solids were filtered off over celite. The flask and pad were rinsed with MTBE (2×10 mL). The combined biphasic filtrates were partitioned and the organic layer was washed with a 1:1 mixture of saturated NH₄Cl and water (3×25 mL). The organic layer was concentrated to dryness. The enantiomeric excess was determined to be 98.7% by chiral HPLC. The yellow solid residue was taken up in isopropyl alcohol (25 mL) and the heterogeneous mixture was heated at 60° C. The clear yellow solution was allowed to cool to room temperature. After stirring at room temperature overnight a pale yellow slurry was obtained. The slurry was cooled to 0° C. After stirring at 0° C. for 3 h, the solids were collected by filtration and rinsed with cold isopropyl alcohol, air dried then dried under high vacuum to give compound A-4 (1.78 g, 34% yield, 99.76% chemical purity and 100% e.e).

Example 17

Alternative Preparation of Compound A-4

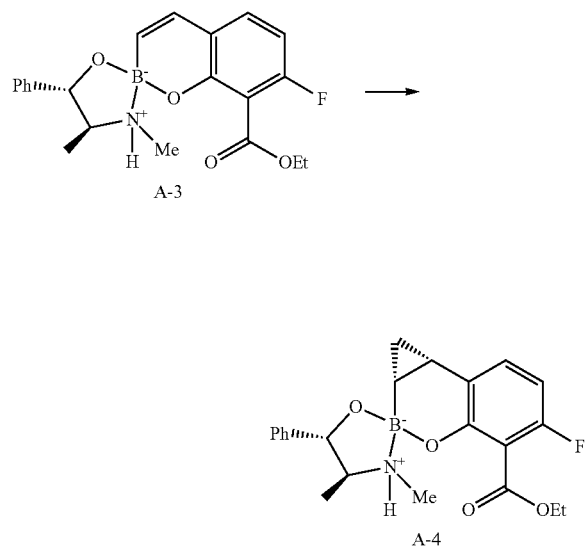

Acetyl chloride (50 L) was added to an heterogeneous mixture of Zn (3.41 g, 52.2 mmol), CuCl (517 mg, 5.2 mmol) and CH₂Br₂ (0.75 mL, 10.7 mmol) in anhydrous 2-MeTHF (25 mL) at room temperature. The grey mixture was gradually heated in an oil bath to 50° C. monitoring for exotherms and appearance. Upon complete activation of the Zn/Cu couple, solid compound A-3 (5 g, 13 mmol) was added and the reaction mixture was heated at 60° C. The remaining CH₂Br₂ (2 mL, 28.5 mmol) was added in portions monitoring for exotherms. Upon completion of the addition the conversion was >99%. The black heterogeneous mixture was cooled to room temperature and carefully quenched with a 1:1 mixture of saturated NH₄Cl and water (25 mL). The mixture was filtered over celite and the flask and pad were rinsed with MTBE. The combined biphasic filtrate was partitioned. The organic layer was washed with a 1:1 mixture of saturated NH₄Cl and water (25 mL) and concentrated to dryness to give compound A-4 as a pale yellow foam with a 98.6% ee Example 18

Alternative Preparation of Compound A-4

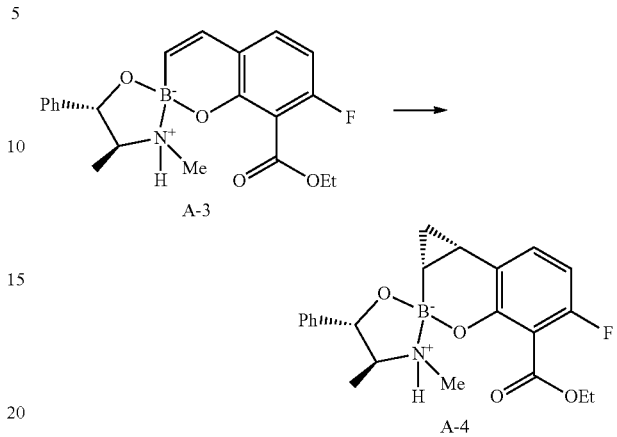

A round bottom flask was charged with a 1 M solution of ZnEt₂ in heptane (6.5 mL, 65.2 mmol) and cooled to −20° C. A solution of CH₂I₂ (1.05 mL, 13 mmol) in CH₂Cl₂ (2 mL) was added keeping the temperature <−20° C.; a white milky mixture was obtained. The reaction mixture was allowed to warm to −10° C. over 20 min. A solution of compound A-3 (1 g, 2.6 mmol) in CH₂Cl₂ (5 mL) was added keeping the temperature <−10° C., a slightly heterogeneous mixture with solids stuck on the sides of the flask was obtained. Upon completion of the addition, conversion was determined to be 71% by HPLC. After 15 min at −10° C., conversion was 77%. The bath was allowed to warm up slowly. Upon reaching 0° C., conversion was 79%. Upon reaching 12° C., conversion was 90%. After stirring 2 more hours (temperature reached 14° C.) conversion was 94%. The reaction mixture was cooled to 0° C. and quenched with sat NH₄Cl (10 mL, exotherm to 10° C.). After stirring vigorously for 1 min, the layers were separated. The organic layer was washed with water then concentrated to dryness. Upon concentration, the product started to crystallize once CH₂Cl₂ was removed. Compound A-4 was obtained as pale yellow solid was obtained (ee=97.8%).

Example 19

Preparation of Compound A-5

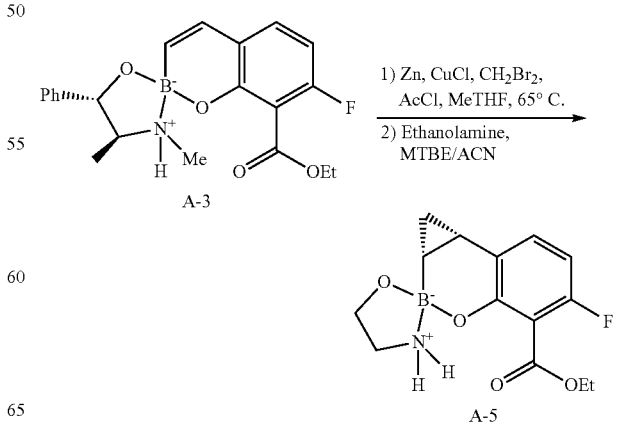

A procedure was developed for the cyclopropanation of the pseudoephedrine complex of ethyl 7-fluoro-2-hydroxy-2H-benzo[e][1,2]oxaborinine-8-carboxylate (A-3) that alleviated issues associated with reactivity of the zinc/copper couple by making the reagent in situ. In addition, these new conditions allowed for the replacement of CH$_2$I$_2$ by the much cheaper CH$_2$Br$_2$. However, due to the nature of pseudoephedrine, strongly acidic conditions could not be used during the workup to remove all the zinc salts without substantial loss of the pseudoephedrine moiety. Since pseudoephedrine had fulfilled its role in achieving the high enantioselectivity during the cyclopropanation, it was no longer needed and could be replaced by an alternative amino alcohol complex of the boronate. The procedure is detailed below.

Acetyl chloride (93 μL, 1.3 mmol) was added to a heterogeneous mixture of Zn (6.83 g, 104 mmol), CuCl (1.03 g, 10.4 mmol) and dibromomethane (0.5 mL, 13 mmol) in 2-methyltetrahydrofuran (MeTHF) (50 mL) at room temperature. The grey mixture was heated in an oil bath set to 50° C. Upon the internal temperature reaching 50° C., the starting material A-3 (10 g, 26.1 mmol) was added at once and the flask was rinsed with MeTHF (5 mL). The grey heterogeneous mixture was heated to 60° C. (bath at 60° C.). Upon the internal temperature reaching 59° C. the remaining CH$_2$Br$_2$ (4.1 mL, 52.2 mmol) was added in small portions keeping the temperature <65° C. Upon completion of the addition HPLC showed almost complete conversion. The reaction mixture was heated at 60° C. for an additional 30 min to get 99.4% conversion. The reaction mixture was cooled to 0° C. and poured into a 1:1 mixture of saturated NH$_4$Cl and water at 0° C. (75 mL). After stirring at room temperature for 10 min, the black mixture was filtered over celite and the flask and pad were rinsed with methyl tert-butyl ether (MTBE). The combined filtrates were partitioned and the organic layer was washed with 1 M HCl (2×50 mL) and then water (3×50 mL). The organic layer was filtered through celite and the filtrate was concentrated to dryness. The yellow oil was taken up in acetonitrile (ACN) (50 mL) and concentrated to dryness. The residual syrup was taken up in 2/8 ACN/MTBE mixture (70 mL). Ethanolamine was added slowly over 45 min and the salt crystallized rapidly. After stirring at room temperature overnight, the solids were collected by filtration, rinsed with 9/1 MTBE/ACN, air dried and then dried under high vacuum to give A-5 as a yellow powder 6.63 g, 86.6% yield, 99.57% purity. The complex can then be further reacted in a manner similar to that shown in Example 20 in order to obtain Compound I'.

Example 20

Preparation of Compound I'

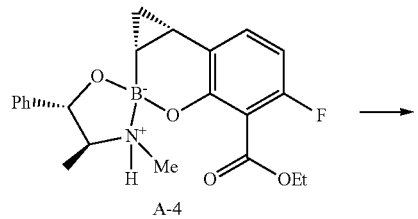

A-4

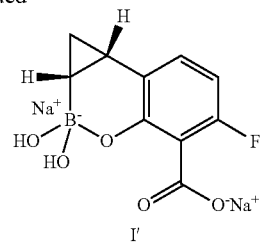

I'

Compound A-4 (7 kg) was loaded into 100 L reactor under nitrogen. 2-MeTHF (64 kg) was charged into the 100 L reaction vessel to wash down all solid that attached to glass wall. The temperature was increased to 40° C. Compound A-4 was dissolved in 2-MeTHF with stirring at about 35° C. A solution of sodium hydroxide (1.8 kg solid dissolved in 13 kg of DI H$_2$O) was loaded into the reactor and addition line was washed with 1 kg of DI water. The reaction mixture was stirred at 60° C. under nitrogen overnight. The reaction mixture was cooled down to 20° C. with stirring. The stirring was then stopped, allowed to sit for 30 minutes, and the aqueous layer was isolated and extracted with MTBE (1×14.8 kg). The pH of the aqueous layer was adjusted to 9 with 3.52 kg of acidic resin (Amberlite IR120H resin. Before use, it was washed three times with MTBE, 3×10 L, then washed four times with DI water, 4×10 L). The pH 9 solution was filtered through a filtration bag (for removing resin), carbon cartridge (2300 cm$^2$, 8-in stack, for removing palladium and color), and 1-5 μm polish filter. The water was then removed using azeotropic distillation with methyl ethyl ketone (238 kg). The liquid was sampled for the analysis of water content, which was about 2.5% water by volume. The mixture was concentrated to a slurry at 50° C. under reduced pressure. The slurry was cooled to room temperature, filtered under nitrogen, and washed with methyl ethyl ketone (2×6 L) and dried under vacuum at 50° C. for 48 hours to give compound I'.

Example 21

Effect of Chiral Auxiliary on the Preparation of Compound (B-IV)

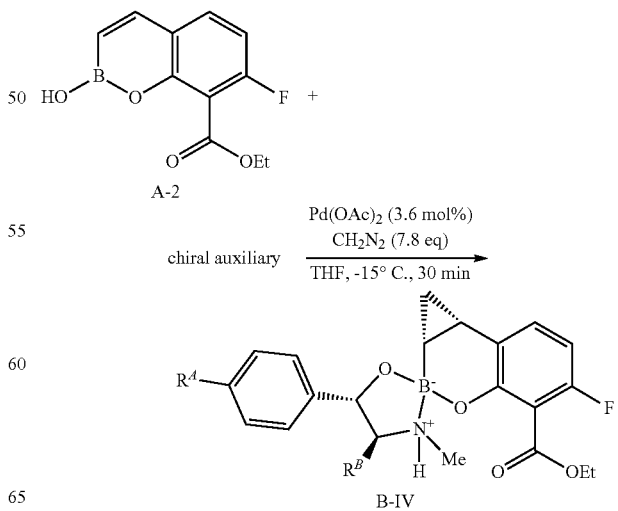

Preparation of chiral auxiliaries for this reaction may be achieved by procedures described in, e.g., *Tetrahedron Asymm.* 2016, 27, 338 and *Tetrahedron Asymm* 2010, 21, 837, the disclosure of each of which is incorporated herein in its entirety.

A stock solution of substrate A-2 in dry THF (30 mg/mL) and a stock solution of Pd(OAc)$_2$ in dry THF (1 mg/mL) were prepared. For each cyclopropanation reaction, approximately 20 mg of the chiral auxiliary was dissolved in 4 mL of dry THF. The substrate stock solution (1 mL) was added and the mixture was stirred for at least 1 h at ambient temperature. The reaction vial was cooled to −15° C. Subsequently, 1 mL of catalyst stock solution was added, followed by 3 mL of diazomethane solution (approximately 0.33 M). The reaction mixture was stirred at −15° C. for 60 minutes and subsequently the temperature was allowed to increase to room temperature. The enantiomeric excess of compound B-IV (wherein R$^1$ is ethyl) was analyzed by chiral HPLC. The results are presented in Table 8 below.

TABLE 8

Enantiomeric Excess Compound B-IV (Ethyl Ester) For Various Chiral Auxiliaries

| Chiral Auxiliary | Enantiomeric excess B-IV [%] |
|---|---|
| (1S,2S)-(+) pseudo-ephedrine | 73 |
| Aux-3 | 70, 71 |
| Aux-4 | 55, 59 |
| Aux-5 | 3, 3 |
| (R)- structure | −28 |

TABLE 8-continued

Enantiomeric Excess Compound B-IV (Ethyl Ester) For Various Chiral Auxiliaries

| Chiral Auxiliary | Enantiomeric excess B-IV [%] |
|---|---|
| (1S,2R)-(+) ephedrine | |
| Aux-11 | 33 |
| Aux-13 | 16 |
| Aux-14 | 4 |

The data indicates that Aux-3 shows the best performance as auxiliary in the cyclopropanation reaction. The enantiomeric excess obtained with this auxiliary is near identical to that obtained with (1S,2S)-(+) pseudo-ephedrine. With increasing size of the N-substituent, the stereoselectivity of the cyclopropanation reaction decreases. With the N-isopropyl Aux-5 near racemic product was obtained.

Application of ephedrine-analogue Aux-11 resulted in a significantly lower asymmetric induction. The absolute value of enantiomeric excess achieved with the close analogue is comparable to that achieved with (1S,2R)-(+) ephedrine. For the three ephedrine analogues Aux-11, Aux-13 and Aux-14 a same trend emerges as for the pseudo-ephedrine analogues Aux-3, Aux-4, and Aux-5: With increasing size of the N-substituent, the stereoselectivity of the cyclopropanation reaction decreases. With Aux-14, near racemic product was obtained, as was the case with Aux-5.

Example 22

Effect of Palladium Catalyst Loading on Cyclopropanation of A-3 with Diazomethane

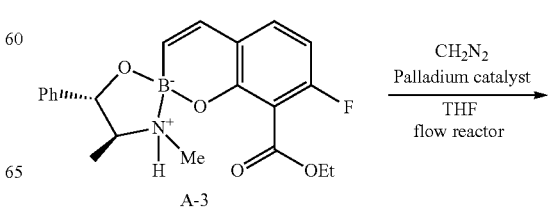

A-3

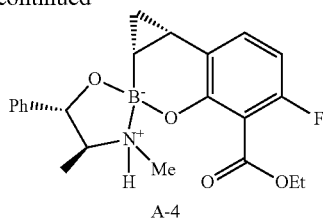

A-4

The effect of palladium catalyst for cyclopropanation of A-3 for the following catalysts: Pd(OAc)$_2$, Pd$_2$(DVTMS)$_3$. Pd(acac)$_2$, Pd(TFA)$_2$, and Pd(OPiv)$_2$. The effect was measured in a flow reactor using 2% mol palladium catalyst, three equivalents of CH$_2$N$_2$, a 10 minute residence time in the flow reactor, a −20° C. bath temperature and a 30 psi system backpressure.

Figure 24:
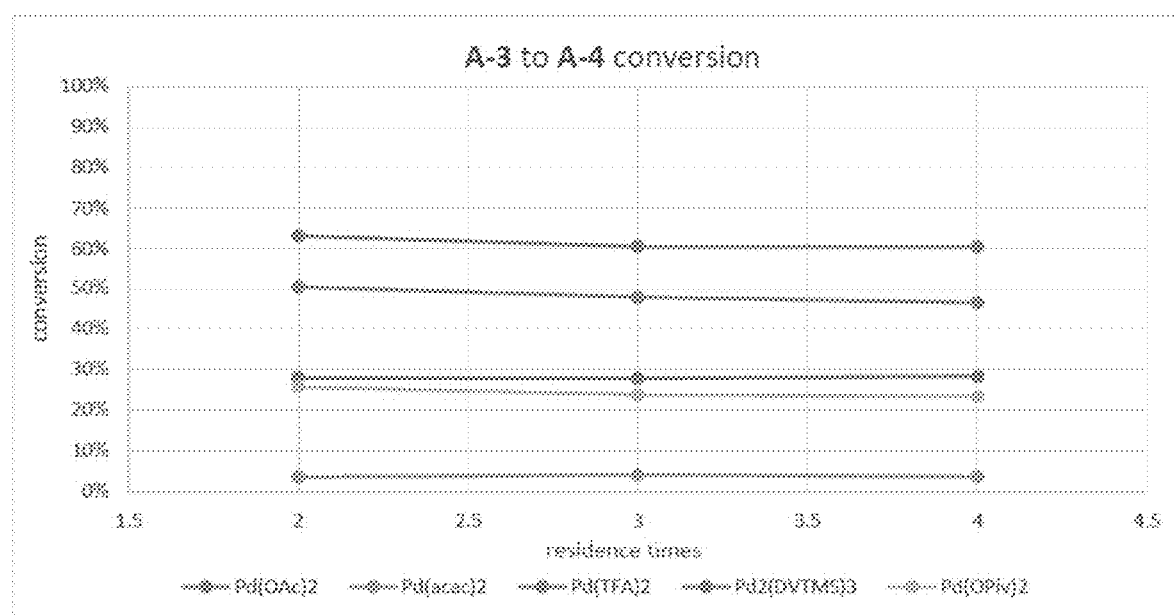
FIG. 24 shows the conversion of A-3 to A-4 for a variety of palladium catalysts.

The results are provided in FIG. 24. Pd(OPiv)$_2$ performed very similarly to Pd(OAc)$_2$ with respect to A-3 conversion. However the reaction with Pd(OPiv)$_2$ showed rapid polymer buildup, forcing shut-down of the reactor after only 5 residence times. In contrast, the reactions with Pd(OAc)$_2$ are relatively slow to build up polymer and the reactor was used multiple times before requiring cleanout. Pd(TFA)$_2$ gave better conversion than either Pd(OAc)$_2$ or Pd(OPiv)$_2$. The Pd(0) catalyst Pd$_2$(DVTMS)$_3$ performed well in the cyclopropanation of A-3, showing the best conversion among the catalysts tested. The reactions with Pd$_2$(DVTMS)$_3$ ran with nearly zero pressure fluctuation in the system. No solids were observed in the effluent. These observations suggest that polymer formation may be reduced relative to the other catalysts.

Figure 25:
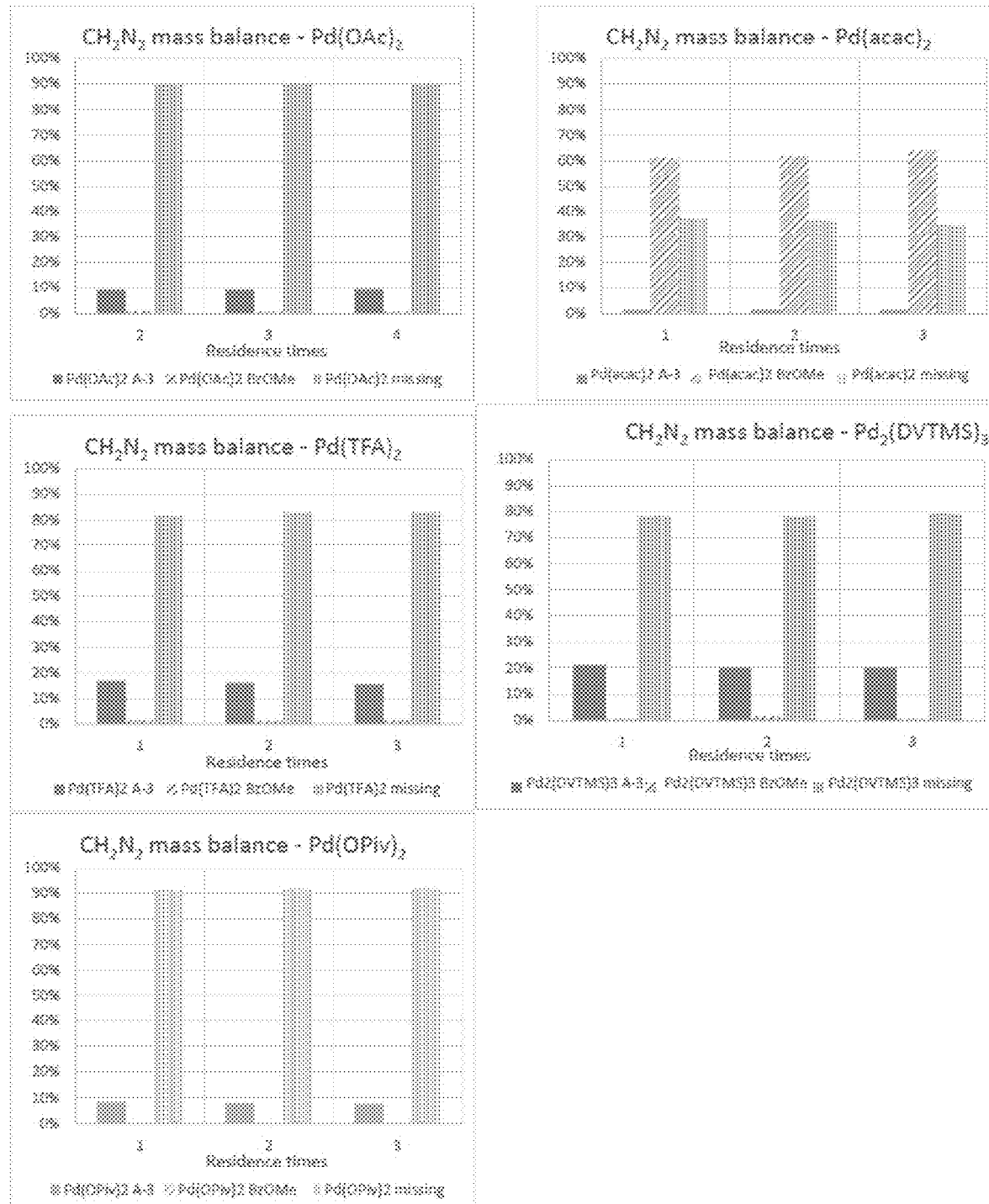
FIG. 25 shows the mass balance from the catalyst screening.

FIG. 25 shows mass balance for CH$_2$N$_2$ where the product stream was quenched into benzoic acid where any residual CH$_2$N$_2$ is converted to methyl benzoate. As visible in FIG. 25, in all cases except Pd(acac)$_2$, very little if any methyl benzoate is observed. Much of the CH$_2$N$_2$ mass is unaccounted for and presumably is being converted to polymer. When considering the Pd(II) catalysts, Pd(acac)$_2$ showed very little activity toward either cyclopropanation or polymerization of diazomethane, and a large portion of the diazomethane was converted to methyl benzoate. Unaccounted CH$_2$N$_2$ for the other palladium catalysts may be leading to the formation of a polymer.

Example 23

Preparation and Isolation of Crystalline Form A of Compound I'

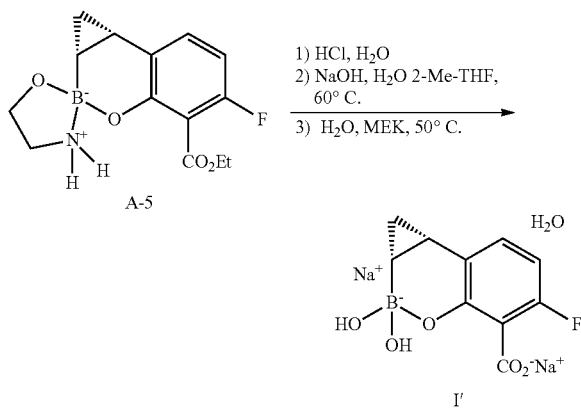

Crystalline Form A of Compound I' is the monohydrate of the disodium salt of Compound I.

2-Methyltetrahydrofuran (2-Me-THF, 8.0 kg/kg Compound A-5) was charged into a reactor, evacuated and backfilled with N$_2$, at 20° C. (15-25° C.), followed by the addition of Compound A-5 to give a suspension. Then dilute hydrochloric acid (HCl$_{aq.}$, 4-6%, 4.0 kg/kg Compound A-5) was dosed while stirring, converting Compound A-5 into its uncomplexed form. The bottom aqueous phase containing ethanolamine hydrochloride was separated (the product is in the top organic phase) and this extraction was subsequently repeated with more dilute hydrochloric acid (4.0 kg/kg Compound A-4) and finally with water (4.0 kg/kg Compound A-5).

To the remaining organic phase in the reactor was dosed dilute sodium hydroxide solution (NaOH$_{aq.}$, 4.2-5.0%, 7.35 kg/kg Compound A-5) while stirring, and the biphasic mixture was heated to 60° C. (55-65° C.), which converts Compound A-5 to Compound I. The reaction was run for a minimum of 6 h and then cooled to 20° C. (15-25° C.).

The aqueous bottom phase was separated and the organic top phase was discarded. The aqueous phase was charged back into the reactor to which was then added sufficient prepared acidic ion exchange resin to achieve a pH of 9.8 (9.0-10.5; in case the pH drops below this range, it may be corrected using dilute sodium hydroxide solution). Then the resin was filtered off in a filter dryer, the reactor and the resin were rinsed with water and the filtrates are passed through a cartridge of activated carbon and a polish filter. The aqueous product solution was then concentrated in vacuo to 2.11 kg/kg Compound A-5 at a maximum of 65° C. and subsequently dosed to stirred methylethyl ketone (MEK, 33.4 kg/kg Compound A-5) at 50° C. (45-55° C.) over 90 min and stirred for a minimum of 10 h, which crystallizes Compound I' (in case the water content in the MEK supernatant is too high, the slurry may be concentrated azeotropically). Following this, the product was filtered off in a filter dryer, washed with a mixture of MEK (2.5 kg/kg Compound A-5) and water (0.073 kg/kg Compound A-5) and finally dried in vacuo (approx. 100 mbar) at maximum 50° C. jacket temperature to obtain Compound I' as a monohydrate.

Example 24

Crystallization of Form A of Compound I'

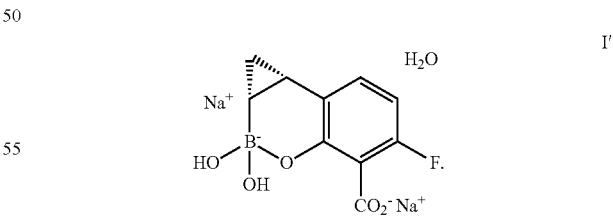

A reactor of suitable size was evacuated and backfilled with N$_2$. Then methyl ethyl ketone (MEK, 36.2 kg/kg Compound I') was transferred into the reactor and kept blanketed with N$_2$ at all times. Meanwhile, deionized water (1.30 kg/kg Compound I') was degassed by bubbling N$_2$ through for approx. 20 min, Compound I' was added, the mixture was degassed again for approx. 5 min and subsequently agitated until completely dissolved.

The jacket of the reactor containing the MEK antisolvent was brought to 95° C. and the solvent was refluxed for degassing for 45 min. After cooling the antisolvent back to 51° C., the Compound I' solution prepared above was dosed over 85 min and 300 rpm stirrer speed, causing Compound I' to precipitate and crystallize as the disodium monohydrate salt. Residual Compound I' in the equipment used for dosing was rinsed into the reactor with degassed water (0.21 kg/kg Compound I'). Stirring was continued for 10 hours before the slurry was filtered through a nutsche filter at 50° C. The reactor was rinsed with a mixture of MEK (2.7 kg/kg Compound I') and water (0.081 kg/kg Compound I'), the wet product was washed with the rinse mixture and the product was dried in vacuo (approx. 100 mbar) at a maximum of 50° C. to obtain Compound I' monohydrate in a highly crystalline form.

Differential Scanning Calorimetry (5° C./min), Thermogravimetric analysis (5° C./min), and Dynamic Vapor Sorption (stepwise RH decrease from 45% to 0% at 50° C.) data for highly crystalline Form A of Compound I' prepared analogously to the crystallization method above is shown in FIGS. 27-29, respectively. The data shows that the highly crystalline sample of Form A has an endotherm at 152° C., exhibits a 5.3% weight loss when carried from 34° C. to 140° C., and a 0.71% weight loss from 140° C. to 238° C. The highly crystalline sample does not begin to show appreciable water loss until heated above 100° C., and resists gain/loss of water over a relative humidity range of 5% to 75%.

What is claimed is:

1. A crystalline form of Compound I':

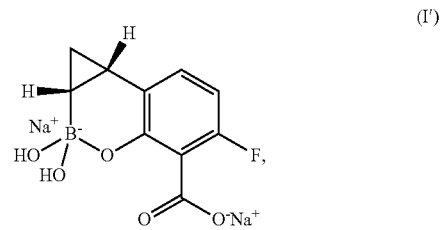

(I')

or a solvate thereof,
wherein the crystalline form exhibits an X-ray powder diffraction pattern comprising at least three characteristic peaks, wherein said characteristic peaks are selected from the group consisting of 6.2, 11.7, 12.4, 12.8, 16.7, 17.6, 19.1, 20.2, 20.6, 21.7, 22.0, 22.7, and 24.7±0.2 degrees 2θ.

2. The crystalline form of claim 1, wherein the crystalline form is a monohydrate.

3. The crystalline form of claim 1, wherein the crystalline form has an endotherm from 150° C. to 154° C.

4. The crystalline form of claim 1, wherein the crystalline form has a change in mass of less than 1% with a humidity change from 5% to 75%.

5. The crystalline form of claim 1, wherein the crystalline form has less than 1% weight loss in TGA from 140° C. to 238° C.

6. The crystalline form of claim 1, wherein the crystalline form is highly crystalline.

* * * * *